United States Patent
Sugiyama et al.

(10) Patent No.: US 8,269,692 B2
(45) Date of Patent: Sep. 18, 2012

(54) IMAGE DISPLAY APPARATUS, DISPLAY METHOD THEREOF, PROGRAM, INTEGRATED CIRCUIT, GOGGLE-TYPE HEAD-MOUNTED DISPLAY, VEHICLE, BINOCULARS, AND DESKTOP DISPLAY

(75) Inventors: Keiji Sugiyama, Kyoto (JP); Kakuya Yamamoto, Hyogo (JP); Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 711 days.

(21) Appl. No.: 12/523,624

(22) PCT Filed: Nov. 20, 2008

(86) PCT No.: PCT/JP2008/003424
§ 371 (c)(1),
(2), (4) Date: Jul. 17, 2009

(87) PCT Pub. No.: WO2009/066465
PCT Pub. Date: May 28, 2009

(65) Prior Publication Data
US 2010/0103077 A1   Apr. 29, 2010

(30) Foreign Application Priority Data

Nov. 20, 2007 (JP) ................................ 2007-300126
Nov. 20, 2007 (JP) ................................ 2007-300128
Nov. 27, 2007 (JP) ................................ 2007-305403

(51) Int. Cl.
*G09G 5/00* (2006.01)
(52) U.S. Cl. .................... 345/7; 345/8; 345/9; 359/630; 359/631; 359/632; 359/633; 359/13; 359/14; 340/980
(58) Field of Classification Search ................ 345/8, 7, 345/9; 359/631, 633, 900, 629, 486, 487, 359/488, 630, 632, 13, 14; 340/980
See application file for complete search history.

(56) References Cited

U.S. PATENT DOCUMENTS
6,043,799 A * 3/2000 Tidwell ............................ 345/7
7,589,902 B2 * 9/2009 Garoutte et al. ............. 359/630

FOREIGN PATENT DOCUMENTS
JP         7-113985         5/1995
(Continued)

OTHER PUBLICATIONS
Full Machine English translation of JP 9-61776, which was cited in the IDS filed Jul. 17, 2009.
Full Machine English translation of JP 10-301055, which was cited in the IDS filed Jul. 17, 2009.
International Search Report issued Dec. 16, 2008 in the International (PCT) Application of which the present application is the U.S. National Stage.

*Primary Examiner* — Lun-Yi Lao
*Assistant Examiner* — Olga Merkoulova
(74) *Attorney, Agent, or Firm* — Wenderoth, Lind & Ponack, LLP

(57) ABSTRACT

An image display apparatus includes: a left-eye light source (101) that outputs a left-eye image constituting an original image in whole or in part; a left-eye deflection unit (104) that deflects, toward a left eye of the user, the left-eye image outputted by the left-eye light source (101); a right-eye light source (110) that outputs a right-eye image constituting the original image in whole or in part; a right-eye deflection unit (107) that deflects, toward a right eye of the user, the right-eye image outputted by the right-eye light source (110); and a control unit (105, 111) that controls the left-eye light source (101) and the right-eye light source (110) such that the left-eye image and the right-eye image are outputted which are different from each other in at least one of pixel position, image shape, image size, image resolution, and display frame rate so that the user can recognize the original image from the left-eye image and the right-eye image by an image fusion effect.

33 Claims, 51 Drawing Sheets

FOREIGN PATENT DOCUMENTS

| JP | 9-61776 | 3/1997 |
| JP | 9-101479 | 4/1997 |
| JP | 10-301055 | 11/1998 |

* cited by examiner

601

602

603

| Degrees of misalignment from line-of-sight center | Vision |
|---|---|
| 0 | Up to 2.0 |
| 2 degrees | 0.4 |
| 5 degrees | 0.1 |
| 10 degrees | 0.05 |

FIG. 53

| Remaining battery charge | 100% | 80% | 60% | 40% | 20% | 0% |
|---|---|---|---|---|---|---|
| Vertical frequency correction value Xa | 1 | 1 | 0.8 | 0.6 | 0.4 | 0 |
| Horizontal frequency correction value Ya | 1 | 1 | 0.8 | 0.6 | 0.4 | 0 |

FIG. 54

| Image content | Contents information | Frame rate coefficient F |
|---|---|---|
| Information program | News | 0.5 |
|  | Documentary | 0.5 |
| Entertainment program | Sports | 1 |
|  | Variety | 0.8 |
|  | Movie | 0.7 |
|  | Music | 0.7 |
| ... |  |  |

FIG. 55
| Image content | Contents information | Frame rate coefficient correction value Fa |
|---|---|---|
| Information program | News | ±0 |
| | Documentary | +0.5 |
| Entertainment program | Sports | ±0 |
| | Variety | ±0 |
| | Movie | ±0 |
| | Music | −0.2 |
| ... | | |
FIG. 56A  FIG. 56B  FIG. 56C
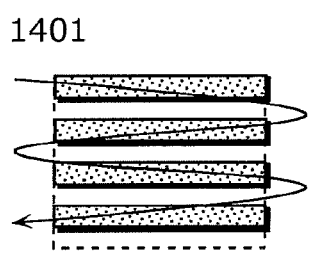
1401
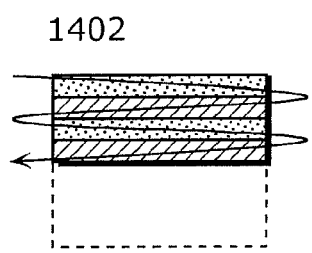
1402
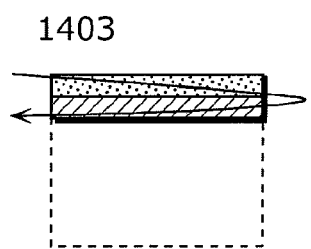
1403

IMAGE DISPLAY APPARATUS, DISPLAY METHOD THEREOF, PROGRAM, INTEGRATED CIRCUIT, GOGGLE-TYPE HEAD-MOUNTED DISPLAY, VEHICLE, BINOCULARS, AND DESKTOP DISPLAY

TECHNICAL FIELD

The present invention relates to a display apparatus such as a head-mounted display (HMD) and so on.

BACKGROUND ART

Conventionally, a method used for a display apparatus such as a head-mounted display (HMD) is to draw an image directly onto the retina by scanning laser beams two-dimensionally (hereinafter, described as a laser-scanning method) (For example, see Patent Reference 1). The display apparatus according to the laser scanning method is also known as: retinal scanning display (RSD), retinal irradiation display, retinal direct-draw display, laser scanning display, direct-view-type display, virtual retinal display (VRD), and so on.

FIGS. 1A and 1B show an example of a structure of a goggle-type HMD. The HMD shown in FIGS. 1A and 1B has goggle frames equipped with: light sources 101 and 110 which emit laser beams; wavefront shape changing units 102 and 109 which control the wavefront of the laser beam; and scan units 103 and 108 which scan laser beams in a two-dimensional direction. The laser beams are projected by the scan units 103 and 108 onto the goggle lenses 11 and 12, and then reflected by deflection units 104 and 107 provided on the surface of the goggle lenses. Then, the laser beams enter a user's eyes to form an image on the retina. Here, a half mirror or a hologram optical element (HOE) is used for the deflection units 104 and 107 so that the user can visually recognize both the external world and the image drawn with the laser beams at the same time. In addition, for the scan units 103 and 108, a mirror device is used which oscillates a single-plate mirror in a uniaxial or biaxial direction to thereby scan the laser in a two-dimensional direction.

In addition, for an HMD that displays an image onto both eyes, there is a prior-art example of increasing virtual resolution by changing the number of pixels of the image to be displayed onto both eyes. In this prior-art example, by displaying pixels which complement each other, for example, displaying odd lines onto the right eye and even lines onto the left eye, it becomes possible to present, to the user, an image for which display pixels on the right and left are synthesized.
Patent Reference 1: Japanese Unexamined Patent Application Publication No. H10-301055
Patent Reference 2: Japanese Unexamined Patent Application Publication No. H9-061776

DISCLOSURE OF INVENTION

Problems that Invention is to Solve

However, the laser-scan display apparatus has a problem of difficulty in improving image quality, such as the resolution, view angle, and frame rate of the image to be displayed. First, when using, as scan units 103 and 108, a mirror device that oscillates the single-plate mirror, the size of the mirror is a problem in obtaining a high-quality image for display.

The mirror device, as FIG. 74 shows, changes the reflection direction of a laser beam 304 that is incident on a single-plate mirror 301 so as to perform two-dimensional scanning, by oscillating the single-plate mirror 301 along a first rotational axis X and a second rotational axis Y that is orthogonal to the first rotational axis X.

FIG. 75 shows an example of a trajectory which is drawn, in the HMD shown in FIG. 1, on the deflection unit 104 with the laser beam scanned two-dimensionally by the scan unit 103. As shown in the figure, the scan unit 103 performs two-dimensional laser scanning so that a display image 501 is displayed on the user's eye by drawing a scan trajectory 502 with the laser beam. In this example, the HMD of FIG. 1 is designed such that a direction of the rotational axis X of the scan unit 103 corresponds to a horizontal direction of the display image 501, and a direction of the rotational axis Y corresponds to a vertical direction of the display image 501. In addition, a frequency with which the mirror oscillates in the direction of the rotational axis X (around Y-axis) is represented as a horizontal drive frequency Hx, and a frequency with which the mirror oscillates in the direction of the rotational axis Y (around X-axis) is represented as a vertical drive frequency Hy. In the scan trajectory 502 shown in FIG. 75, horizontal scanning is performed more than one time during one vertical scan of a laser beam. Generally, the frame rate for the display image 501 depends on the slower one of the drive frequencies Hx and Hy for a two-axis mirror. The example of FIG. 75 displays a frame of an image during one vertical scan of the laser beam. In addition, when the frame of the image is displayed during a reversal beam scan, two frames of the image are displayed during a period when the laser beam reciprocates in the vertical direction. Thus, the relationship represented by Expression (1) is established between the drive frequency Hy and the frame rate fps of the image.

[Expression 1]

$$fps = 2 \times Hy \quad (1)$$

In addition, as FIG. 76 shows, the laser beam 304 incident on the scan unit 103 is scanned, along with the oscillation of the mirror, at a scan angle $\alpha$ in the direction of the rotational axis X and at a scan angle $\beta$ in the direction of the rotational axis Y. Here, the scan angles $\alpha$ and $\beta$ are angles indicating a range of the laser beam to be scanned by the scan unit 103. As FIG. 76 shows, the horizontal scan angle $\alpha$ represents an angle between a path of the laser beam scanned onto a leftmost side and a path of the laser beam scanned onto a rightmost side. Likewise, the vertical scan angle $\beta$ represents an angle between a path of the laser beam scanned onto an uppermost portion and a path of the laser beam scanned onto a lowermost portion.

Here, assuming that the single-plate mirror 301 included in the scan unit 103 has a diameter D, and that the display image 501 displayed by the HMD of FIG. 1 has horizontal resolution Nx and vertical resolution Ny, the relationships represented by Equations (2) and (3) are generally established.

[Expression 2]

$$Nx \propto D \times \alpha \quad (2)$$

[Expression 3]

$$Ny \propto D \times \beta \quad (3)$$

Thus, in the laser-scan display unit, it is necessary to increase the scan angles $\alpha$ and $\beta$ or the diameter D of the single-plate mirror 301 in the scan unit 103 in order to increase the resolution for display.

However, increasing the diameter D of the single-plate mirror 301 in the scan unit 103 results in increased weight of the single-plate mirror 301. This results in difficulty of increasing the scan angles α and β or the drive frequencies Hx and Hy, thus causing decrease in the frame rate fps of the display image 501. In addition, increasing the scan angles α and β necessitates a larger movement of the single-plate mirror 301, thus making it difficult to increase the drive frequencies Hx and Hy. In addition, this also results in the increased size of a driving element (actuator) for moving the single-plate mirror 301, electric power, noise, and so on, thus making it difficult to mount the scan unit 103 on the goggle-type HMD. Furthermore, the relationship between the drive frequency of the scan unit 103 and resolution is also a problem in obtaining high-quality images with the beam scan display apparatus.

FIG. 77 shows an example of a trajectory which is drawn, in the HMD shown in FIG. 1, on the deflection unit 104 with a laser beam 303 scanned two-dimensionally by the scan unit 103. As the figure shows, the laser beam 303 draws a scan trajectory 602c as shown in FIG. 77 when scanned two-dimensionally by the scan unit 103. As a result, a display image 601C is displayed on the user's eyes. At this time, overscan fields Or and Ol are set such that the scan trajectory 602C appropriately overlaps the display lines of the display image 601c. The ratio of the display image 601c to the scan field of the scan trajectory 602c generally including the overscan fields is represented as an overscan ratio A with respect to the display image 601c.

Here, assuming that a display image 601b shown in the HMD of FIG. 1 has horizontal resolution Nx and vertical resolution Ny, the relationship represented by Expression (4) is generally established between the vertical resolution Ny of the display image, the frame rate fps of the display image, and the horizontal drive frequency Hx of the scan unit 103. As represented by this Expression (4), when there is an upper limit to the horizontal drive frequency Hx of the scan unit 103, it is difficult to increase both the vertical resolution Ny and the frame rate fps of the display image at the same time.

[Expression 4]

$$Hx = Ny \times fps/(2 \times A) \quad (4)$$

In addition, in the case of increasing the scan angles α and β of the scan unit 103 and 108 in order to display a wide-field image, the single-plate mirror 301 moves a larger distance during one period, causing the drive frequency to decrease accordingly. Thus, in the beam-scan HMD using the mirror device, it is difficult to increase the frame rate and the resolution of the wide-field display image at the same time.

In addition, in the case of the goggle-type HMD which projects an image obliquely onto the deflection units 104 and 107, the image is distorted in a trapezoidal shape, and this causes a problem of narrowing the view angle of the image in the correction of the distortion.

As FIG. 1 shows, the light from the scan unit 103 and 108 is obliquely projected onto the deflection units 104 and 107, respectively. Generally, when projecting a rectangular image onto the screen from a diagonal position, a distortion referred to as trapezoidal distortion or a key stone is generated in the image projected onto the screen. Thus, also in the goggle-type HMD, this results in projection of a distorted trapezoidal image onto the user's eyes.

With reference to FIGS. 78 and 79, shown is an example of the trapezoidal distortion generated when a rectangular image from a point light source O is obliquely projected onto a screen S. FIG. 78 is a diagram as seen from above the screen S, and FIG. 79 is a diagram as seen from the front of the screen S. In this example, as shown in FIGS. 78 and 79, the light from the point light source O is incident on the screen S from the left oblique front. Thus, as shown in FIG. 78, the distance from the point light source O to the screen S differs between a left side L1 and a right side L2 of the projected image.

In addition, as FIG. 79 shows, since the projected image from the point light source O expands lengthwise at a projection angle θ, the side of the projected image on the screen increases in length as the distance from the light point source O increases. Thus, the projected image 401a on the screen S is distorted in a trapezoidal shape.

However, no measures have been taken for such oblique projection in the prior art example (Patent Reference 1) of the goggle-type HMD which obliquely projects an image onto goggle lenses. Note that this problem also occurs in the case of the point light source O which does not include a laser and a scan unit but includes a liquid crystal element or an organic electroluminescence display.

To deal with the trapezoidal distortion, a front projector or the like currently available on the market performs correction by image processing. FIG. 80 shows an example of how the trapezoidal distortion is corrected by image processing. A rectangular display region is determined in accordance with the length of a side of the shorter one of the upper base and the lower base of a before-correction image 501a in a trapezoidal shape. Then, the portion beyond the rectangular region is not displayed, thus allowing display of an after-correction image 502a in a rectangle shape to the user. However, this method has a problem of only allowing display of a narrow-field image because the size of the display image is determined in accordance with the shortest side of the before-correction image 501a.

As described above, in the beam scan display apparatus, it is difficult to improve image quality such as resolution, view angle, and frame rate for reasons of the size and drive frequencies of the scan unit 103 and 108, positional relationships between the scan units 103 and 108 and the deflection units 104 and 107, and so on. In the prior-art example (Patent Reference 1) of the goggle-type HMD which obliquely projects an image onto goggle lenses, no measures are taken for balancing between wide-field display and image-quality improvement.

Patent Reference 2 discloses a method for retaining the resolution of the display image to be visually recognized by the user even when the resolution is decreased on the right and left. However, the problem regarding the frame rate and the resolution, which is peculiar to the beam scan display apparatus, is not disclosed therein. In addition, which is appropriate, giving priority to the frame rate or to the resolution, depends on the image content. For images with strenuous motion such as a sports program, priority should be given to the frame rate, while for still pictures, it is necessary to give priority to the resolution. This changing of the frame rate or resolution according to the content of information or the like is not considered in Patent Reference 2, either.

The present invention is conceived to solve the above problems, and it is the object of the present invention to improve, by utilizing an image fusion effect of both eyes, the virtual image quality of an image visually recognized by the user by appropriately changing image display on the right and left in the image display apparatus.

Means to Solve the Problems

An image display apparatus which displays an image onto a retina of a user includes: a left-eye image output unit which outputs a left-eye image constituting an original image in whole or in part; a left-eye deflection unit which deflects, toward a left eye of the user, the left-eye image outputted by the left-eye image output unit; a right-eye image output unit which outputs a right-eye image constituting the original image in whole or in part; a right-eye deflection unit which deflects, toward a right eye of the user, the right-eye image outputted by the right-eye image output unit; and a control unit which controls the left-eye image output unit and the right-eye image output unit such that the left-eye image and the right-eye image are outputted, the left-eye image and right-eye image being different from each other in at least one of pixel position, image shape, image size, image resolution, and display frame rate so that the user can recognize the original image from the left-eye image and the right-eye image by an image fusion effect.

With this configuration, it is possible to improve virtual image quality and widen the view angle of a display image, by displaying a low-quality image having a wide view angle onto one eye and a high-quality image having a narrow view angle onto the other eye.

In addition, the left-eye image output unit may include: a left-eye light source which emits a beam for drawing each of pixels constituting the left-eye image; and a left-eye scan unit which scans the left-eye deflection unit using the beam emitted from the left-eye light source, and the right-eye image output unit may include: a right-eye light source which emits a beam for drawing each of pixels constituting the right-eye image; and a right-eye scan unit which scans the right-eye deflection unit using the beam emitted from the right-eye light source. With this configuration, it is possible to prevent trapezoidal distortion of an image while reducing, at the same time, the size and power consumption of the image display apparatus equipped on eyeglasses.

In addition, the control unit may include: a scan field setting unit which causes one of the left-eye scan unit and the right-eye scan unit to scan the beam at a first scan angle for scanning only part of the original image, and which causes the other to scan the beam at a second scan angle larger than the first scan angle and equal to or below a scan angle for scanning the original image in whole; and an image quality setting unit which controls the left-eye image output unit and the right-eye image output unit so as to cause the left-eye image output unit and the right-eye image output unit to output the left-eye image and the right-eye image different from each other in image quality, respectively, according to the first and the second scan angles set by the scan field setting unit.

As an embodiment, the image quality setting unit includes a frame rate setting unit which causes one of the left-eye image output unit and the right-eye image output unit to output an image having a first frame rate, and which causes the other to output an image having a second frame rate smaller than the first frame rate, the one of the left-eye image output unit and the right-eye image output unit corresponding to a side for which the first scan angle is set, and the other corresponding to a side for which the second scan angle is set. With this configuration, it is possible to improve the virtual frame rate of the image visually recognized by the user, by displaying an image having a narrow view angle at a high frame rate.

As another embodiment, the image quality setting unit includes a resolution setting unit which causes one of the left-eye image output unit and the right-eye image output unit to output an image having a first resolution, and which causes the other to output an image having a second resolution lower than the first resolution, the one of the left-eye image output unit and the right-eye image output unit corresponding to a side for which the first scan angle is set, and the other corresponding to a side for which the second scan angle is set. With this configuration, it is possible to improve the virtual resolution of the image visually recognized by the user, by displaying an image having a narrow view angle with a larger number of pixels.

In addition, the left-eye scan unit and the right-eye scan unit may be different in size, and the scan field setting unit may cause a larger one of the left-eye scan unit and the right-eye scan unit to scan the beam at the first scan angle, and may cause a smaller one to scan the beam at the second scan angle. With this configuration, it is possible to improve the virtual resolution of the image visually recognized by the user, by displaying an image having a narrow view angle with a larger number of pixels.

The image display apparatus according to the present invention further includes a line-of-sight detection unit which detects the user's line of sight, and the scan field setting unit causes one of the left-eye scan unit and the right-eye scan unit to scan a field including an end of the user's line of sight, based on a result of the detection performed by the line-of-sight detection unit, the one of the left-eye scan unit and the right-eye scan unit corresponding to a side for which the first scan angle is set. With this configuration, it is possible to present a high-quality image to the central visual field of the user even when the user's line of sight moves.

In addition, the scan field setting unit may cause one of the left-eye scan unit and the right-eye scan unit to scan the beam at the first scan angle, and may cause the other to scan the beam at the second scan angle, the one of the left-eye scan unit and the right-eye scan unit corresponding to a dominant eye of the user. With this configuration, it is possible to present a high-quality image onto an eye with which the user has clearer vision, and to thereby improve the virtual quality of the image visually recognized by the user.

In addition, the scan field setting unit may cause one of the left-eye scan unit and the right-eye scan unit to scan the beam at the first scan angle, and may cause the other to scan the beam at the second scan angle, the one of the left-eye scan unit and the right-eye scan unit corresponding to one of the user's eyes which has clearer vision. With this configuration, it is possible to present a high-quality image onto an eye with which the user has clearer vision, and to thereby improve the virtual quality of the image visually recognized by the user.

In addition, the control unit may include a scan pattern determining unit which divides the original image into plural scan fields and causes each of the left-eye scan unit and the right-eye scan unit to scan the beam over a different scan field in each frame, and also to scan the beam, in an adjoining frame, over a scan field other than the different scan field. With this configuration, it is possible to prevent continuous display of different portions of the pixels onto the right and left eyes, and to thereby reduce discomfort felt by the user watching the image.

As an embodiment, the left-eye scan unit and the right-eye scan unit may scan the image by drawing pixels in a first direction and then repeating the drawing more than one time by concurrently shifting a scan position into a second direction perpendicular to the first direction, and the scan pattern determining unit may divide the original image into the plural scan fields such that, in each frame, the left-eye scan unit and the right-eye scan unit perform scanning to draw pixels adjoining each other in the second direction. With this configuration, it is possible to increase the continuity of the pixels of the image visually recognized by the user, using the image fusion effect of both eyes, and to thereby enhance the smoothness of the display image.

As another embodiment, the left-eye scan unit and the right-eye scan unit may scan the image by drawing pixels in a first direction and then repeating the drawing more than one time by concurrently shifting a scan position into a second direction perpendicular to the first direction, and the scan pattern determining unit may divide the original image into the plural scan fields such that each of the left-eye scan unit and the right-eye scan unit scans a series of scan fields in the second direction in each frame. With this configuration, it is possible to increase the continuity of the pixels of the image visually recognized by the user, using the image fusion effect of both eyes, and to thereby enhance the smoothness of the display image.

In addition, the left-eye scan unit and the right-eye scan unit may scan the image by drawing pixels in a first direction and then repeating the drawing more than one time by concurrently shifting a scan position into a second direction perpendicular to the first direction, and the scan pattern determining unit may cause each of the left-eye scan unit and the right-eye scan unit to scan the beam such that the left-eye scan unit and the right-eye scan unit perform scanning in directions opposite to each other when performing the scanning in the second direction. With this configuration, it is possible to avoid overlapping of pixels displayed on the right and left eyes, and to thereby increase efficiency of the image fusion effect of both eyes.

The control unit may include a display image quality determining unit which generates a correction image, of which at least one of the frame rate and the number of display pixels of the original image is corrected based on a maximum drive frequency of the left-eye scan unit and the right-eye scan unit, and the scan pattern determining unit may divide, into the plural scan fields, the correction image generated by the display image quality determining unit and then cause each of the left-eye scan unit and the right-eye scan unit to scan the beam. With this configuration, even in the case of reducing the resolution for both eyes in order to maintain the frame rate due to the upper limit of the drive frequency of the scan unit, it is possible to reduce deterioration in resolution of the image visually recognized by the user, by utilizing the image fusion effect of both eyes. In addition, it is possible to reduce deterioration in resolution when displaying, as in double-speed driving, the image at a frame rate higher than an original frame rate of the image.

In addition, the left-eye scan unit and the right-eye scan unit may scan the image by drawing pixels in a first direction and then repeating the drawing more than one time by concurrently shifting a scan position into a second direction perpendicular to the first direction, and the display image quality determining unit may correct the frame rate of the original image by doubling a smaller one of a drive frequency of the left-eye scan unit and the right-eye scan unit for scanning in the second direction and the maximum drive frequency of the left-eye scan unit and the right-eye scan unit for scanning in the second direction, the drive frequency being required for displaying the original image. With this configuration, it is possible to set the frame rate of the display image high while retaining the virtual resolution of the image by utilizing the image fusion effect of both eyes.

Furthermore, the display image quality determining unit may re-correct the corrected frame rate such that the number of display pixels in the second direction is equal to or larger than a predetermined value at which the frame rate of the original image is equal to or higher than 1, and is also equal to or below the number of display pixels in the second direction of the original image, the number of display pixels in the second direction being calculated from the corrected frame rate and the drive frequency of the left-eye scan unit and the right-eye scan unit for scanning in the first direction. With this configuration, it is possible to set the frame rate and resolution of the display image so as to achieve maximum utilization of the performance of the scan unit.

In addition, the scan pattern determining unit may divide the original image into scan fields, the number of which is equivalent to a quotient obtained by dividing a total number of pixels of one of the left-eye image and the right-eye image by the number of display pixels of each of frames corrected by the display image quality determining unit. With this configuration, it is possible to display all the pixels of the display image with a minimum number of frames.

In addition, the display image quality determining unit may further correct at least one of the frame rate and the number of display pixels of the original image, based on content information indicating contents of the original image. With this configuration, it is possible to select an appropriate image quality according to each image, by increasing the frame rate for an image having larger motion such as sports, and increasing resolution for an image having more text information such as news.

The control unit may further include a user profile management unit which holds an image quality correction value that is set by the user per content information, and the display image quality determining unit may correct at least one of the frame rate and the number of pixels of the original image, based on the image correction value corresponding to the content information of the original image. With this configuration, it is possible to set the image quality suited for the user's preference according to each information type such as sports and news and change the frame rate and resolution accordingly.

In addition, the user profile management unit may further hold information regarding vision of the user, and the display image quality determining unit may correct at least one of the frame rate and the number of pixels of the original image, based on the information regarding the vision of the user, which is held by the user profile management unit. With this configuration, it is possible to perform processing such as changing the image quality by giving preference to the frame rate over the resolution for the user having poor vision.

The image display apparatus according to the present invention may further include: a battery for driving the image display apparatus; a power management unit which detects a remaining charge of the battery; and a drive frequency determining unit which changes, according to a result of the detection performed by the power management unit, a maximum value of a drive frequency for both of the left-eye scan unit and the right-eye scan unit. With this configuration, it is possible to reduce battery consumption of the scan unit when the remaining battery charge is low, and to thereby extend battery life of the display apparatus.

In the case where the left-eye image becomes a left-eye distorted image which is distorted in a trapezoidal shape on the left-eye deflection unit when the beam scanned by the left-eye scan unit is obliquely incident on the left-eye deflection unit, and where the right-eye image becomes a right-eye distorted image which is distorted in a trapezoidal shape on the right-eye deflection unit when the beam scanned by the right-eye scan unit is obliquely incident on the right-eye deflection unit, the control unit may include: a rectangular region determining unit which determines a left-eye rectangular region in a rectangle shape, which has, as a first side, a portion of a long side of the left-eye distorted image and, as a second side, a line segment orthogonal to the first side and connecting an endpoint of the first side and an oblique side of the left-eye distorted image, and which determines a right-eye rectangular region in a rectangle shape, which has, as a third side having a same length as the first side, a portion of a long side of the right-eye image and, as a fourth side, a line segment orthogonal to the third side and connecting an endpoint of the third side and an oblique side of the right-eye distorted image; an aspect ratio adjusting unit which adjusts at least one of a height and a width of the original image so as to obtain a correction image having the first side as a height and having a sum of the second and the fourth sides as a width; a distortion correcting unit which generates a left-eye correction image by distorting the correction image in an opposite direction to the left-eye distorted image such that the left-eye image is displayed onto the left-eye deflection unit, and which generates a right-eye correction image by distorting the correction image in an opposite direction to the right-eye distorted image such that the right-eye image is displayed onto the right-eye deflection unit; and an output image control unit which causes the left-eye image output unit to output an image portion corresponding to the left-eye rectangular region of the left-eye correction image, and which causes the right-eye image output unit to output an image portion corresponding to the right-eye rectangular region of the right-eye correction image.

With this configuration, it is possible to utilize the image fusion effect of both eyes in correcting trapezoidal distortion of images which is generated in realizing a goggle-type HMD, and to thereby perform the correction of such trapezoidal distortion while retaining a wider vertical view angle than in the conventional trapezoidal correction.

As an embodiment, the rectangular region determining unit may determine the left-eye rectangular region and the right-eye rectangular region such that, when superposing the left-eye image and the right-eye distorted image in such a manner that a short side of the left-eye distorted image is included in a long side of the right-eye image and that a short side of the right-eye image is included in a long side of the left-eye distorted image, each of the second and the fourth sides becomes a straight line passing through an intersection of oblique sides of the left-eye distorted image and the right-eye distorted image.

In addition, the control unit may include a remaining region determining unit which determines a left-eye remaining region in a trapezoidal shape, which has an opposite side of the first side as a long side and a portion of an oblique side of the left-eye distorted image as an oblique side and has a height smaller than the fourth side, and which determines a right-eye remaining region in a trapezoidal shape, which has a portion of an oblique side of the right-eye distorted image as an oblique side and has a height smaller than the second side, the output image control unit may further cause the left-eye image output unit to output an image portion included in the left-eye correction image and corresponding to the left-eye remaining region, and cause the right-eye image output unit to output an image portion included in the right-eye correction image and corresponding to the right-eye remaining region. With this configuration, an effect of allowing the user to recognize a right side and a left side of the image as a smooth line is produced by the image fusion effect of both eyes.

As an embodiment, the output image control unit may decrease brightness of at least one of the left-eye remaining region and a region which is included in the right-eye rectangular region and overlaps with the left-eye remaining region, and decrease brightness of at least one of the right-eye remaining region and a region which is included in the left-eye rectangular region and overlaps with the right-eye remaining region.

As another embodiment, the output image control unit may increase brightness of a region which is included in the right-eye rectangular region and does not overlap with the left-eye remaining region, and increase brightness of a region which is included in the left-eye rectangular region and does not overlap with the right-eye remaining region.

With this configuration, an effect of preventing unevenness of brightness from occurring in the image visually recognized by the user is produced by the image fusion effect of both eyes.

In addition, the rectangular region determining unit may determine a shape of the left-eye rectangular region and a shape of the right-eye rectangular region such that a ratio between the width and the height of the correction image is 16:9 or 4:3. With this configuration, the image, visually recognized by the user with the image fusion effect of both eyes, is appropriately shaped for visual recognition of an image having an aspect ratio of 16:9 or 4:3.

In addition, when difference in vision between both eyes of the user is equal to or larger than a given value, the rectangular region determining unit may determine a shape of the left-eye rectangular region and a shape of the right-eye rectangular region such that one of the left-eye and the right-eye rectangular regions corresponding to an eye having clearer vision is maximum in size, and the other corresponding to an eye having less clear vision is 0 in size, and the remaining region determining unit may determine a shape of the left-eye remaining region and a shape of the right-eye remaining region such that one of the left-eye and right-eye remaining regions corresponding to an eye having clearer vision is 0 in size, and the other corresponding to an eye having less clear vision is maximum in size. With this configuration, it is possible to correct trapezoidal distortion by eliminating influences of an eye having less clear vision.

An image display method according to the present invention includes: outputting a left-eye image constituting an original image in whole or in part; deflecting, toward a left eye of a user, the left-eye image outputted in the outputting a left-eye image; outputting a right-eye image constituting the original image in whole or in part; deflecting, toward a right eye of the user, the right-eye image outputted in the outputting a right-eye image; and controlling the left-eye image output unit and the right-eye image output unit such that the left-eye image and the right-eye image are outputted, the left-eye image and the right-eye image being different from each other in at least one of pixel position, image shape, image size, image resolution, and display frame rate so that the user can recognize the original image from the left-eye image and the right-eye image by an image fusion effect.

A computer program according to the present invention causes a computer to execute: outputting a left-eye image constituting an original image in whole or in part; deflecting, toward a left eye of the user, the left-eye image outputted in the outputting a left-eye image; outputting a right-eye image constituting the original image in whole or in part; deflecting, toward a right eye of the user, the right-eye image outputted in the outputting a right-eye image; and controlling the left-eye image output unit and the right-eye image output unit such that the left-eye image and the right-eye image are outputted, the left-eye image and the right-eye image being different from each other in at least one of pixel position, image shape, image size, image resolution, and display frame rate so that the user can recognize the original image from the left-eye image and the right-eye image by an image fusion effect.

An integrated circuit according to the present invention includes: a left-eye image output unit which outputs a left-eye image constituting an original image in whole or in part; a left-eye deflection unit which deflects, toward a left eye of a user, the left-eye image outputted by the left-eye image output unit; a right-eye image output unit which outputs a right-eye image constituting the original image in whole or in part; a right-eye deflection unit which deflects, toward a right eye of the user, the right-eye image outputted by the right-eye image output unit; and a control unit which controls the left-eye image output unit and the right-eye image output unit such that the left-eye image and the right-eye image are outputted, the left-eye image and the right-eye image being different from each other in at least one of pixel position, image shape, image size, image resolution, and display frame rate so that the user can recognize the original image from the left-eye image and the right-eye image by an image fusion effect.

Note that the present invention can be implemented not only as such a beam-scan display apparatus but also as an integrated circuit that implements the functions of the beam-scan display apparatus, or can also be implemented as a program causing a computer to execute such functions. Furthermore, it goes without saying that such a program can be distributed through a recoding medium such as a CD-ROM and a transmission medium such as the Internet. In addition, the present invention can also be implemented as an integrated circuit which performs the functions of such a display apparatus.

A goggle-type head-mounted display according to the present invention includes: the image display apparatus described above; a left-eye lens, which is provided in front of a left eye of a user and has the left-eye deflection unit at a position opposite to the left eye of the user; a right-eye lens, which is provided in front of a right eye of the user and has the right-eye deflection unit at a position opposite to the right eye of the user; a left-side temple, which has one end connected to the left-eye lens and the other end fixed to a left side of the user's head; and a right-side temple, which has one end connected to the right-eye lens and the other end fixed to a right side of the user's head.

A vehicle according to the present invention includes: the image display apparatus described above; and a windshield having the left-eye deflection unit and the right-eye deflection unit.

A pair of binoculars according to the present invention includes: a left-eye eyepiece lens having the left-eye deflection unit; and a right-eye eyepiece lens having the right-eye deflection unit.

A desk-top display according to the present invention includes: the image display apparatus described above; a case for housing the image display apparatus; and a display screen provided on a surface of the case and configured with the left-eye deflection unit and the right-eye deflection unit.

Effects of the Invention

It is possible to utilize an image fusion effect of both eyes for improving virtual image quality in the goggle-type HMD, and to improve the virtual frame rate or the virtual resolution of the image visually recognized by the user while keeping the performance of the scan unit in control.

BRIEF DESCRIPTION OF DRAWINGS

FIG. 53 is a diagram showing a relationship between remaining battery charge and a frequency correction value.

FIG. 54 is a diagram showing a relationship between content information and a frame rate coefficient of the original image.

FIG. 55 is a diagram showing a relationship between content information and a frame rate coefficient correction value.

FIG. 56A is a diagram showing an example of a vertical scan field scanned by a scan unit.

FIG. 56B is a diagram showing another example of a vertical scan field scanned by the scan unit.

FIG. 56C is a diagram showing another example of a vertical scan field scanned by the scan unit.

NUMERICAL REFERENCES

Figure 1B:
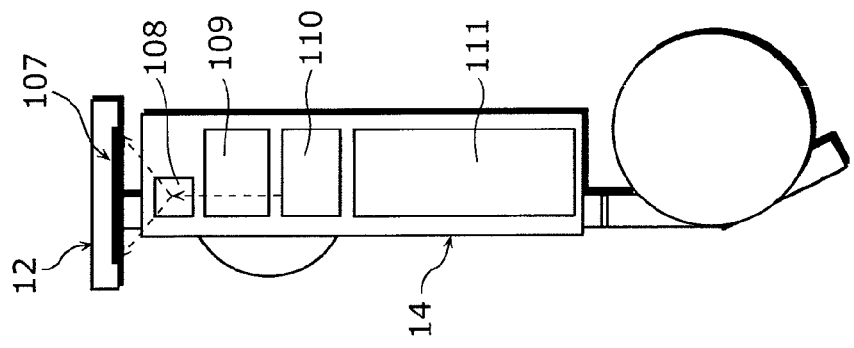
FIG. 1B is a side view of the beam scan display apparatus in the first embodiment of the present invention.

11 Left-eye lens
12 Right-eye lens
13 Left-side temple
14 Right-side temple
100 Left-eye image output unit
101 Left-eye light source
102 Left-eye wavefront shape changing unit
103 Left-eye scan unit
104 Left-eye deflection unit
105 Left-eye control unit
106, 112 Headphone
107 Right-eye deflection unit
108 Right-eye scan unit
109 Right-eye wavefront shape changing unit
110 Right-eye light source
111 Right-eye control unit
201, 3001 Focal length horizontal component changing unit
202, 3002 Focal length vertical component changing unit
211 Red laser source
212 Blue laser source
213 Green laser source
214 Light detection unit
301 Single-plate mirror
303, 304 Laser beam
401a Projected image
501, 601c Display image
501a Before-correction image
502a After-correction image
502, 602c Scan trajectory
601 Left-eye light source
601a Left-eye distorted image
601b Left-eye display region
602 Right-eye image
602a Right-eye distorted image
602b Right-eye display region
603 Entire image
801b Image analysis unit
802b Drive frequency determining unit
803b Power management unit
804b Display image determining unit
805b User profile management unit
806b Scan pattern determining unit
807b Image control unit
901, 1901, 1901a Original image
1001, 2001 Center image
1051 Scan field setting unit
1052 Image quality setting unit
1053 Resolution setting unit
1054 Frame rate setting unit
1401a, 1401b Left-eye rectangular region
1401, 1402, 1403 Scan pattern
1402a Left-eye remaining region
1501a Right-eye rectangular region
1502a, 1502b Right-eye remaining region
1601a Fused graphic
1801 Trapezoidal distortion determining unit
1802 Rectangular region determining unit
1803 Remaining region determining unit
1804 Image control unit
1805 Aspect ratio adjustment unit
1806 Distortion correcting unit
1807 Output image control unit
1902a Correction image
2001a, 2601a Left-eye partial image
2101a, 2701a Right-eye partial image
2201a Left-eye trapezoidal image
2301a Right-eye trapezoidal image
2401a Left-eye projection image
2501a Right-eye projection image
2202a, 2203a, 2302a, 2303a Trapezoidal region
2402a. 2502a Rectangular region
2601 Vehicle
2602, 2610 Laser scan unit
2603 Windshield
2604 Half mirror
2605 Driver
2606, 2609 Eyeball
2607 Ceiling
2608 Support bar
3101 Binoculars
3101a Left-eye side display unit
3101a Right-eye side display unit
3102, 3501 Reflection mirror
3103, 3502 Camera
3104 Right eye
3105 User
3106 Left eye
3401 Desktop display

BEST MODE FOR CARRYING OUT THE INVENTION

Hereinafter, embodiments of the present invention shall be described with reference to the drawings.

First Embodiment

Figure 1A:
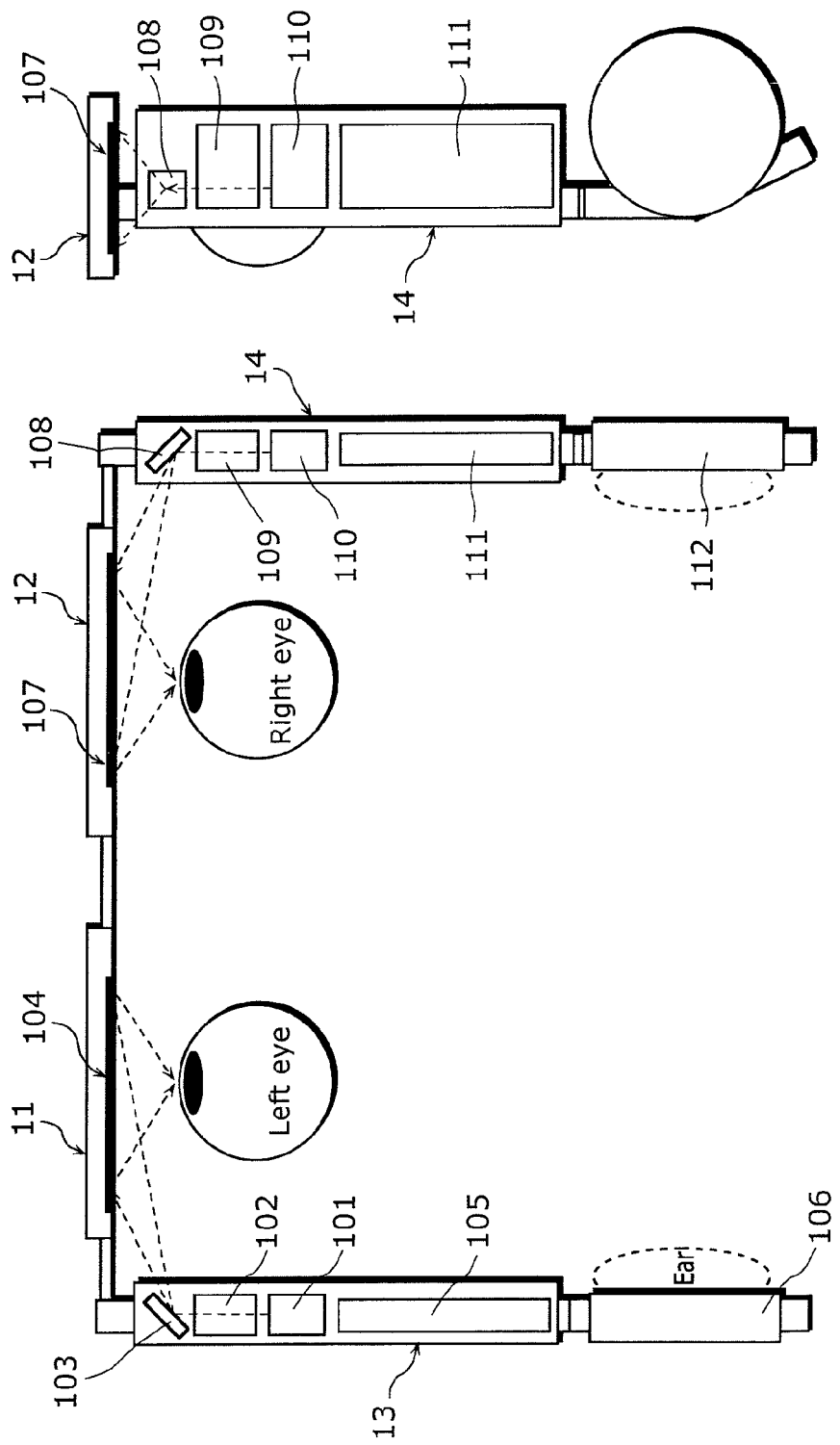
FIG. 1A is a plan view of a beam scan display apparatus in a first embodiment of the present invention.
Figure 2:
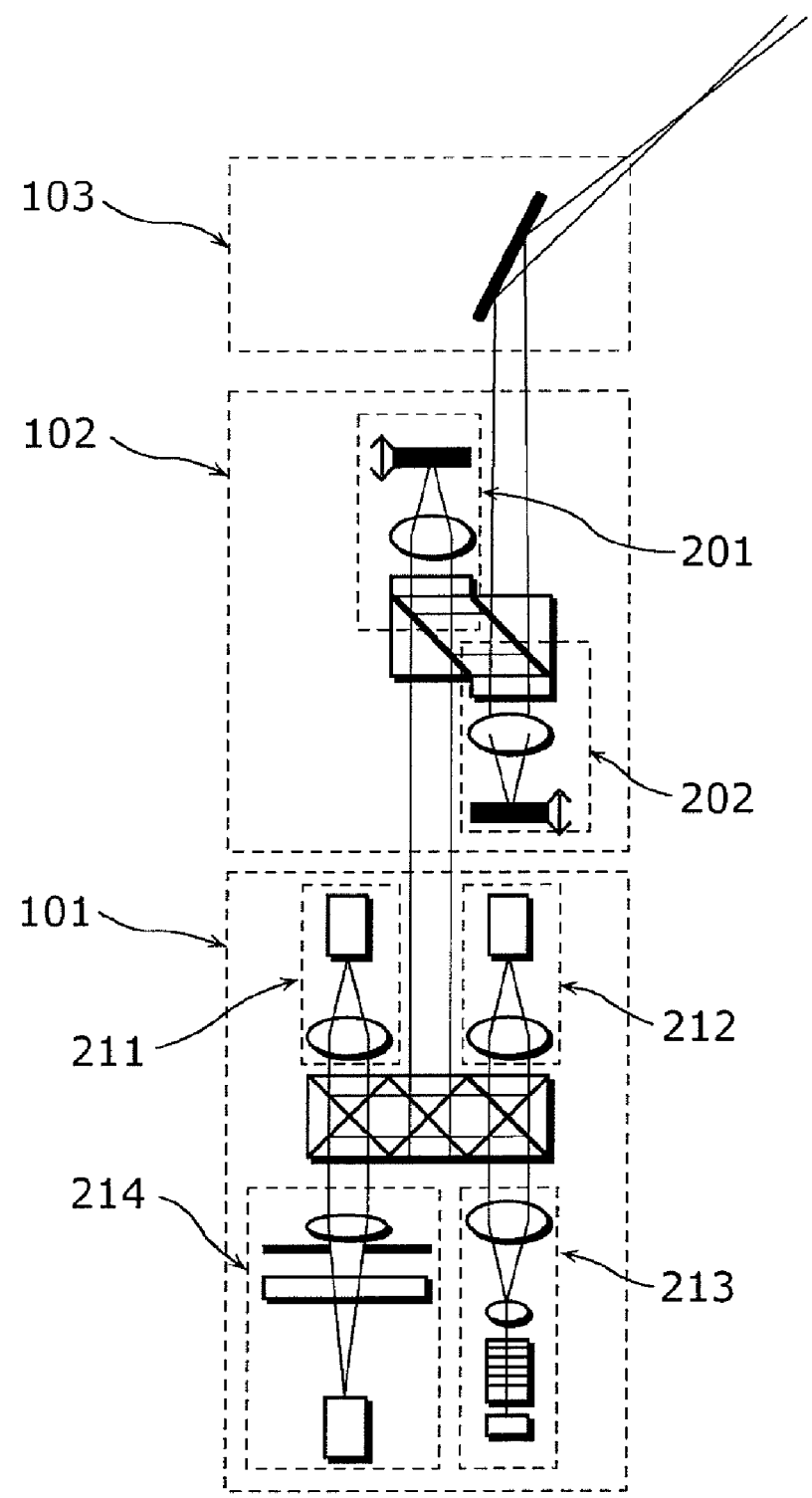
FIG. 2 is a detailed configuration diagram of the beam scan display apparatus in the first embodiment of the present invention.
Figure 3:
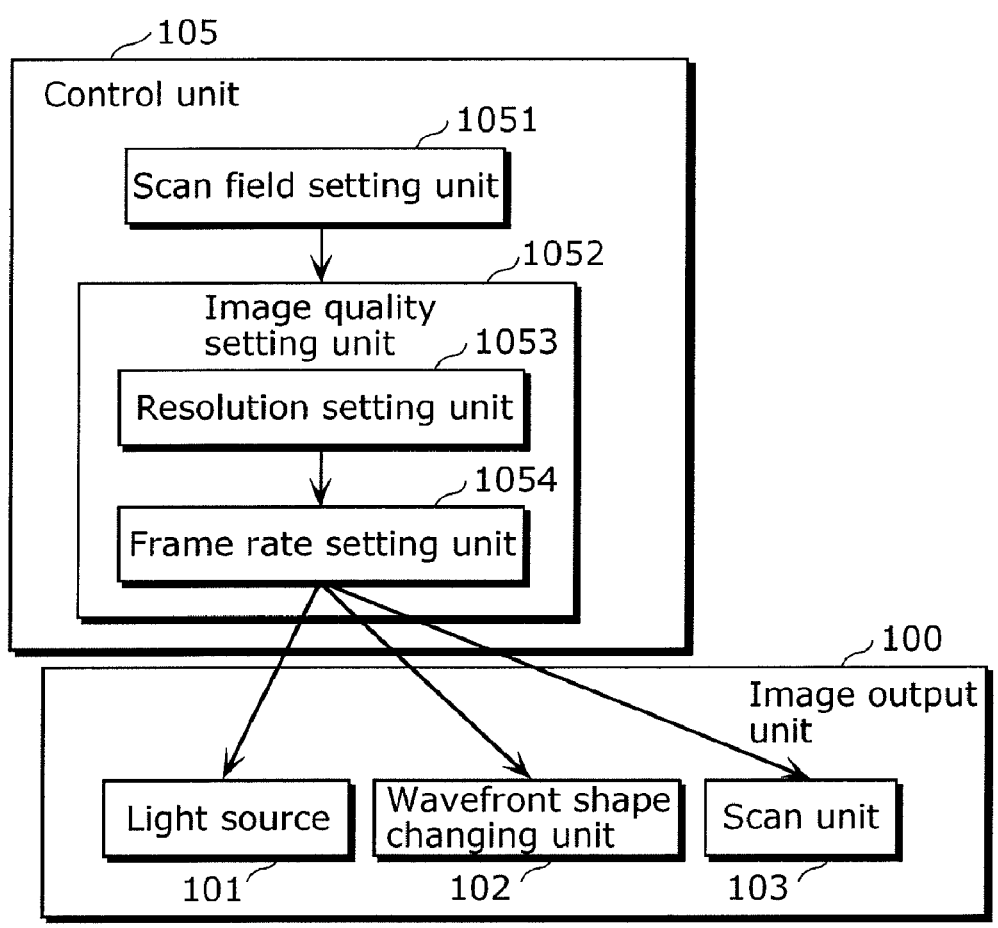
FIG. 3 is a functional block diagram of the beam scan display apparatus in the first embodiment of the present invention.

A goggle-type beam scan display apparatus (head-mounted display: HMD) according to a first embodiment of the present invention shall be described with reference to FIGS. 1A to 3. Note that: FIG. 1A is an elevation view of the beam scan display apparatus; FIG. 1B is a side view of the beam scan display apparatus; FIG. 2 is a detail view of a portion of FIG. 1A; and FIG. 3 is a functional block diagram of the beam scan display apparatus according to the first embodiment. The goggle-type beam scan display apparatus according to the first embodiment of the present invention includes: a display device, a left-eye lens 11 provided on a left-eye side of a user; a right-eye lens 12 provided on a right-eye side of the user; a left-side temple 13 having one end connected to the left-eye lens 11 and the other end fixed on the left side of the user's head; and a right-side temple 14 having one end connected to the right-eye lens 12 and the other end fixed on the right side of the user's head.

The display device includes, as shown in FIGS. 1A, 1B, and 2: light sources 101 and 110 which emit beams for drawing respective pixels making up the display image; wavefront shape changing units 102 and 109 which change wavefront shapes of the beams emitted from the light sources 101 and 110; scan units 103 and 108 which scan deflection units 104 and 107 two-dimensionally with the beams emitted from the wavefront shape changing units 102 and 109; the deflection units 104 and 107 which deflect the beams scanned by the scan units 103 and 108 toward the user eyes; control units 105 and 111 which control each of the above-mentioned units; and headphones 106 and 112.

Note that the left-eye light source 101, the left-eye wavefront shape changing unit 102, and the left-eye scan unit 103 make up a left-eye image output unit 100. Likewise, the right-eye light source 110, the right-eye wavefront shape changing unit 109, and the right-eye scan unit 108 make up a right-eye image output unit (not shown).

Note that in this embodiment: the light sources 101 and 110, the wavefront shape changing units 102 and 109, the scan units 103 and 108, the control units 105 and 111, and the headphones 106 and 112 are housed in the temples 13 and 14, and the deflection units 104 and 107 are provided on the lenses 11 and 12 on the opposite side of the user's eyes.

Note that in this specification, the "left-eye lens 11" and the "right-eye lens 12" are also referred to as the "lenses 11 and 12". Likewise, for the other constituent elements (including an image or the like), the terms "left-eye" and "right-eye" are abbreviated when referring to left-eye and right-eye inclusively.

The light sources 101 and 110 emit a beam. The beam to be emitted, as shown in FIG. 2, is a laser beam synthesized from laser beams emitted from a red laser source 211, a blue laser source 212, and a green light source 213, and it is possible to emit a laser beam having an arbitrary color by appropriately modulating the emission from each of the laser sources 211, 212, and 213. Furthermore, an image can be displayed on the retina of the user's eyes by performing modulation in association with the wavefront shape changing units 102 and 109 or the scan units 103 and 108.

Note that the green laser source 213 in the present embodiment emits a green laser beam by combining a semiconductor laser source which emits an infrared ray and a second-harmonic generation (SHG) element which changes the infrared ray into green. However, the configuration is not limited to the above, and a green semiconductor laser source 213 may also be used. In addition, each of the laser sources 211, 212, and 213 may also be solid laser, liquid laser, gas laser, a light-emitting diode, and so on.

Note that the light sources 101 and 110 may include a light detection unit 214 as shown in FIG. 2. The light detection unit 214 can detect the user's line of sight by detecting the intensity of light reflected from the cornea of the user's eye. Most beams deflected by the deflection units 104 and 107 into the direction of the eye are obliquely incident on the corneal surface, but beams from the front with respect to the eyeball have high reflectivity because of their vertical incidence on the corneal surface. By utilizing such properties, it is possible to detect the direction of the line of sight, based on the intensity of reflected light.

The wavefront shape changing units 102 and 109 change the wavefront shapes of the respective beams from the light sources 101 and 110 such that the spot sizes of the beams deflected by the deflection units 104 and 107 are within a predetermined range.

The "spot size" of a beam is hereinafter described as a spot size on the retina of the user eye, but may also be a spot size on the pupil, on the cornea, or on the deflection units 104 and 107. The spot size on the retina is the same as the displayed pixel size. The "wavefront shape" is a three-dimensional shape of the beam wavefront and includes planar, spherical, and aspherical shapes.

The left-eye wavefront shape changing unit 102 shown in FIG. 2 has a focal length horizontal component changing unit 201 and a focal length vertical component changing unit 202 which are arranged in series in an optical path. With this, it is possible to change horizontal and vertical curvatures of the beam independently from each other. The focal length horizontal component changing unit 201 changes a horizontal curvature by changing a distance between a cylindrical lens and a mirror. The focal length vertical component changing unit 202 changes a vertical curvature by using a cylindrical lens disposed perpendicular to the cylindrical lens of the focal length horizontal component changing unit 201. In addition, both the focal length horizontal component changing unit 201 and focal length vertical component changing unit 202 change a beam diameter along with change of the curvatures.

Note that changing the horizontal curvature more largely than the vertical curvature allows more flexibility in response to horizontal changes and is thus particularly effective when it is intended to make the vertical view angle of the screen wider than the horizontal view angle, or when the horizontal incident angle of the beam from the scan units 103 and 108 onto the deflection units 104 and 107 is wider than the vertical incident angle, as in the case of an HMD provided with the scan units 103 and 108 in a head-side portion.

Note that in FIG. 2, of items representing the wavefront shape, only part of the wavefront shape, that is, the horizontal curvature, vertical curvature, and respective diameters are changed; however, a unit may also be provided which changes, for the other items, curvature distribution within the wavefront, or the shape or size of a wavefront edge.

Note that, although the wavefront shape changing units 102 and 109 according to the present embodiment change the wavefront shape using the cylindrical lens and the mirror, a variable shape lens such as a liquid-crystal lens and a liquid lens, or an electro-optic device (EO device) may also be used. In this case, it is possible to change the wavefront shape without moving the position of the lens. In addition, it is possible to reduce the size of the entire apparatus by using a diffractive element or the like instead of using the cylindrical lens.

The scan units 103 and 108 each scan two-dimensionally a beam emitted from a corresponding one of the wavefront shape changing units 102 and 109, onto a corresponding one of the deflection units 104 and 108. The scan units 103 and 108 are single-plate small mirrors which can change angles two-dimensionally, and are, more specifically, microelectro-mechanical-system (MEMS) mirrors. Note that the scan units 103 and 108 may also be realized as a combination of two or more types of scan units, such as a combination of a horizontal scan unit and a vertical scan unit. The deflection units 104 and 107 deflect, respectively, the beam scanned by the scan units 103 and 108, into directions toward the user's eyes. The deflection units 104 and 107 are manufactured to diffract and collect beams from the scan units 103 and 108 into the pupils of the user's eyes, for example, by forming a photopolymer layer inside (on the eye side of) the goggle lenses 11 and 12, and then forming a Lippmann volume hologram on the photopolymer layers. On the photopolymer layer, three holograms which reflect beams from the respective color sources of red, green, and blue may be multiply-formed, or a trilayer hologram corresponding to the beams of the respective colors may also be laminated. In addition, it is possible to realize a transmissive display by manufacturing the display such that only rays of light having light-source wavelengths are diffracted using the wavelength selectivity of the hologram, and rays of light having wavelengths other than the light-source wavelengths and accounting for a major part of the light from an external world are not diffracted.

Note that the deflection units 104 and 107 are not limited to the deflection using a diffractive element such as a hologram, and may also be a mirror such as a concave mirror or a lens such as a convex lens. In addition, the method for use in the deflection units 104 and 107 includes a method in which, as with a reflective screen or a transmissive screen, part of the beams reflected off the screen are deflected toward the user's eyes as a result of diffusion of the beams hitting the screen.

The control units 105 and 111 include an integrated circuit which controls each unit of the HMD. The control units 105 and 111 control: laser emission from the light sources 101 and 110, and operations of the wavefront shape changing units 102 and 109, and the scan units 103 and 108. In addition, the control units 105 and 108 include a unit for processing an image to be displayed to the user.

As shown in FIG. 3, the left-eye control unit 105 includes: a scan field setting unit 1051 which causes one of the scan units 103 and 108 to scan the beam at a first scan angle for scanning only a portion of the original image, and causes the other one to scan the beam at a second scan angle larger than the first scan angle and equal to or smaller than the scan angle for scanning the original image in whole; and an image quality setting unit 1052 which sets the image quality of an image to be scanned by the scan units 103 and 108 according to the scan angles set by the scan field setting unit 1051. Note that, the second scan angle in the first embodiment is set to the scan angle for scanning the entire original image (a maximum value of the second scan angle).

In addition, the image quality setting unit 1052 includes a resolution setting unit 1053 which changes the resolution of a left-eye image and a right-eye image, and a frame rate setting unit 1054 which changes the frame rate of the left-eye image and the right-eye image.

The resolution setting unit 1053 causes one of the left-eye light source 101 and the right-eye light source 110 which corresponds to the side for which the first scan angle is set to output an image having a first resolution, and causes the other light source corresponding to the side for which the second scan angle is set to output an image having a second resolution lower than the first resolution.

The frame rate setting unit 1054 causes one of the left-eye light source 101 and the right-eye light source 110 which corresponds to the side for which the first scan angle is set to output an image having a first frame rate, and the other light source corresponding to the side for which the second scan angle is set to output an image having a second frame rate lower than the first frame rate.

Note that the control units 105 and 111 may include a communication unit, which is connected wirelessly to a peripheral device such as a cellular phone to receive a video and audio signal. By obtaining an image from an external device, it is no longer necessary to provide a storage for storing images, a decoder, or the like inside the display apparatus, thus allowing reduction in size of the apparatus.

An image control unit (not shown) included in the control units 105 and 111 may also have memory in which an image to be presented to the user is stored, or may also obtain, wirelessly, the image to be presented to the user from an external device.

Note that only one of the control units 105 and 111 may be provided, with the one of the control units 105 and 111 controlling the operations of: the light sources 101 and 110, the wavefront shape changing units 102 and 109, the scan units 103 and 108, and the headphones 106 and 112, which correspond to both right and left eyes. In this case, it is possible to reduce the size of the HMD and also facilitate synchronizing images for both eyes, and so on.

The headphones 106 and 112 each include a speaker so as to output sound. Note that the headphones 106 and 112 may include a battery that supplies power to the respective units in the HMD.

Note that each unit and function in FIG. 1 may be or may not be embedded in a single HMD. For example, all the units in FIG. 1 may be included in the single HMD, or the headphones 106 and 112 need not be provided. In addition, the respective units may be dispersedly provided. For example, the control units 105 and 111 may be partially included in the scan units 103 and 108 or in the wavefront shape changing units 102 and 109. Each unit in FIG. 1 may also be shared by plural devices. For example, the light sources 101 and 110 may be shared by two HMDs.

Figure 4A:
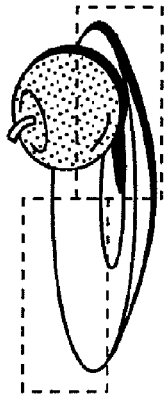
FIG. 4A is an example of a left-eye image to be projected onto the left eye of a user.
Figure 4B:
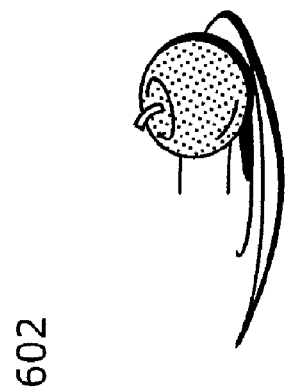
FIG. 4B is a right-eye image to be projected onto the right eye of the user.
Figure 4C:
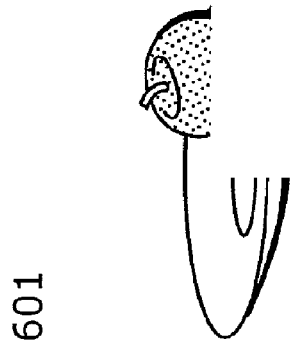
FIG. 4C is a diagram showing an entire image recognized by the user with an image fusion effect when FIGS. 4A and B are projected.

Next, an "image fusion effect" used for improving the quality of the display image in the present invention shall be described. The image fusion effect is a phenomenon in which the user recognizes an image synthesized from images that the user sees with both eyes. FIGS. 4A to 4C show examples of the image fusion effect. FIG. 4A shows a left-eye image 601 displayed onto the user's left eye, and FIG. 4B shows a right-eye image 602 displayed onto the user's right eye. When the images shown in FIGS. 4A and 4B are presented to the right and left eyes, the human brain synthesizes, and then recognizes, the right and left images as one image. That is, the user recognizes an entire image 603 synthesized from the left-eye image 601 and the right-eye image 602 as if the synthesized image were actually displayed. In FIG. 4C, the region surrounded with a dotted-line frame is a region visually recognized with only the right eye or the left eye, but the user visually recognizes the entire image 603 without being aware of that.

Figures 5, 6:
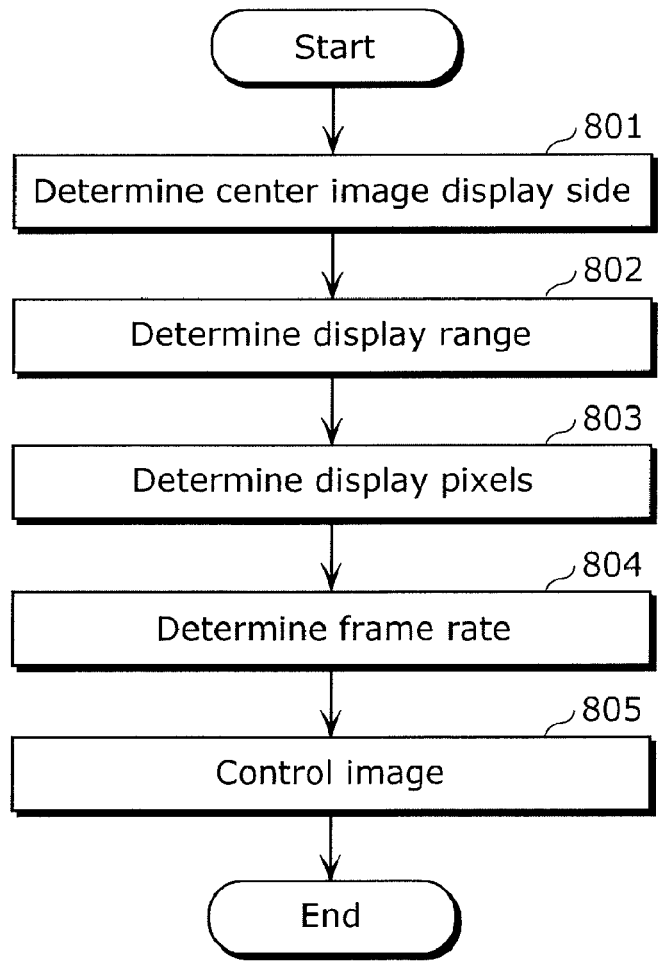
FIG. 5 is a table showing the relationship between human visual field and eyesight.
FIG. 6 is a flowchart of processing for improving a virtual frame rate of a display image in the first embodiment of the present invention.

Next, the relationship between a human visual field and vision shall be described. The human vision is not uniform in the entire visual field, in which the user retains clear vision in the central part of the visual field, but the vision decreases as the user is more distant from the visual center. FIG. 5 shows a relationship between the visual field and the vision of the user. As the figure shows, human eyes retain high resolution within a limited range of a central visual field, which is plus and minus 5° from the direction of the user's line of sight. This generally makes it difficult for human eyes to perceive degradation of image quality if the image has a poor quality in a portion other than the central visual field.

In the present invention, the virtual image quality of the display image is improved, by utilizing such an image fusion effect of both eyes and variations in vision attributed to the visual field. Of images to be displayed in the beam scan display apparatus, an image in a range that the user perceives within the central visual field is displayed onto one of the eyes in high quality, and a wide-field image is displayed onto the other eye in low quality. However, since the user can recognize the image with high resolution only in the central visual field, the user does not notice that the wide-field image has low quality but recognizes, as a result, the display image as an image that is both wide-field and high-quality. According to the present invention, virtual image quality is improved in the goggle-type HMD by using this principle.

Shown below is an example of how to improve the virtual image quality of the display image in the beam scan display apparatus in FIG. 1 by utilizing the above-mentioned image fusion effect.

Figure 74:
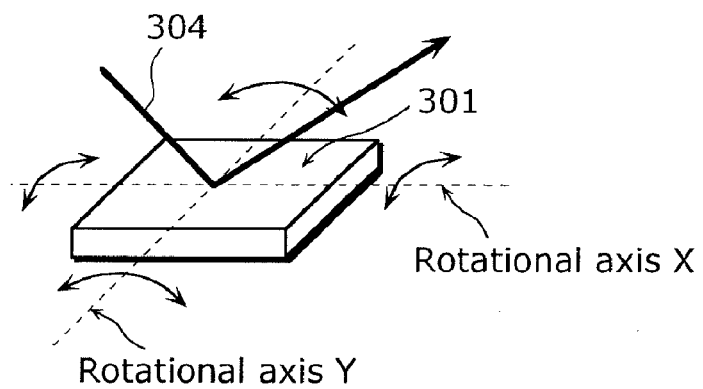
FIG. 74 is a diagram showing an example of a rotational axis of a mirror for two-dimensional scanning of a beam.
Figure 75:
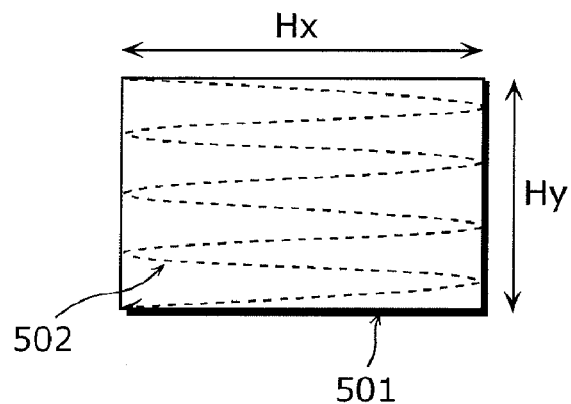
FIG. 75 is a diagram showing a trajectory drawn onto a deflection unit with a laser beam scanned by the scan unit.
Figure 76:
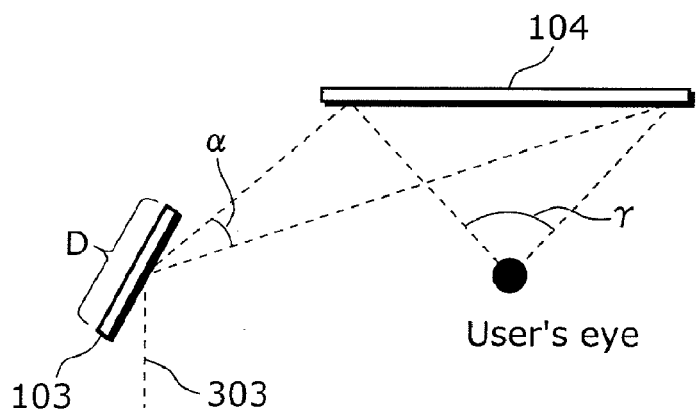
FIG. 76 is a diagram showing a schematic layout of the scan unit and the deflection unit.
Figure 77:
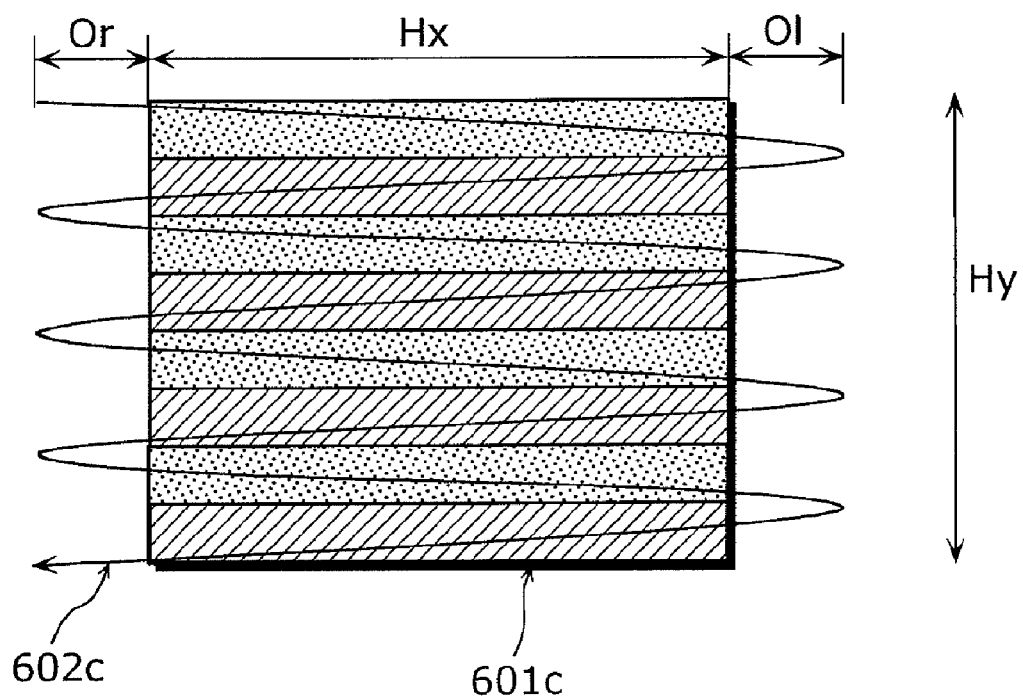
FIG. 77 is a diagram showing an example of a scan pattern in the case of taking an overscan field into consideration.
Figure 78:
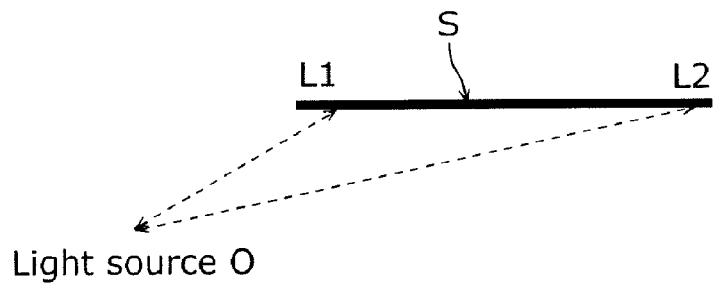
FIG. 78 is a bird's eye view when an image from a point light source is obliquely projected onto a screen.
Figure 79:
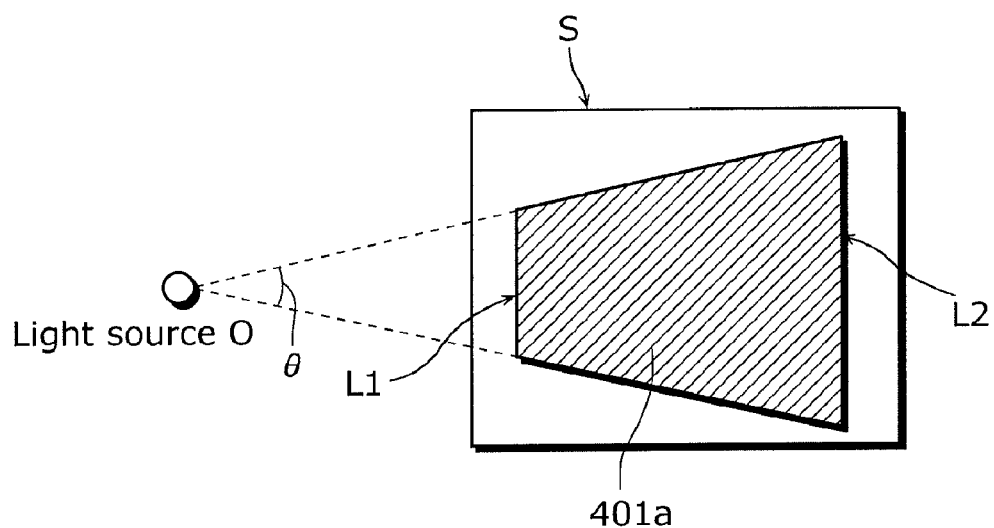
FIG. 79 is a front view when an image from the point light source is obliquely projected onto the screen.
Figure 80:
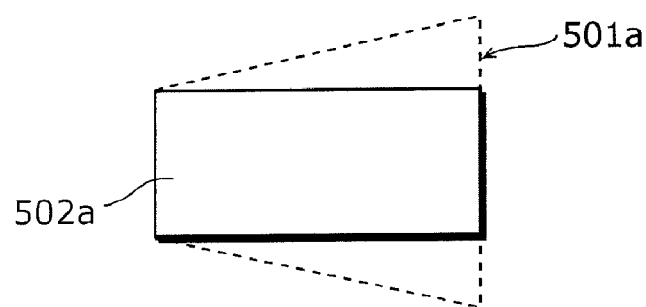
FIG. 80 is a diagram showing how a trapezoidal distortion is corrected according to the prior art.

Note that in the present embodiment the scan units 103 and 108 are mirror devices having an identical structure. In addition, as shown in FIG. 74, these mirror devices are a device that performs two-dimensional scanning by using a single-plate mirror driven by a drive element.

The scan units 103 and 108 in the present embodiment are designed to be capable of scanning an incident laser beam at a horizontal scan angle of α1 degrees and a vertical scan angle of β1 degrees, so as to display an image with horizontal resolution $Nx1_{max}$ and a vertical resolution $Ny1_{max}$. In addition, it is assumed that a horizontal drive frequency for the scan units 103 and 108 is Hx1 and a vertical drive frequency is Hy1. Furthermore, the scan units 103 and 108 repeat, more than one time, an operation of scanning pixels horizontally (in a first direction) by sequentially shifting a scan position vertically (in a second direction orthogonal to the first direction), to thereby draw one frame of an image.

Shown below is an example in which a virtual frame rate of the display image is improved by changing displays on the right and left. This processing is performed in Steps 801 to 804 shown in FIG. 6.

Step 801 Operations Assigned to the Right and Left

In this step, the scan field setting unit 1051 determines which one of the scan units 103 and 108 is to display a center image corresponding to the central visual field. Here, the selected one of the scan units that is to display the center image scans the laser beams emitted from the light sources 101 and 110 at a scan angle smaller than usual (at a first scan angle). In the present embodiment, the scan field setting unit 1051 is previously set to have the right-eye scan unit 108 as the one to display the center image.

Note that which one of the scan units is to display the to center image may also be determined according to a method specified by the user through the user interface. If this is the case, the user can determine to display an image having higher resolution to one of the eyes which has clearer vision.

For example, by previously storing information regarding the user's dominant eye in the scan field setting unit 1051, the scan unit corresponding to the dominant eye may be selected as the side on which to display the center image. In this case, it is possible for the user to display a high-definition image to the dominant eye.

In addition, by previously storing information regarding the user's vision in the scan field setting unit 1051, the scan unit corresponding to the eye having clearer vision may be selected as the side for displaying the center image. In this case, it is possible to display a higher-quality image to an eye having clearer vision.

Step 802 Determining Display Range

In this step, of the entire image to be displayed to the user, a region to be displayed as a center image 1001 is determined.

Figure 7A:
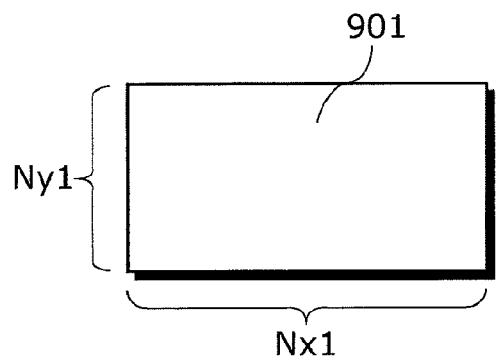
FIG. 7A is a diagram showing dimensions of an original image used for display in an HMD in the first embodiment of the present invention.
Figure 7B:
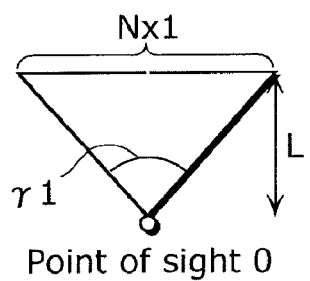
FIG. 7B is a diagram showing a horizontal view angle of the original image shown in FIG. 7A.
Figure 7C:
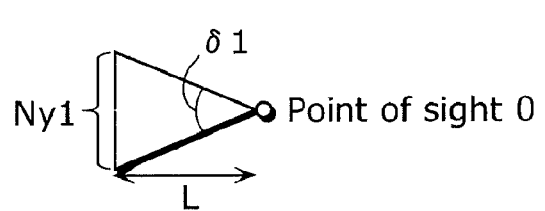
FIG. 7C is a diagram showing a vertical view angle of the original image shown in FIG. 7A.

An original image 901 shown in FIGS. 7A to 7C is an image that the HMD in FIG. 1 displays to the user, and has horizontal resolution Nx1, vertical resolution Ny1, and a frame rate fps1. In addition, it is assumed that a horizontal view angle is γ1, and a vertical view angle is δ1 when this image is visually recognized with the HMD in FIG. 1.

Figure 8A:
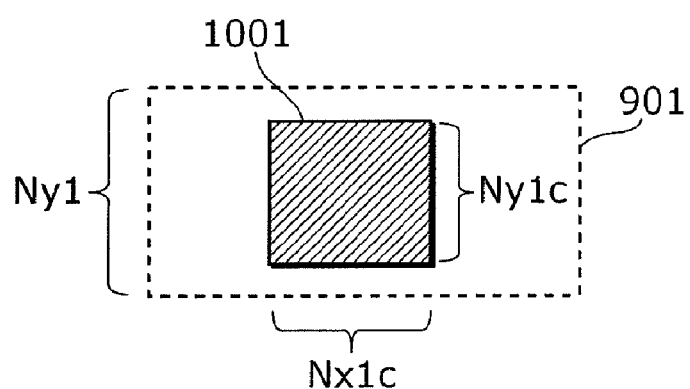
FIG. 8A is a diagram showing dimensions of a center image used for display in an HMD in the first embodiment of the present invention.
Figure 8B:
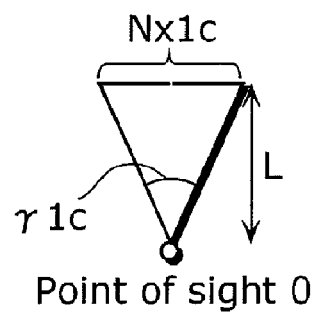
FIG. 8B is a diagram showing a horizontal view angle of the center image shown in FIG. 8A.
Figure 8C:
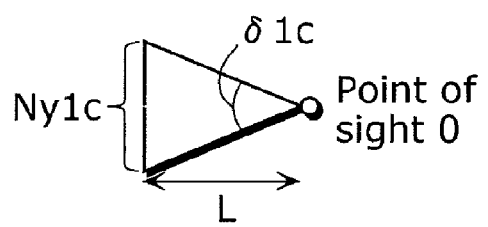
FIG. 8C is a diagram showing a vertical view angle of the center image shown in FIG. 8A.

The scan field setting unit 1051 determines, as shown in FIG. 8, an image range to be displayed as the center image 1001 of the original image 901. In the present embodiment, the scan field setting unit 1051 determines a range having a horizontal view angle $γ1_c$ and a vertical view angle $δ1_c$ when the center image 1001 is visually recognized with the HMD.

At this time, the horizontal resolution $Nx1_c$ and the vertical resolution $Ny1_c$ of the center image 1001 are calculated using Expressions (5) and (6), based on the relationship between the resolution and the view angle of the original image 901. Since it is possible to set values for the resolution Nx1 and Ny1 and values for the view angles γ1 and δ1 at the time of designing the HMD, these values are previously assigned to the left-eye control unit 105 in the present embodiment.

[Expression 5]

$$Hx1c = Nx1 \times \tan(γ1c/2)/\tan(γ½) \quad (5)$$

[Expression 6]

$$Ny1c = Ny1 \times \tan(δ1c/2)/\tan(δ½) \quad (6)$$

When the values of the resolution $Nx1_c$ and $Ny1_c$ of the center image 1001 are calculated, the scan field setting unit 1051 determines a region having the resolution $Ny1_c$ in height and $Nx1_c$ in width as the center image 1001, which is an image in the central visual field.

Note that the values of the resolution Nx1 and Ny1 of the original image 901 may also be calculated by causing the left-eye control unit 105 to analyze the image or may also be calculated from the metadata appended to the original image 901. For the method of calculating the view angles γ1 and δ1 of the original image 901, the shape of the laser beam projected by the scan units 103 and 108 onto the deflection units 104 and 107 may be captured using a camera and so on, and then the view angles γ1 and δ1 may be calculated by the left-eye control unit 105, based on the captured shape. In this case, it is possible to calculate the view angles γ1 and δ1 accurately even when the positional relationship between the scan units 103 and 108 and the deflection units 104 and 107 is changed.

Figure 9A:
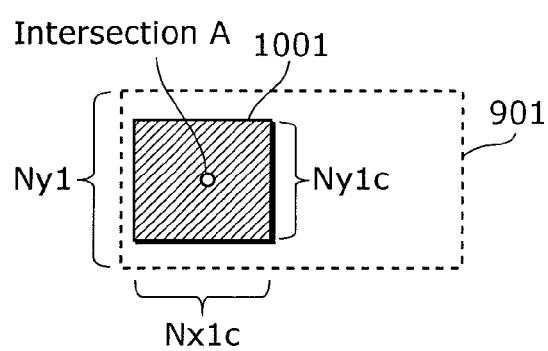
FIG. 9A is a diagram showing an example of setting a center image based on the position of the user's line of sight as a center.
Figure 9B:
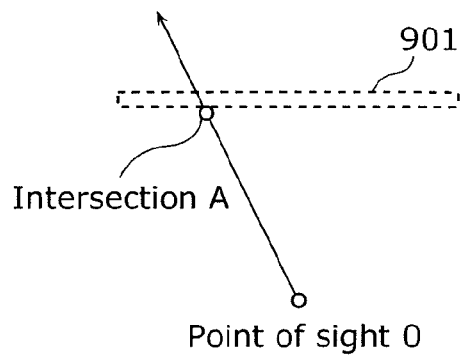
FIG. 9B is a diagram showing a relationship between the original image in FIG. 9A and the user's line of sight.

Note that the scan field setting unit 1051 may determine the region that is to be the center image 1001, based on the position of the user's line of sight detected by the light detection unit 214. For example, as shown in FIGS. 9A and 9B, a point at which the user's line of sight detected by the light detection unit 214 intersects the original image 901 is calculated as an intersection A (line-of-sight position). Then, the region including the intersection A and having the horizontal resolution $Nx1_c$ and vertical resolution $Ny1_c$ is determined as the center image 1001.

Step 803 Reducing Display Pixels

In this step, the resolution setting unit 1053 determines the resolution for displaying the center image 1001 determined in the previous step and the original image 901.

When the resolution Nx1 and Ny1 of the original image 901 is higher than maximum resolution $Nx1_{max}$ and $Ny1_{max}$ displayable for the left-eye scan unit 103, the resolution setting unit 1053 generates a wide-field image having horizontal resolution $Nx1_{max}$ and vertical resolution $Ny1_{max}$ by reducing pixels of the original image 901. When the resolution of the original image 901 is equal to or lower than the resolution $Nx1_{max}$ and $Ny1_{max}$ displayable for the left-eye scan unit 103, the original image 901 is set as a wide-field image.

It is assumed that the right-eye scan unit 108, on the side on which the center image 1001 is displayed, scans the laser beam at scan angles (the first scan angles) of a horizontal scan angle $α1_c$ and a vertical scan angle $β1_c$, so as to display an image having the horizontal view angle $γ1_c$ and vertical view angle $δ1_c$. Since the relationship between the view angles $γ1_c$ and $δ1_c$ and the scan angles $α1_c$ and $β1_c$ is set at the time of designing the HMD shown in FIG. 1, the left-eye control unit 105 calculates the value of the scan angles with respect to the view angles by previously holding a table regarding the relationship between the view angles $\gamma 1_c$ and $\delta 1_c$ and the scan angles $\alpha 1_c$ and $\beta 1_c$ in the storage unit (not shown).

When the right-eye scan unit 108 scans the laser beam at the horizontal scan angle $\alpha 1_c$ and the vertical scan angle $\beta 1_c$, assuming that displayable horizontal resolution is $Nx1_{cmax}$ and vertical resolution is $NY1_{cmax}$, $Nx1_{cmax}$ and $NY1_{cmax}$ are calculated in accordance with Expressions (7) and (8).

[Expression 7]

$$Nx1cmax = Nx1max \times \alpha 1c/\alpha 1 \qquad (7)$$

[Expression 8]

$$Ny1cmax = Ny1max \times \beta 1c/\beta 1 \qquad (8)$$

When the resolution $Nx1_c$ and $Ny1_c$ of the center image 1001, which is calculated in the previous step, is higher than the horizontal resolution $Nx1_{cmax}$ and vertical resolution $Ny1_{cmax}$, the resolution setting unit 1053 performs processing for reducing pixels of the center image 1001 and then determines, as a narrow-field image, an image having the horizontal resolution $Nx1_{cmax}$ and vertical resolution $Ny1_{cmax}$. In addition, in the case where the resolution $Nx1_c$ and $Ny1_c$ of the center image 1001 is equal to or lower than the resolution $Nx1_{cmax}$ and $Ny1_{cmax}$, the center image 1001 is determined as a narrow-field image.

Step 804 Determining the Frame Rate

In this step, the frame rate setting unit 1504 determines a frame rate for displaying the wide-field image and the narrow-field image obtained in the previous step.

Here, in the case of driving the right-eye scan unit 108 at the scan angles $\alpha 1_c$ and $\beta 1_c$, it is assumed that a maximum horizontal drive frequency is $Hx1_{max}$ and a maximum vertical drive frequency is $Hy1_{max}$. The frame rate setting unit 1054 calculates values of these maximum drive frequencies $Hx1_{max}$ and $Hy1_{max}$ corresponding to the scan angles by previously holding a table regarding the relationship between the scan angle and the drive frequency in the storage unit.

At this time, the frame rate setting unit 1054 sets the frame rate $fps1_w$ of the wide-field image to a value $2 \times Hy1$, and the frame rate $fps1_n$ of the narrow-field image to a value $2 \times Hy1_{max}$ in accordance with Expression (1) representing the above-described relationship between the frame rate and the vertical drive frequency of the scan units 103 and 108.

As described earlier, the left-eye scan unit 103 displays to the user a wide-field image having the horizontal view angle $\gamma 1$ and the vertical view angle $\delta 1$ by scanning the laser beam at the horizontal scan angle $\alpha 1$ and vertical scan angle $\beta 1$. In addition, the right-eye scan unit 108 displays to the user a narrow-field image having the horizontal view angle $\gamma 1_c$ and the vertical view angle $\delta 1_c$ by scanning the laser beam at the horizontal scan angle $\alpha 1_c$ and vertical scan angle $\beta 1_c$.

Figure 10:
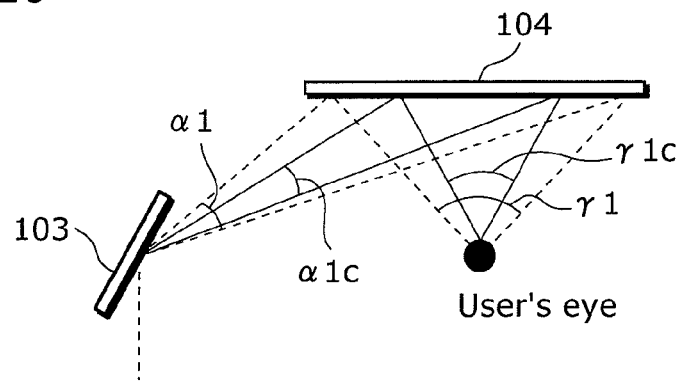
FIG. 10 is a diagram showing the relationship between a horizontal scan angle of a scan unit and a horizontal view angle of an image presented to the user in the first embodiment of the present invention.

FIG. 10 shows the relationship between these horizontal angles $\alpha 1$, $\alpha 1_c$, $\gamma 1$, and $\gamma 1_c$ of the scan units 103 and 108. As shown in this figure, the scan angle $\alpha 1$ (the second scan angle) required for displaying an image having the view angle $\gamma 1$ is larger than the scan angle $\alpha 1_c$ (the first scan angle) required for displaying an image having the view angle $\gamma 1_c$. Likewise, in the vertical direction, the vertical scan angle $\beta 1$ (the second scan angle) is larger than $\beta 1_c$ (the first scan angle). Generally, it is possible to make the value of $Hy1_{max}$ larger than $Hy1$ because the smaller the scan angle, the higher the drive frequency of the scan units 103 and 108 can be made.

As described earlier, the relationship represented by Expression (1) is established between the frame rate fps of the image and the vertical drive frequency Hy. This allows setting the frame rate $fps1_n$ of the narrow-field image higher than the frame rate $fps1_w$ of the wide-field image.

Note that a sensor may be attached to the scan units 103 and 108 to thereby measure the values of the drive frequencies when the scan units 103 and 108 are driven at predetermined scan angles, and the measured values may be notified to the left-eye control unit 105. In this case, it is possible to detect actual drive frequencies of the scan units 103 and 108, thus allowing more accurate determination of the frame rate.

Step 805 Image Control

In this step, the control units 105 and 111 control the light sources 101 and 110, the wavefront shape changing units 102 and 109, and the scan units 103 and 108 in accordance with the resolution and the frame rate of the wide-field image and the narrow-field image, which are determined in the previous step.

The right-eye control unit 111 performs control such that the right-eye light source 110, which is provided on the side on which an image corresponding to the central visual field of the user is displayed, emits a laser beam corresponding to the narrow-field image. In addition, the right-eye control unit 111 also performs control such that the right-eye scan unit 108 performs scanning at the horizontal scan angle $\alpha 1_c$, vertical scan angle $\beta 1_c$, horizontal drive frequency $Hx1_{max}$, and vertical drive frequency $Hy1_{max}$.

The left-eye control unit 105 performs control such that the left-eye light source 101, which is provided on the side on which an entire image is displayed, emits a laser beam corresponding to the wide-field image. In addition, the left-eye control unit 105 also performs control such that the left-eye scan unit 103 performs scanning at the horizontal scan angle $\alpha 1$, vertical scan angle $\beta 1$, horizontal drive frequency $Hx1$, and vertical drive frequency $Hy1$.

At this time, an example of the image visually recognized by the user is shown using FIGS. 11 to 14. Note that for the sake of simplicity, the figures show an example in which the frame rate fps1 of the original image 901 and the frame rate $fps1_n$ of the narrow-field image are equal, and the value of $fps1_w$ of the wide-field image is half the value of the $fps1_n$.

Figure 11:
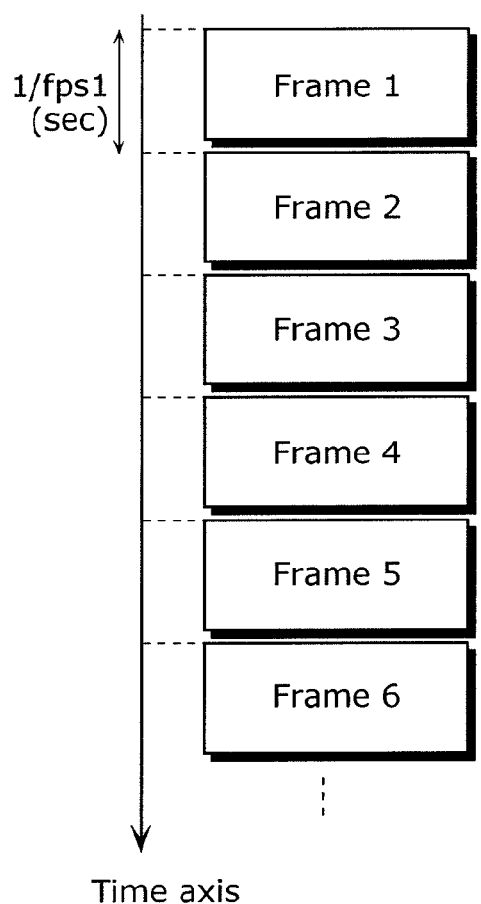
FIG. 11 is a diagram showing frames of an original image used for display in the HMD in the first embodiment of the present invention.

FIG. 11 shows the original image 901, and each frame is switched at an interval of 1/fps1.

Figure 12:
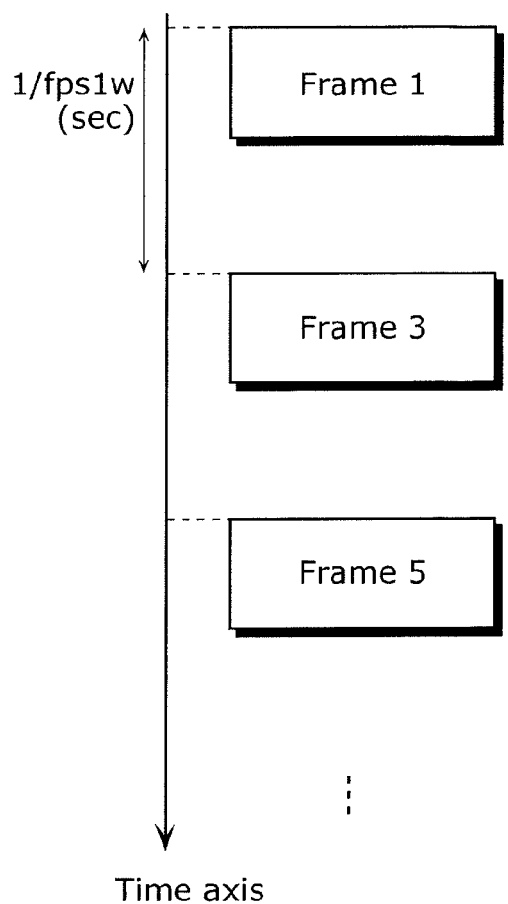
FIG. 12 is a diagram showing display frames of a wide-field image used for display in the HMD in the first embodiment of the present invention.

FIG. 12 shows a display of the wide-field image, and the left-eye control unit 105 performs control such that $fps1_w$/fps1 frames are extracted from the frames of the original image 901 and displayed at the frame rate $fps1_w$. In this example, since $fps1_w$/fps1 is 0.5, half of the frames of the original image 901 are selected and displayed.

Figure 13:
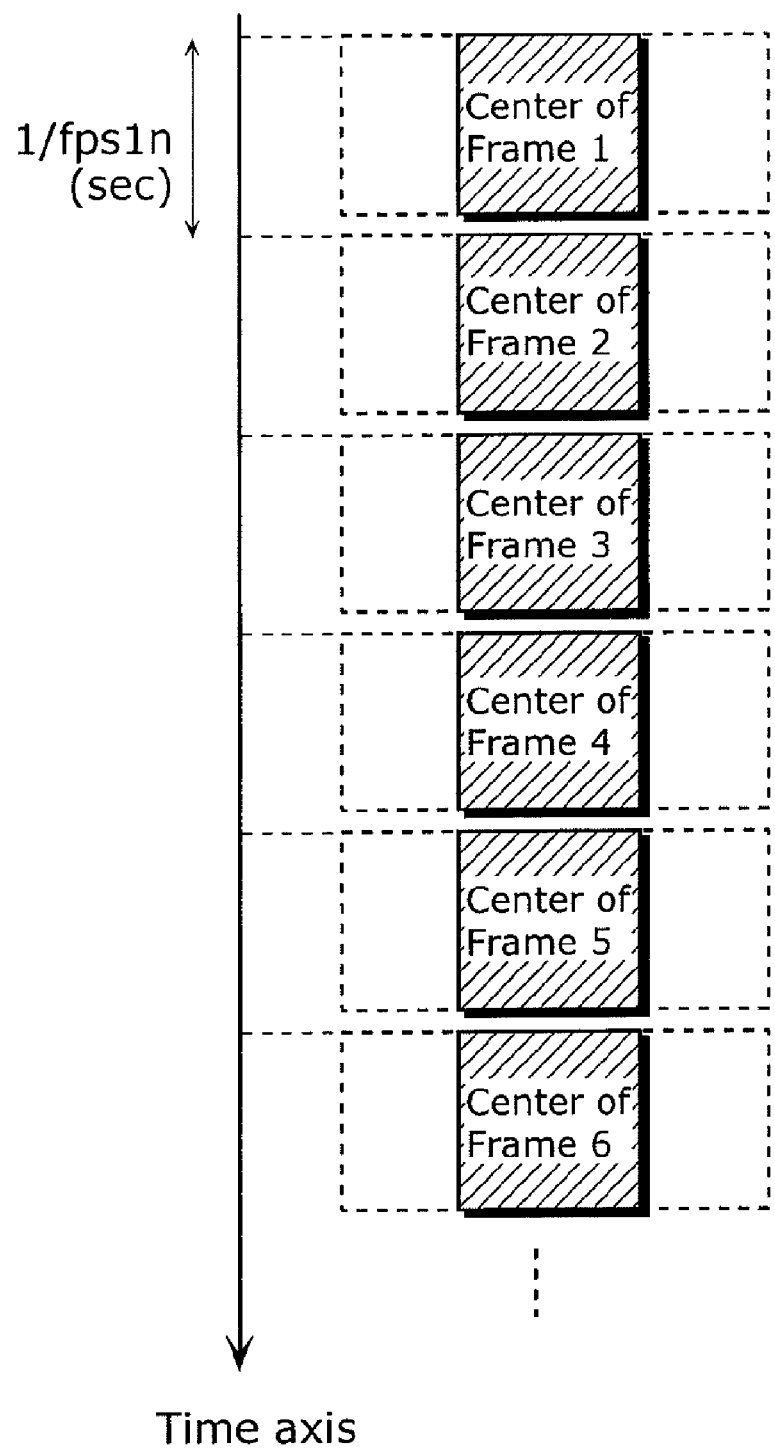
FIG. 13 is a diagram showing display frames of a narrow-field image used for display in the HMD in the first embodiment of the present invention.

FIG. 13 shows a display of a narrow-field image, and the right-eye control unit 111 performs control such that $fps1_n$/fps1 frames are extracted from the frames of the original image 901, and that the central portion of the image is displayed at the frame rate $fps1_n$. In this example, since $fps1_n$/fps1 is 1, all the frames of the original image 901 are selected and displayed.

Figure 14:
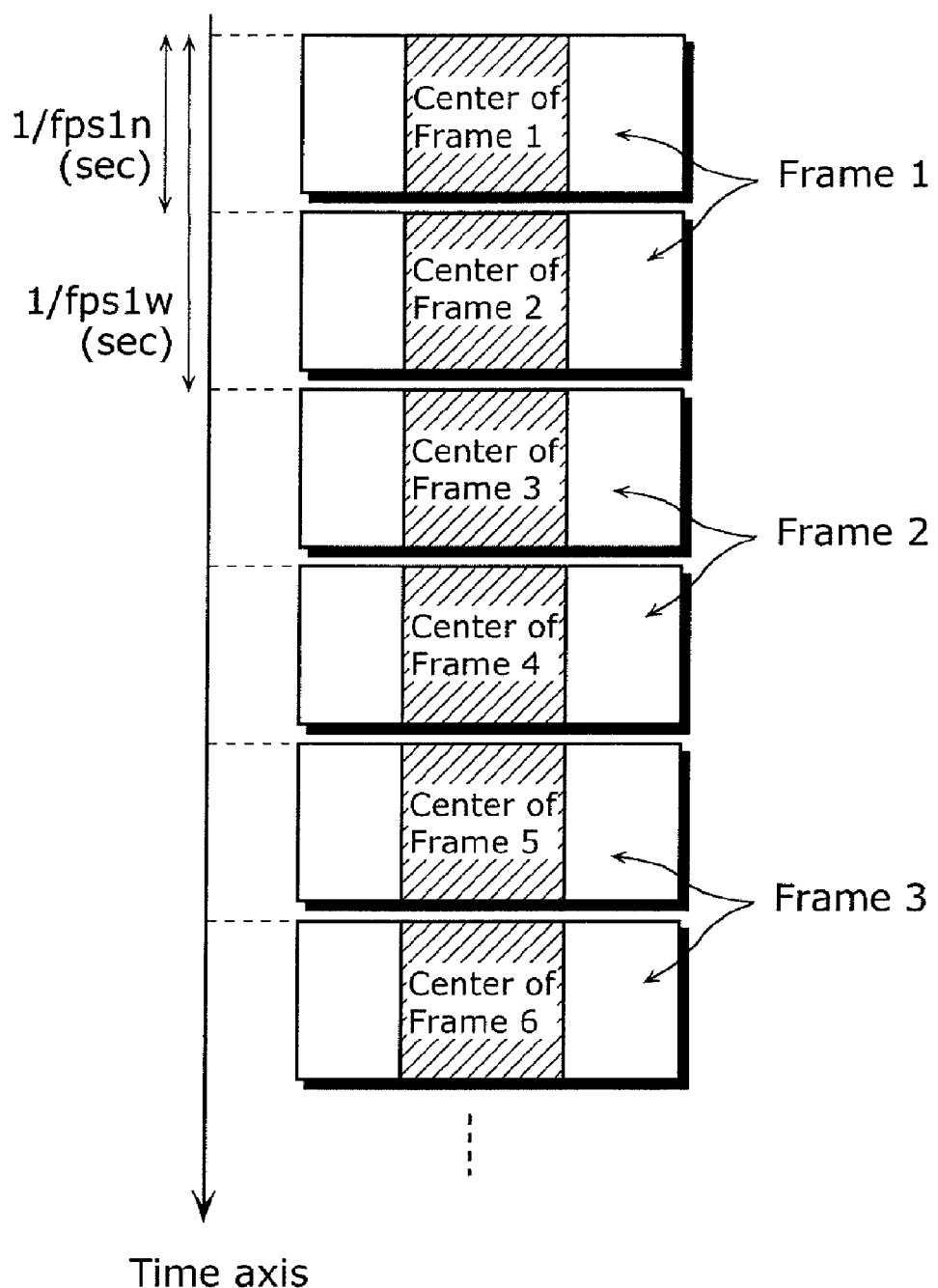
FIG. 14 is a diagram showing frames of an image visually recognized by the user with the image fusion effect of both eyes in the first embodiment of the present invention.

FIG. 14 shows an image recognized by the user with the image fusion effect of both eyes, as a result of display onto the left eye as shown in FIG. 12 and display onto the right eye as shown in FIG. 13.

As shown in FIG. 14, the user visually recognizes images, in each of which the center image 1001 is displayed at a high frame rate of fps1$_n$ (the first frame rate), and the other portion is displayed at a low frame rate of fps1$_w$ (the second frame rate). In the central portion perceived with clear vision, an image giving less afterimage to the user is displayed by increasing the frame rate, and in a portion perceived with less clear vision, a wide-field image is displayed at a lower frame rate, so that the user feels the image with a wider field of view.

Note that the order of executing Steps 803 and 804 may also be reversal, or the processing in these steps may also be simultaneously performed.

In addition, in the present embodiment, the left-eye control unit 105 determines the display method, but the display method may also be determined by the right-eye control unit 111, or such processing may also be shared by the two control units 105 and 111.

Second Embodiment

In the present embodiment, the case where the structure of the mirror device is different between the left and right scan units 103 and 108 shall be shown. Hereinafter, it is assumed that the left-eye scan unit 103 is a wide-field scan unit, and that the right-eye scan unit 108 is a narrow-field scan unit.

Figure 15:
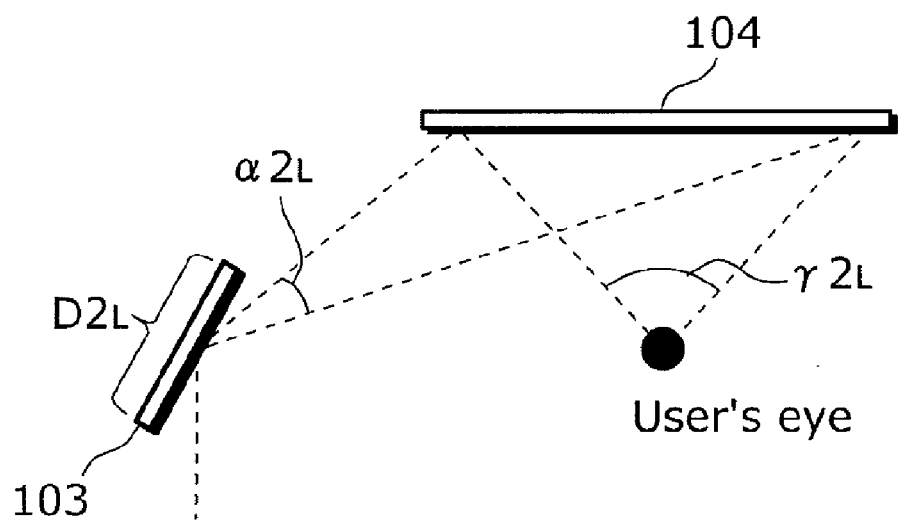
FIG. 15 is a schematic layout of a wide-field scan unit and a deflection unit in a second embodiment of the present invention.

As shown in FIG. 15, the left-eye scan unit 103 as the wide-field scan unit is designed to be capable of scanning a laser beam incident from the left-eye light source 101 at a horizontal scan angle of α2$_L$ degrees and a vertical scan angle of β2$_L$ degrees, and to display an image having horizontal resolution Nx2$_L$ and vertical resolution Ny2$_L$. In addition, it is assumed that the horizontal drive frequency of the left-eye scan unit 103 is Hx2$_L$ and the vertical drive frequency is Hy2$_L$, and the resolution per one scan angle is ΔNx$_L$ and ΔNy$_L$. Furthermore, the diameter of a single-plate mirror included in the left-eye scan unit 103 is assumed to be D2$_L$.

Figure 16:
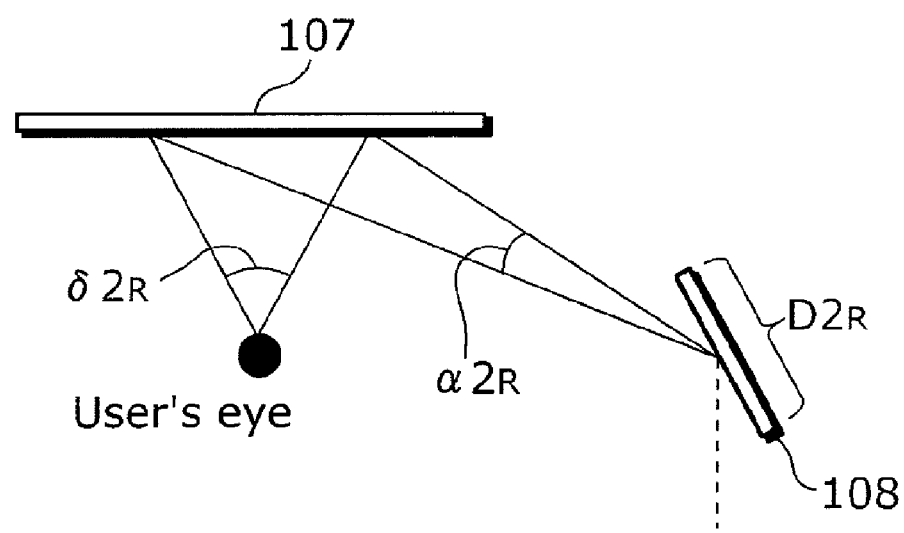
FIG. 16 is a schematic layout of a narrow-field scan unit and a deflection unit in the second embodiment of the present invention.

As shown in FIG. 16, the right-eye scan unit 108 as the narrow-field scan unit is designed to be capable of scanning a laser beam incident from the right-eye light source 110 at a horizontal scan angle of α2$_R$ degrees and a vertical scan angle of β2$_R$ degrees, and to display an image having horizontal resolution Nx2$_R$ and vertical resolution Ny2$_R$. In addition, it is assumed that the horizontal drive frequency of the right-eye scan unit 108 is Hx2$_R$ and the vertical drive frequency is Hy2$_R$, and the resolution per one scan angle is ΔNx$_R$ and ΔNy$_R$. Furthermore, the diameter of the single-plate mirror included in the right-eye scan unit 108 is assumed to be D2$_R$.

Figure 17A:
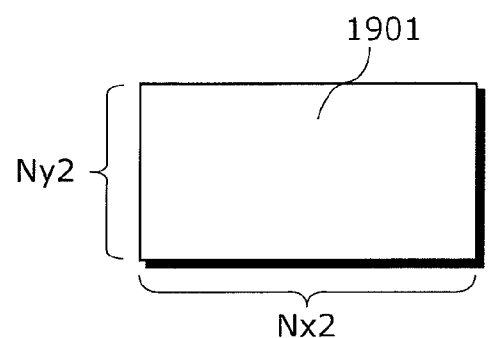
FIG. 17A is a diagram showing dimensions of an original image used for display in an HMD in the second embodiment of the present invention.
Figure 17B:
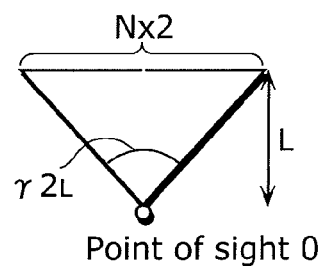
FIG. 17B is a diagram showing a horizontal view angle of the original image shown in FIG. 17A.
Figure 17C:
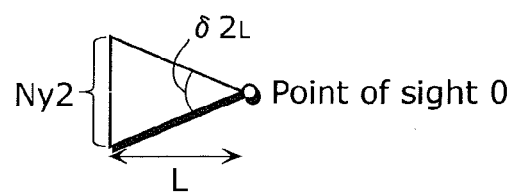
FIG. 17C is a diagram showing a vertical view angle of the original image shown in FIG. 17A.

FIGS. 17A to 17C show an original image 1901 that is displayed to the user. The horizontal resolution of the original image 1901 is Nx2, and the vertical resolution is Ny2. In addition, the frame rate of the original image 1901 is fps2. In the present embodiment, when the left-eye scan unit 103 scans the laser beam at the horizontal scan angle α2$_L$ and the vertical scan angle β2$_L$, an image visually recognized by the user with the laser-scan HMD shown in FIG. 1 is designed to have a horizontal view angle γ2$_L$ and a vertical view angle δ2$_L$. FIG. 15 shows a relationship between the horizontal scan angle α2$_L$ of the left-eye scan unit 103 and the horizontal view angle γ2$_L$ that is visually recognized by the user.

In the present embodiment, the scan angles α2$_R$ and β2$_R$ are designed such that, when the right-eye scan unit 108 scans the laser beam at the horizontal scan angle α2$_R$ and the vertical scan angle β2$_R$, an image visually recognized by the user with the laser-scan HMD shown in FIG. 1 is designed to have a horizontal view angle γ2$_R$ and a vertical view angle δ2$_R$. FIG. 16 shows a relationship between the horizontal scan angle α2$_R$ of the right-eye scan unit 103 and the horizontal view angle γ2$_R$ that is visually recognized by the user.

Here, the right-eye scan unit 108 is designed to display a high-definition image having a narrower view than the image displayed by the left-eye scan unit 103. Therefore, the diameter D2$_R$ of the mirror in the right-eye scan unit 108 is designed to be larger than the diameter D2$_L$ of the mirror in the left-eye scan unit 103.

The resolution that can be achieved using the mirror device is proportional to the scan angle and the mirror size. Thus, the right-eye scan unit 108 having a larger mirror size has higher resolution per scan angle (ΔNx$_R$>ΔNx$_L$, ΔNy$_R$>ΔNy$_L$). That is, in the present embodiment, the image displayed by the right-eye scan unit 108 is displayed with finer pixels than the image displayed by the left-eye scan unit 103.

Figure 19:
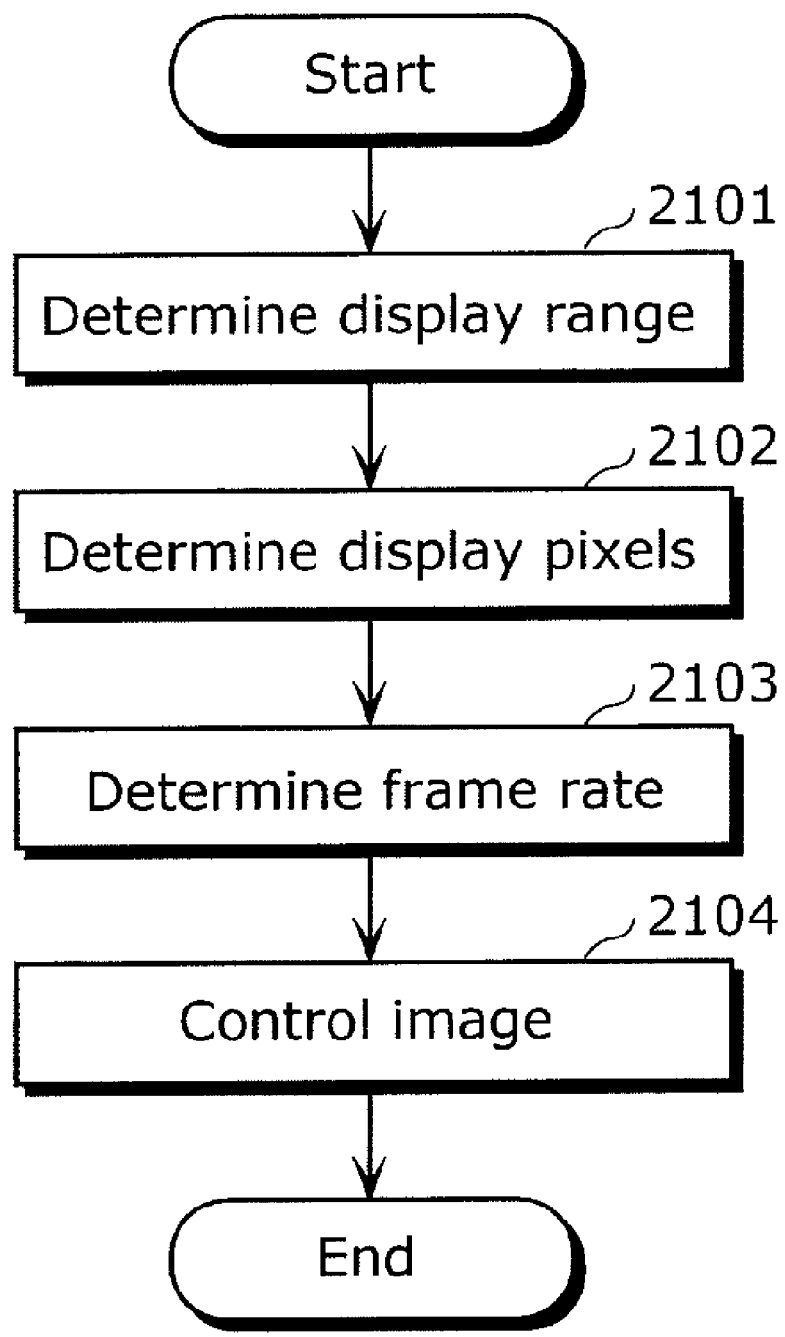
FIG. 19 is a flowchart of processing for improving virtual resolution of a display image in the embodiment of the present invention.

Shown below is an example of improving the virtual resolution of the display image by changing the displays on the right and left. This processing is performed in Steps 2101 to 2104 shown in FIG. 19.

Step 2101 Selecting the Center Image

In this step, of the entire image to be displayed to the user, a region to be displayed as a center image 2001 is determined.

Figure 18A:
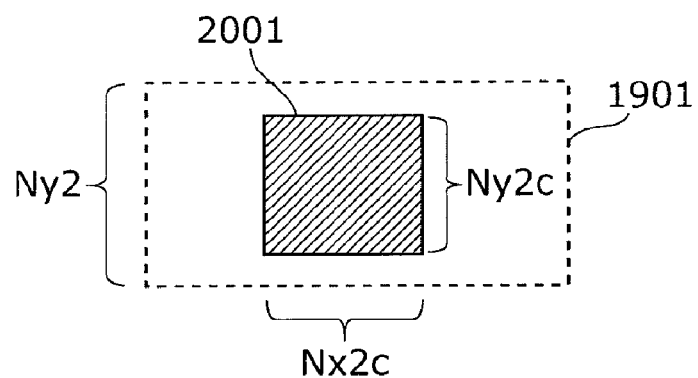
FIG. 18A is a diagram showing dimensions of a center image used for display in the HMD in the second embodiment of the present invention.
Figure 18B:
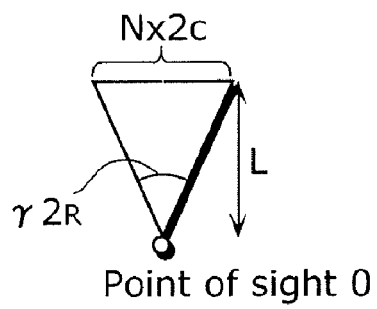
FIG. 18B is a diagram showing a horizontal view angle of the center image shown in FIG. 18A.
Figure 18C:
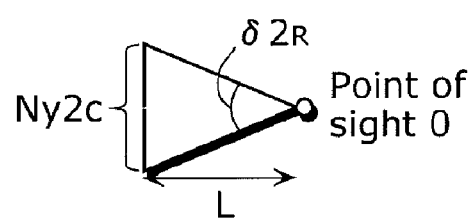
FIG. 18C is a diagram showing a vertical view angle of the center image shown in FIG. 18A.

The scan field setting unit 1051 determines, as shown in FIGS. 18A to 18C, an image range to be displayed as the center image 2001 of an original image 1901. In the present embodiment, the scan field setting unit 1051 determines a range having a horizontal view angle γ2$_R$ and a vertical view angle δ2$_R$ when the center image 2001 is visually recognized with the HMD.

At this time, the horizontal resolution Nx2$_c$ and the vertical resolution Ny2$_c$ of the center image 2001 are calculated based on the relationship between the resolution and the view angle of the original image 1901, using Expressions (9) and (10). Since it is possible to set the values of the resolution Nx2 and Ny2 and the values of the view angles γ2$_L$ and δ2$_L$ at the time of designing the HMD, the values are previously assigned to the left-eye control unit 105 in the present embodiment.

[Expression 9]

$$Nx2c = Nx2 \times \tan(\gamma 2R/2)/\tan(\gamma 2L/2) \quad (9)$$

[Expression 10]

$$Ny2c = Ny2 \times \tan(\delta 2R/2)/\tan(\delta 2L/2) \quad (10)$$

When the values of the resolution Nx2$_c$ and Ny2$_c$ of the center image 2001 are calculated, the scan field setting unit 1051 determines a range having the resolution of Ny2$_c$ in height and Nx2$_c$ in width as the center image 2001 that is the image in the central visual field, centering on the pixels in the center of the original image 1901.

Note that the values of the resolution Nx2 and Ny2 of the original image 1901 may be calculated by causing the left-eye control unit 105 to analyze the image or may be calculated from the metadata appended to the original image 1901. For the method of calculating the view angles γ2$_L$ and δ2$_L$ of the original image 1901, the shape of the laser beam projected onto the deflection units 104 by the left-eye scan unit 103 may be captured using a camera or the like, and then the view angles γ2$_L$ and δ2$_L$ may be calculated by the left-eye control unit 105, based on the captured shape. In this case, it is possible to accurately calculate the view angles γ2$_L$ and δ2$_L$ even when the positional relationship between the scan unit 103 and the deflection units 104 is changed.

Note that, by using the light detection unit 214, a region to be the center image 2001 may be determined, based on the user's line of sight, in the same manner as described in the first embodiment.

Step 2102 Reducing the Resolution

In this step, the resolution setting unit 1053 determines the resolution for displaying the center image 2001 determined in the previous step and the original image 1901.

When the resolution Nx2 and Ny2 of the original image 1901 is higher than the resolution $Nx2_L$ and $Ny2_L$ displayable for the left-eye scan unit 103, the resolution setting unit 1053 generates a wide-field image having the horizontal resolution $Nx2_L$ and the vertical resolution $Ny2_L$ by reducing pixels of the original image 1901. When the resolution Nx2 and Ny2 of the original image 1901 is equal to or lower than the resolution $Nx2_L$ and $Ny2_L$ that can be displayed by the left-eye scan unit 103, the original image 1901 is set as a wide-field image.

In addition, when the resolution $Nx2_c$ and $Ny2_c$ of the center image 2001, which is calculated in the previous step, is higher than the resolution $Nx2_R$ and $Ny2_R$ displayable for the right-eye scan unit 108, the resolution setting unit 1053 performs processing for reducing the pixels of the center image 2001, and generates a narrow-field image having the horizontal resolution $Nx2_R$ and the vertical resolution $Ny2_R$. In addition, when the resolution $Nx2_c$ and $Ny2_c$ of the center image 2001 is equal to or lower than the resolution $Nx2_R$ and $Ny2_R$ that is displayable for the right-eye scan unit 108, the center image 2001 is determined as a narrow-field image.

Step 2103 Frame Rate

In this step, the frame rate setting unit 1504 determines the frame rate for displaying the wide-field image and the narrow-field image obtained in the previous step.

The frame rate setting unit 1054 sets the frame rate $fps2_w$ of the wide-field image to a value of $2 \times Hy2_L$, and the frame rate $fps2_n$ of the narrow-field image to a value of $2 \times Hy2_R$ in accordance with the Expression (1) representing the above-described relationship between the frame rate and the vertical drive frequency of the scan units 103 and 108.

Step 2104 Image Control

In this step, the control units 105 and 111 control the light sources 101 and 100, the wavefront shape changing units 102 and 109, and the scan units 103 and 108 in accordance with the resolution and the frame rate of the narrow-field image and the wide-field image, which are determined in the previous step.

The right-eye control unit 111 performs control such that the right-eye light source 110, which corresponds to the central visual field of the user and is provided on the side on which the center image 2001 is displayed, emits a laser beam corresponding to the narrow-field image. In addition, the right-eye control unit 111 also performs control such that the right-eye scan unit 108 performs scanning at the horizontal scan angle $\alpha 2_R$, vertical scan angle $\beta 2_R$, horizontal drive frequency $Hx2_R$, and vertical drive frequency $Hy2_R$.

The left-eye control unit 105 performs control such that the left-eye light source 101, which is provided on the side on which the entire image is displayed, emits a laser beam corresponding to the wide-field image. In addition, the left-eye control unit 105 performs control such that the left-eye scan unit 103 performs scanning at the horizontal scan angle $\alpha 2_L$, vertical scan angle $\beta 2_L$, horizontal drive frequency $Hx2_L$, and vertical drive frequency $Hy2_L$.

An example of the image visually recognized by the user at this time is shown using FIGS. 20 to 23. Note that for the sake of simplicity, the figures show an example in which the frame rate fps2 of the original image 1901, the frame rate fps2 of the wide-field image, and the frame rate $fps2_n$ of the narrow-field image are equal.

Figure 20:
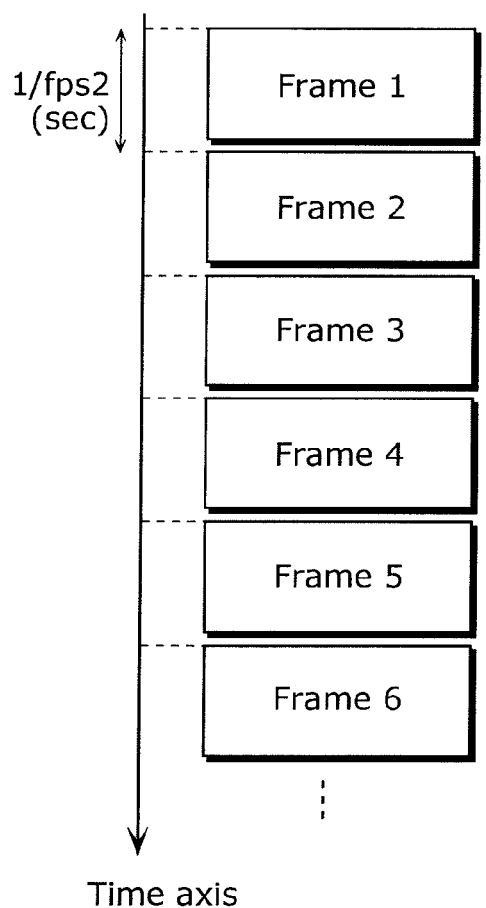
FIG. 20 is a diagram showing frames of an original image used for display in the HMD in the second embodiment of the present invention.

FIG. 20 shows the original image 1901, of which each frame is switched at an interval of 1/fps2.

Figure 21:
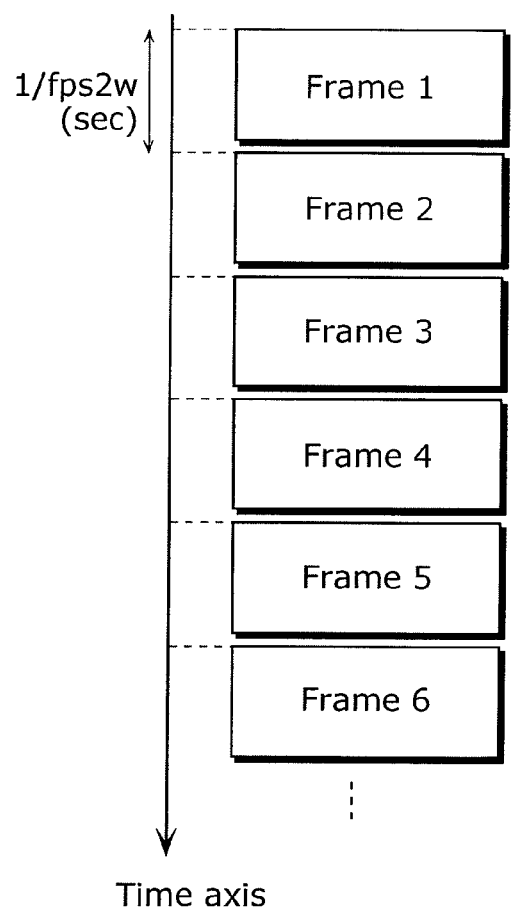
FIG. 21 is a diagram showing display frames of a wide-field image used for display in the HMD in the second embodiment of the present invention.

FIG. 21 shows a display of a wide-field image, and the left-eye control unit 105 performs control such that $fps2_w/fps2$ frames are extracted from the frames of the original image 1901 and displayed at the frame rate $fps2_w$. In this example, since $fps2_w/fps2$ is 1, all the frames of the original image 1901 are selected and displayed.

Figure 22:
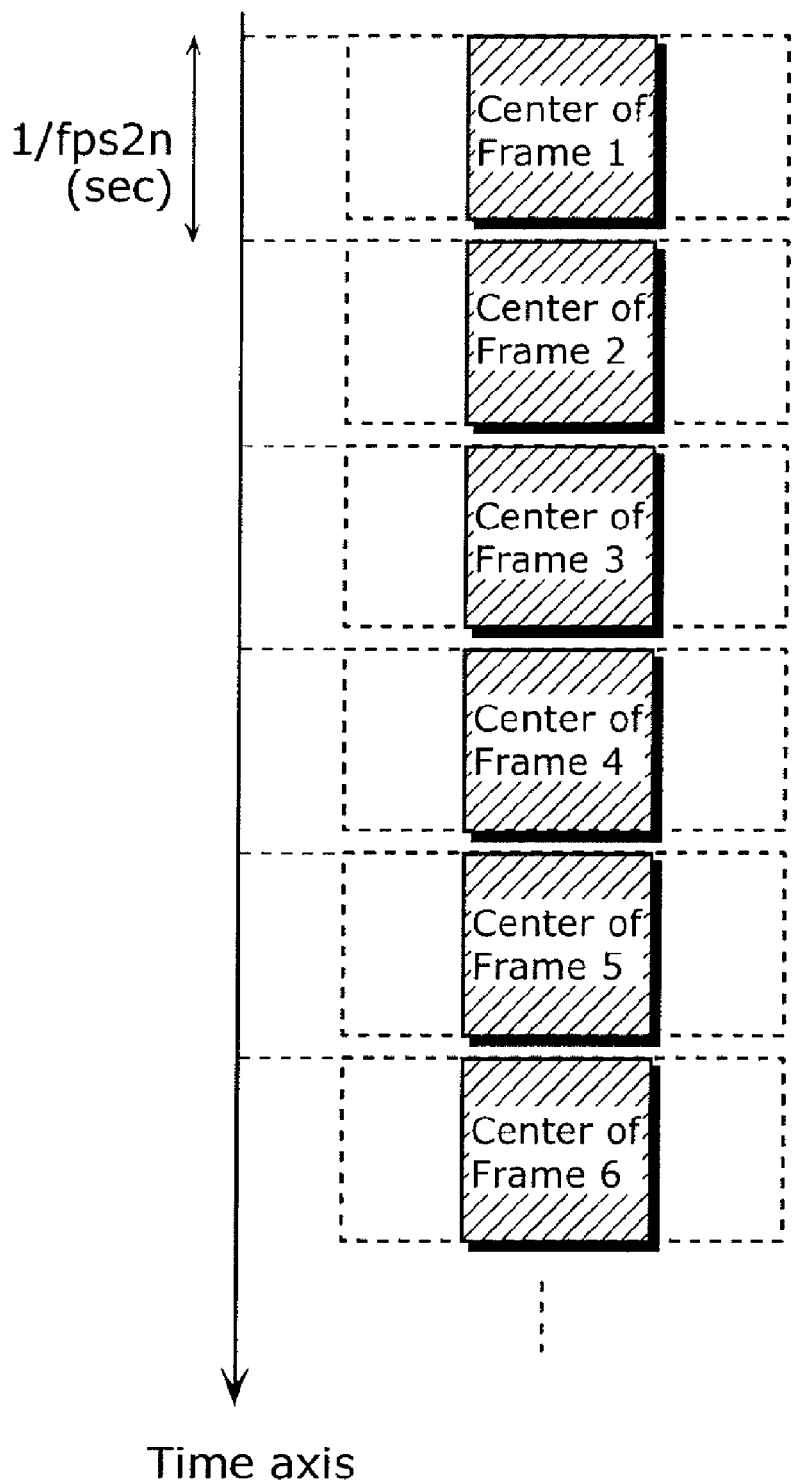
FIG. 22 is a diagram showing display frames of a narrow-field image used for display in the HMD in the second embodiment of the present invention.

FIG. 22 shows a display of a narrow-field image, and the right-eye control unit 111 performs control such that $fps2_n/fps2$ frames are extracted from the frames of the original image 1901, and the central portion of the image is displayed at the frame rate $fps2_n$. In this example, since $fps2_n/fps2$ is 1, all the frames of the original image 1901 are selected and displayed.

Figure 23:
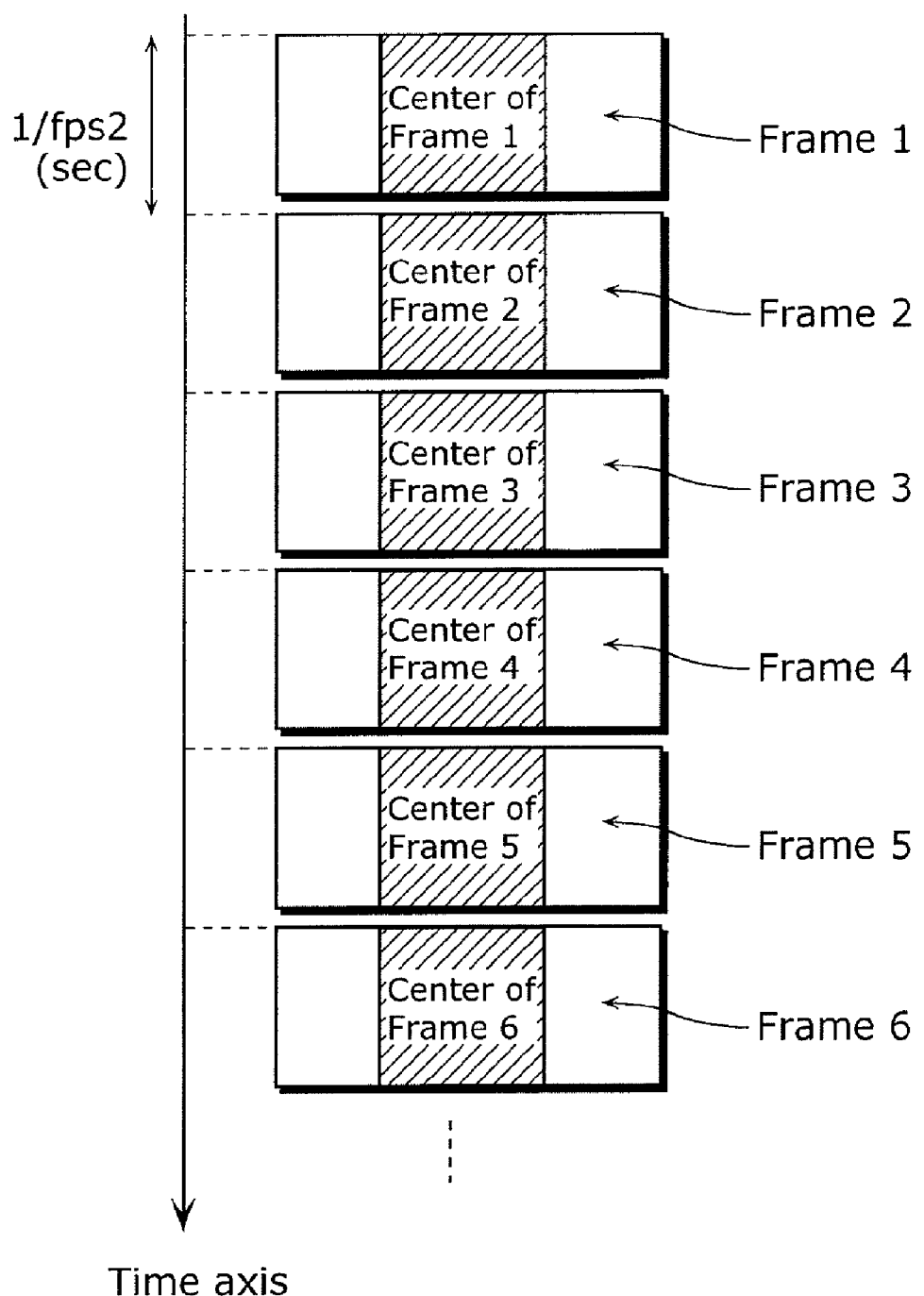
FIG. 23 is a diagram showing frames of an image visually recognized by the user with the image fusion effect of both eyes in the second embodiment of the present invention.

FIG. 23 shows an image recognized by the user, as a result of display onto the left eye as shown in FIG. 21 and display onto the right eye as shown in FIG. 22, due to the image fusion effect of both eyes.

As shown in FIG. 23, the user visually recognizes images, in each of which the center image is displayed at a high frame rate (the first frame rate), and the other portion is displayed at a low frame rate (the second frame rate). In the central portion perceived with clear vision, a high-definition image is displayed to the user by increasing the resolution, and in a portion perceived with less clear vision, a wide-field image is displayed with low resolution, so that the user feels the image with a wider field of view.

Note that the order of executing Steps 2102 and 2103 may also be reversal or the processing in the steps may also be simultaneously performed.

In addition, in the present embodiment, an example has been given in which a narrow-field image is displayed on the right eye and a wide-field image is displayed on the right eye, but the processing may also be performed switching the right and left. In this case, it is possible to display, to the user who can see better with the left eye, an image having higher resolution to the left eye having clearer vision.

In addition, in the present embodiment, the left-eye control unit 105 determines the display method, but the display method may also be determined by the right-eye control unit 111, or the processing may also be shared by the two control units 105 and 111.

Third Embodiment

In the present embodiment, shown below is a method for suppressing, by changing the shapes of respective images displayed onto both eyes, decrease of view angle which occurs in correcting trapezoidal distortion.

A goggle-type beam scan display apparatus (head-mounted display: HMD) in a third embodiment of the present invention shall be described with reference to FIGS. 1A, 1B, 2, and 24. Note that the structures shown in FIGS. 1A, 1B, and 2 are common to those in the first embodiment, and the description thereof shall therefore be omitted.

The control units 105 and 111 each include an integrated circuit which controls each unit of the HMD. The control units 105 and 111 control: laser emission from the light sources 101 and 110, and operations of the wavefront shape changing units 102 and 109 and of the scan units 103 and 108.

Figure 24:
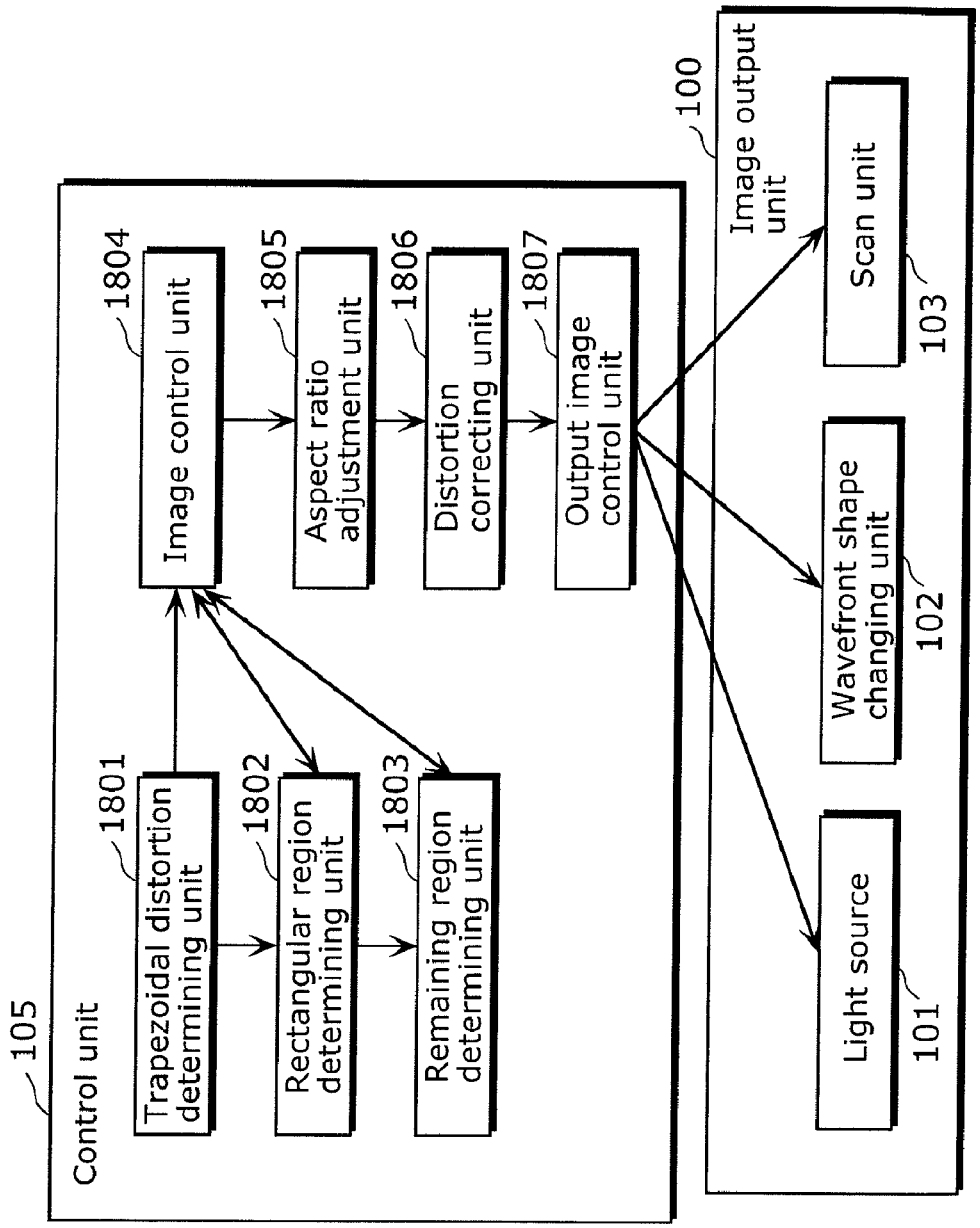
FIG. 24 is a functional block diagram of a beam scan display apparatus in a third embodiment of the present invention.

FIG. 24 shows a functional block diagram of the control unit 105. The control unit 105 includes: a trapezoidal distortion determining unit 1801, a rectangular region determining unit 1802, a remaining region determining unit 1803, an image control unit 1804, an aspect ratio adjustment unit 1805, a distortion correcting unit 1806, and an output image control unit 1807. Note that the control unit 111 has the same structure.

The trapezoidal distortion determining unit 1801 determines the shape of a left-eye distorted image in a trapezoidal shape resulting from oblique incidence of the beam scanned by the left-eye scan unit 103. Likewise, the trapezoidal distortion determining unit 1801 also determines the shape of a right-eye distorted image onto the right-eye deflection unit 107.

The rectangular region determining unit 1802 determines a left-eye rectangular region having a rectangular shape, which has, as a first side, a portion of a long side of the left-eye distorted image and has, as a second side, a line segment that is orthogonal to the first side and connects an endpoint of the first side and an oblique side of the left-eye distorted image. This is the same for the case where the right-eye image is projected onto the right-eye deflection unit 107 in a distorted shape.

The remaining region determining unit 1803 determines, as a left-eye remaining region, a trapezoidal region adjoining the left-eye rectangular region determined by the rectangular region determining unit 1802. Likewise, a trapezoidal region adjoining the right-eye rectangular region is determined as a right-eye remaining region.

The image control unit 1804 measures and compares image sizes, and exchanges control information with the trapezoidal distortion determining unit 1804, the rectangular region determining unit 1802, the remaining region determining unit 1803, and the aspect ratio adjustment unit 1805.

The aspect ratio adjustment unit 1805 generates a correction image by adjusting either the height or width of the original image such that the original image fits within a region that is a combination of the left-eye rectangular region and the right-eye rectangular region which are determined by the rectangular region determining unit 1802.

A distortion correcting unit 1806 generates a left-eye correction image, which is a (reversely-corrected) correction image previously distorted in a reverse direction so that the left-eye image is projected onto the left-eye deflection unit without distortion. The same processing is performed on the right eye side.

The output image control unit 1807 controls the light source 101 so that a portion corresponding to the left-eye rectangular region and the left-eye remaining region of the left-eye correction image is outputted. The same control is performed on the light source 110 on the right eye side.

Note that the control units 105 and 111 may include a communication unit, which is connected wirelessly to a peripheral device such as a cellular phone and receives a video and audio signal. The image control unit 1804 may also have a memory in which an image to be presented to the user is stored, or may also obtain, wirelessly, the image to be presented to the user from an external device.

Note that only one of the control units 105 and 111 may be provided, with the one of the control units 105 and 111 controlling the operations of: the light sources 101 and 110, the wavefront shape changing units 102 and 109, the scan units 103 and 108, and the headphone units 106 and 112, which correspond to both right and left eyes.

The headphones 106 and 112 each include a speaker so as to output sound. Note that the headphones 106 and 112 may include a battery to supply power to each of the units in the HMD.

Note that each unit and function in FIG. 1 may be or may not be embedded in a single HMD. For example, all the units in FIG. 1 may be included in the single HMD, or the headphones 106 and 112 need not be provided. In addition, the respective units may be dispersedly provided. For example, the control units 105 and 111 may be partially included in the scan units 103 and 108 or in the wavefront shape changing units 102 and 109. Each unit in FIG. 1 may also be shared by plural devices. For example, the light sources 211, 212, and 213 may also be shared by two HMDs.

Figure 25:
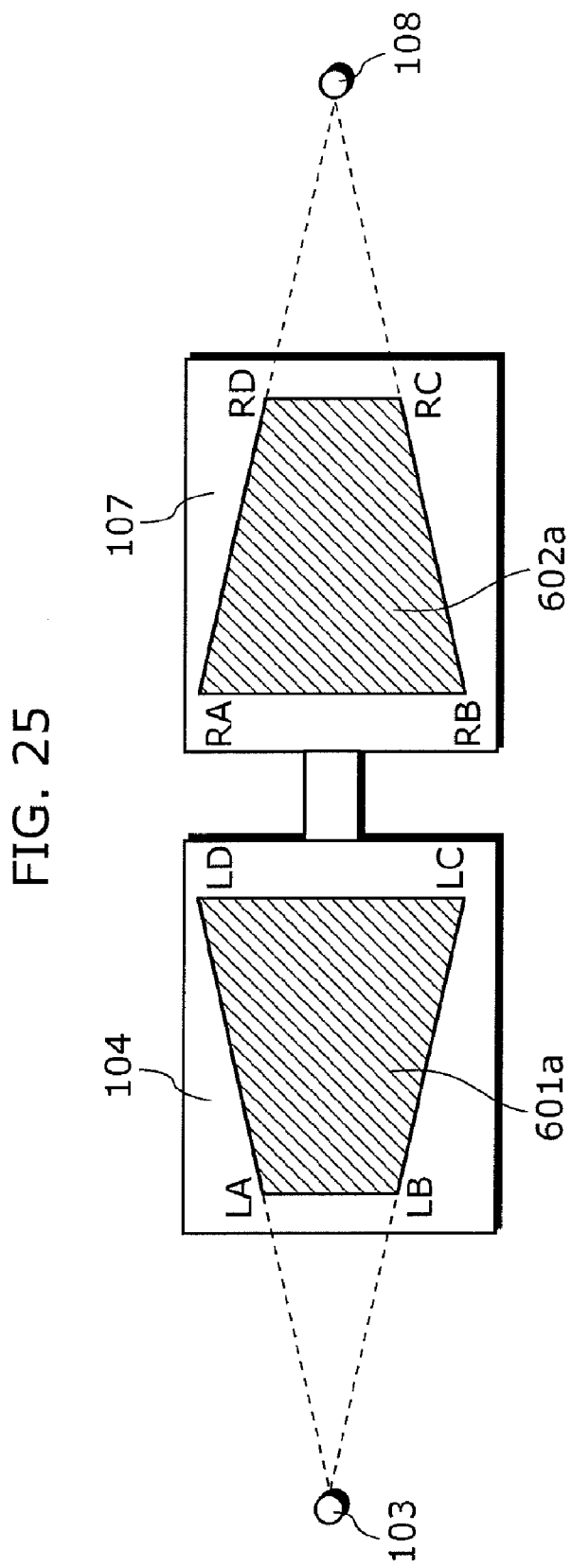
FIG. 25 is a diagram showing a distortion of a projected image on a deflection unit.

Next, a method for correcting a trapezoidal distortion of a display image by using an image fusion effect shall be described. FIG. 25 shows an example of image distortion in the beam scan display apparatus shown in FIG. 1. As described earlier, as a result of beams being obliquely projected by the scan units 103 and 108 onto the deflection units 104 and 107, an image which should be displayed in a rectangular shape is projected onto the deflection units 104 and 107 in such a distorted shape as a left-eye distorted image 601a and a right-eye distorted image 602a.

In the present invention, such trapezoidal distortion is corrected by determining a shape projected onto a plane vertical to the user's line of sight and then controlling the shape of the projected image. In the present embodiment, in order to consider the deflection units 104 and 107 as planes vertical to the user's line of sight, the left-eye distorted image 601a and the right-eye distorted image 602a on the deflection units 104 and 107 shall hereinafter be considered equivalent to an image projected onto the plane vertical to the user's line of sight.

Figure 26:
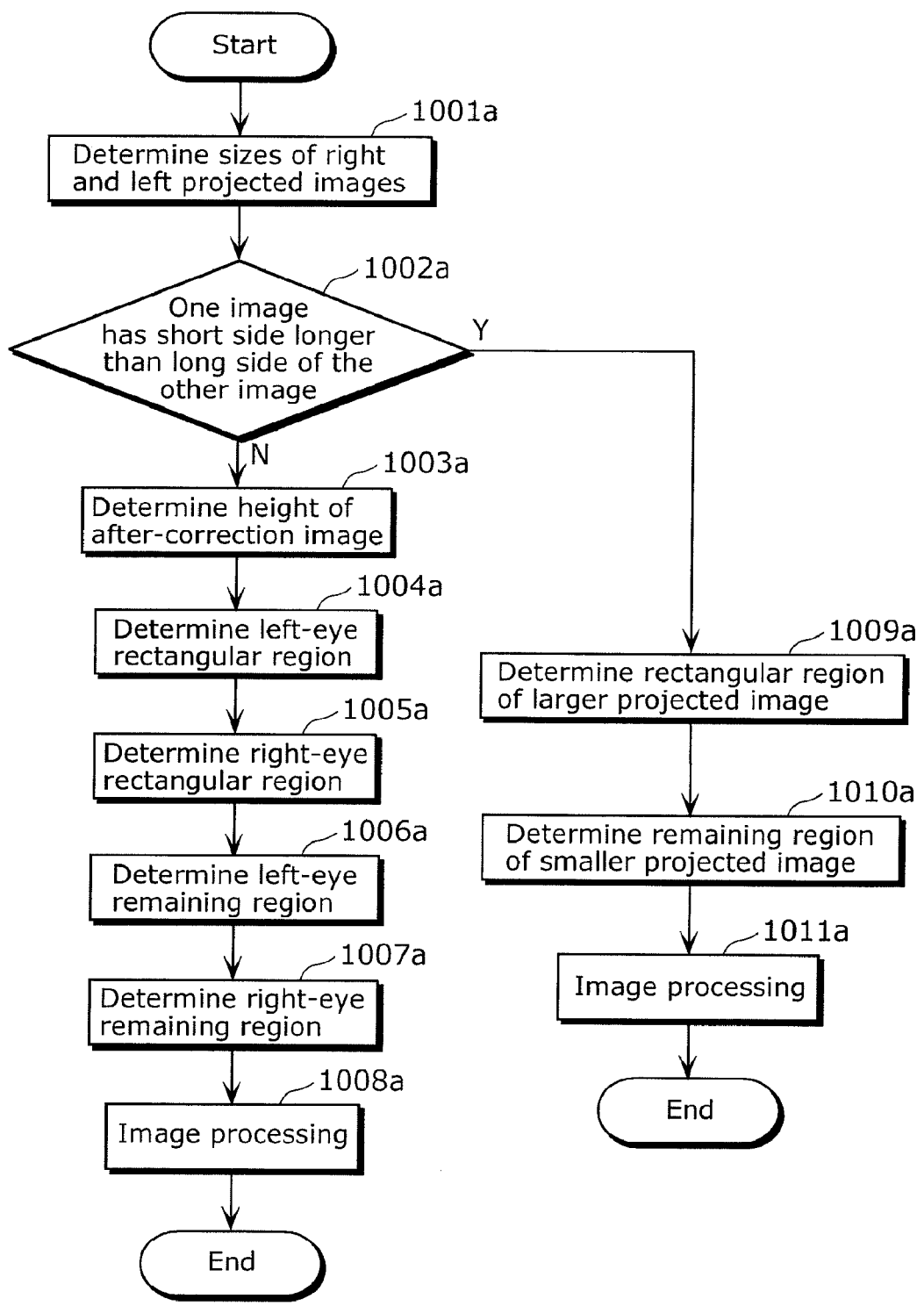
FIG. 26 is a flowchart showing an order of correcting a trapezoidal distortion.

Shown below is an example in which the trapezoidal distortion shown in FIG. 25 is corrected in the beam scan display apparatus, using the image fusion effect described earlier. The trapezoidal distortion is corrected according to the steps 1001a to 1011a shown in FIG. 26.

Step 1001a Estimating the Shape of the Image Projected onto the Deflection Unit

In this step, the trapezoidal distortion determining unit 1801 of the control units 105 and 111 estimates the shape of the image distortion with respect to the plane vertical to the user's line of sight. In the present embodiment, since the deflection units 104 and 107 are designed as planes vertical to the direction of the user's line of sight, the shape of the distorted images 601a and 602a on the deflection units 104 and 107 are determined in this step.

A method for determining the shape of the left-eye distorted image 601a shall be described below, using FIGS. 27 and 28 and Expressions (11) to (15).

(1. Calculating the Distance Between the Scan Unit and the Image Projected onto the Deflection Unit)

Figure 27:
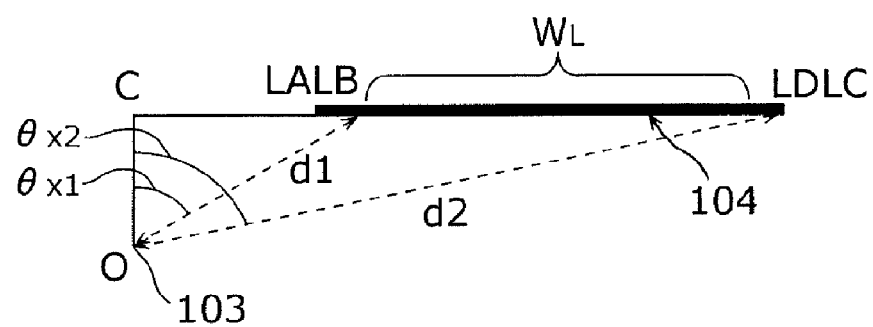
FIG. 27 is a diagram showing a positional relationship between a scan unit and a deflection unit.

FIG. 27 illustrates, as seen from above the HMD, a laser projection from the left-eye scan unit 103 to the left-eye deflection unit 104.

The laser beam from the left-eye scan unit 103 is projected onto the left-eye deflection unit 104 at a horizontal projection angle $\theta_x$ ($=\theta_{x2}-\theta_{x1}$). At this time, it is possible to calculate a distance d1 between a side LA-LB of the left-eye distorted image 601a and the left-eye scan unit 103 in accordance with Expression (11). In addition, it is possible to calculate a distance d2 between a line LD-LC of the left-eye distorted image 601a and the left-eye scan unit 103 in accordance with Expression (12). Here, OC represents a distance of a perpendicular extending from the scan unit 103 to the left-eye deflection unit 104. In addition, it is possible to calculate a width $W_L$ of the left-eye distorted image 601a on the left-eye deflection unit 104 in accordance with Expression (13).

[Expression 11]

$$d1 = OC/\cos\theta_{x1} \quad (11)$$

[Expression 12]

$$d2 = OC/\cos\theta_{x2} \quad (12)$$

[Expression 13]

$$W_L = d2 \times \sin\theta_{x2} - d1 \times \sin\theta_{x1} \quad (13)$$

Here, the values of $\theta_{x1}$, $\theta_{x2}$, and OC used for Expressions (11) to (13) are determined at the time of designing the beam scan display apparatus shown in FIG. 1, and it is possible, by previously assigning the values to the trapezoidal distortion determining unit 1801, to calculate the values of d1, d2, and $W_L$ in accordance with Expressions (11) to (13).

Note that it is also applicable to obtain projection angles $\theta_{x1}$ and $\theta_{x2}$ by providing the left-eye scan unit 103 with a sensor which determines the current scan angle, and then to notify the obtained values to the trapezoidal distortion determining unit 1801. In this case, it is also possible to accurately obtain the values of the projection angles $\theta_{x1}$ and $\theta_{x2}$ even when the scan angles of the left-eye scan unit 103 diverge from the scan angles assumed at the time of designing.

In addition, it is also applicable to provide the left-eye scan unit 103 with a unit which obtains light reflected from the left-eye deflection unit 104, and thereby to estimate d1 and d2 directly from the intensity or the phase of the reflected beams. In this case, it is also possible to accurately obtain the values of d1 and d2 when the shape of the beam scan display apparatus is distorted as compared to the state at the time of designing.

(2. Calculating Lengths of Sides of Upper and Lower Bases from the Projection Angle of the Light Source)

Next, the lengths of the sides LA-LB and LD-LC of the left-eye distorted image 601a are determined.

Figure 28:
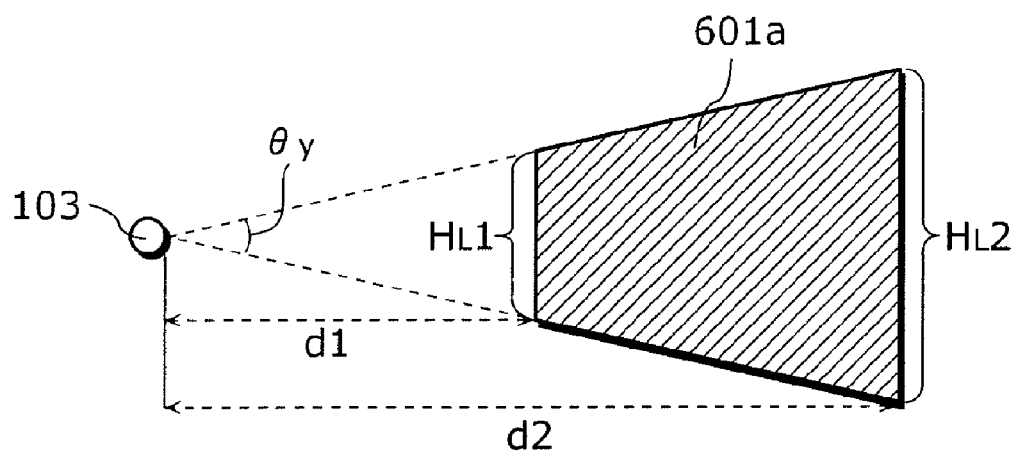
FIG. 28 is a diagram showing a trapezoidal distortion on the deflection unit.

FIG. 28 shows a diagram of the left-eye distorted image 601a as seen from a direction vertical to the deflection unit 104. As shown in FIG. 28, since the beam from the scan unit 103 spreads vertically at a projection angle $\theta_y$, and a length $H_L1$ of the side LA-LB and a length $H_L2$ of the side LD-LC of the left-eye distorted image 601a are calculated in accordance with Expression (14) and Expression (15), respectively.

[Expression 14]

$$H_L1 = 2 \times d1 \times \tan(\theta_y/2) \quad (14)$$

[Expression 15]

$$H_L2 = 2 \times d2 \times \tan(\theta_y/2) \quad (15)$$

Here, the value of $\theta_y$ used for Expressions (14) and (15) is determined at the time of designing the beam scan display apparatus shown in FIG. 1, and thus, by previously assigning the values to the trapezoidal distortion determining unit 1801, it is possible to calculate the values of $H_L1$ and $H_L2$.

Note that the angle $\theta_y$ may also be obtained by providing, in the left-eye scan unit 103, a sensor that determines the current scan angle, and then the obtained value may be notified to the trapezoidal distortion determining unit 1801. In this case, it is also possible to accurately obtain the value of $\theta_y$ even when the scan angles of the left-eye scan unit 103 diverge from the scan angles assumed at the time of designing.

Note that, although the example given here refers to calculating the distortion of the left-eye distorted image 601a on the left-eye deflection unit 104, it is also possible to calculate the distortion of the right-eye distorted image 602a on the right-eye deflection unit 107 in accordance with the same calculation formula.

Figure 29:
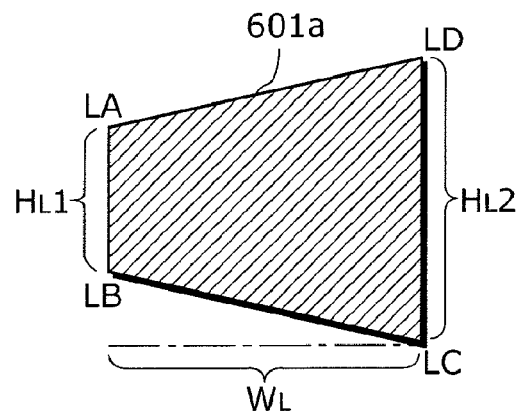
FIG. 29 is a diagram showing a shape of a projected image on a left-eye deflection unit.
Figure 30:
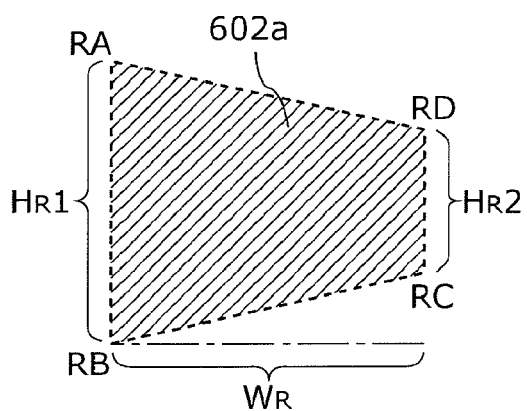
FIG. 30 is a diagram showing a shape of a projected image on a right-eye deflection unit.

FIGS. 29 and 30 show an example of dimensions of the left-eye distorted image 601a and the right-eye distorted image 602a, which are determined by the trapezoidal distortion determining unit 1801. In this step, the heights $H_L1$ and $H_L2$ and the width $W_L$ of the left-eye distorted image 601a on the left-eye deflection unit 104, and heights $H_R1$ and $H_R2$ and the width $W_R$ of the right-eye distorted image 602a on the right-eye deflection unit 107 are determined. The results are notified to the image control unit 1804.

Note that it is also applicable to previously hold, in the storage unit, the shape of an image projected by the left and right scan units 103 and 108 onto the plane vertical to the user's line of sight, and then to read out the shape from the storage unit in the Step 1001. In this case, it is possible to omit the processing of Step 1001a.

In addition, it is also applicable to capture the projected images on the deflection units 104 and 107 with a camera attached to the beam scan display apparatus, and then to determine the shapes of the projected image with respect to the plane vertical to the user's line of sight. In this case, it is possible to appropriately measure the shape of the projected image even when the positional relationship between the scan units 103 and 108 and the deflection units 104 and 107 is displaced.

Step 1002a Comparing the Size of the Right and Left Projected Images

In this step, based on the results of the determination in the previous step 1001a, the image control unit 1804 compares the heights of the left-eye distorted image 601a and the right-eye distorted image 602a, so as to determine the processing method for correcting the trapezoidal distortion, based on the result of the comparison.

Where $H_L2 \geq H_R2$ and $H_R1 \geq H_L1$, the processing of Step 1003a is performed. On the other hand, where $H_L2 < H_R2$ or $H_R1 < H_L1$, the processing of Step 1009a is performed. At this time, the result of the comparison is notified to the rectangular region determining unit 1802 and the remaining region determining unit 1803.

Next, the region for displaying the after-correction image is determined through performance of Steps 1003a to 1007a. Specifically, from the display region for the left-eye distorted image 601a, a left-eye display region 601b, which is made up of a left-eye rectangular region 1401a and a left-eye remaining region 1402a, is determined. Likewise, from the display region for the right-eye distorted image 602a, the right-eye display region 602b, which is made up of a right-eye rectangular region 1501a and a right-eye remaining region 1502a, is determined.

Step 1003a Determining an after-Correction Image Region

Figure 31:
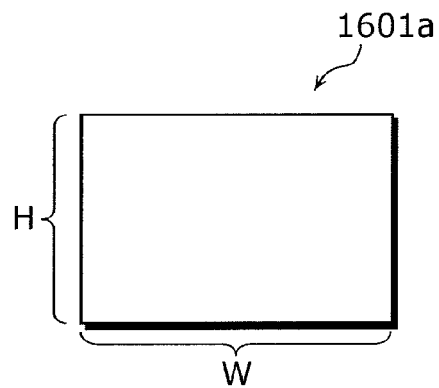
FIG. 31 is a diagram showing a shape of an image visually recognized by the user.

In this step, the image control unit 1804 determines a height H of the figure (FIG. 31) to be visually recognized by the user after the right and left display images are fused. The height H is set within in a range satisfying the relationships $H_L1 \leq H \leq H_L2$ and $H_R2 \leq H \leq H_R1$. The value of the determined H is notified to the rectangular region determining unit 1802.

Note that the method for determining the height H may also be a direct input by the user through the user interface of the HMD. In this case, it is possible to display the image in the size of the user's choice. In addition, it is also applicable to previously hold a value of the preferable height H in the storage unit and then read out the value when performing this step.

Step 1004a Determining the Left-Eye Rectangular Region

In this step, the rectangular region determining unit 1802 determines the left-eye rectangular region 1401a in the left-eye display region 601b on the left-eye deflection unit 104. This method is shown using FIG. 32.

First, the position of a line XI1-XI2 is determined, which line is parallel to the sides LA-LB and LC-LD of the left-eye display region 601b on the left-eye deflection unit 104 and has a length equivalent to the height H determined in the previous step.

Next, it is assumed that a point at which a perpendicular dropped from a point XI1 to the side LD-LC intersects the side LD-LC is LDI, and a point at which a perpendicular dropped from a point XI2 to the side LD-LC intersects the side LD-LC is LCI.

At this time, in the left-eye display region 601b on the left-eye deflection unit 104, the left-eye rectangular region 1401a (LDI-LCI-XI2-XI1) is determined, which has, as a first side, a portion of the long side (LDI-LCI) of the left-eye display region 601b, and, as a second side, a line segment (XI1-LDI, XI2-LCI) which is orthogonal to the first side and connects an endpoint (LDI, LCI) of the first side and an oblique side (side LA-LD, side LB-LC) of the left-eye display region 601b. This result is notified to the remaining region determining unit 1803 and the image control unit 1804.

Step 1005a Determining the Right-Eye Rectangular Region

In this step, the rectangular region determining unit 1802 determines the right-eye rectangular region 1501a in the right-eye display region 602b on the right-eye deflection unit 107. This method is shown using FIG. 33.

First, the position of a line Xr1-Xr2 is determined, which line is parallel to the sides RA-RB and RC-RD of the right-eye display region 602b on the right-eye deflection unit 107 and has a length equivalent to the height H determined in the previous step.

Next, it is assumed that a point at which a perpendicular dropped from a point Xr1 to the side RA-RB intersects the side RA-RB is RAr, and a point at which a perpendicular dropped from a point Xr2 to the side RA-RB intersects the side RA-RB is RBr.

At this time, in the right-eye display region 602b on the right-eye deflection unit 107, the right-eye rectangular region 1501a (RAr-RBr-Xr2-Xr1) is determined which has, as a third side, a portion of the long side of the right-eye display region 602b (RAr-RBr), and, as a fourth side, a line segment (Xr1-RAr, Xr2-RBr) which is orthogonal to the third side and connects an endpoint of the third side (RAr, RBr) and an oblique side of the right-eye display region 602b (side RA-RD, side RB-RC). This result is notified to the remaining region determining unit 1803 and the image control unit 1804.

Step 1006a Determining a Left-Eye Remaining Region

In this step, the remaining region determining unit 1803 determines a left-eye remaining region 1402a in the left-eye display region 601b on the left-eye deflection unit 104. The left-eye remaining region 1402a for the left-eye display region 601b is set to a region adjoining the left-eye rectangular region 1401a on the left. This method is shown using FIG. 32.

The left-eye remaining region 1402a is a trapezoidal figure, which has, as a right side (long side), a side XI1-XI2 (opposite side of the first side) determined in the step 1004a, and, as an oblique side, a portion of an oblique side (XI1-XI3, XI2-XI4) of the left-eye display region 601b, and is determined as below when the width thereof is represented by $W_L2$.

(Where $W \geq W_L1 + W_R1$)

Where $W_L2 = W_R1$, a side XI3-XI4, which is parallel to the side XI1-XI2 and distant from the side XI1-XI2 at a distance $W_L2$, is determined. At this time, a region surrounded by the sides XI1-XI2, XI4-XI2, XI3-XI4, and XI3-XI1 is determined as the left-eye remaining region 1402a.

(Where $W < W_L1 + W_R1$)

It is assumed that $W_L2 = W - W_L1$. At this time, a region surrounded by the sides LB-XI2, LA-LB, LA-XI1, and XI1-XI2 is determined as the left-eye remaining region 1402a.

This result is notified to the image control unit 1804.

Step 1007a Determining the Right-Eye Remaining Region

In this step, the remaining region determining unit 1803 determines a right-eye remaining region 1502a in the right-eye display region 602b on the right-eye deflection unit 107. The right-eye remaining region 1502a of the right-eye display region 602b is set to a region adjoining the right-eye rectangular region 1501a on the right. This method is shown using FIG. 33.

The left-eye remaining region 1502a is a trapezoidal figure, which has a side Xr1-Xr2 (opposite side of the third side) determined in Step 1005a as a left side (long side) and a portion of an oblique side (Xr1-Xr3, Xr2-Xr4) of the right-eye display region 602b as an oblique side, is determined as below when the width thereof is represented by $W_R2$.

(Where $W \geq W_L1 + W_R1$)

Where $W_R2 = W_L1$, a side Xr3-Xr4 which is parallel to the side Xr1-Xr2 and distant from the side Xr1-Xr2 at a distance $W_R2$ is determined. At this time, a region surrounded by the sides Xr1-Xr2, Xr2-Xr4, Xr3-Xr4, and Xr1-Xr3 is determined as the right-eye remaining region 1402a.

(Where $W < W_L1 + W_R1$)

It is assumed that $W_R2 = W - W_R1$. At this time, a region surrounded by the sides Xr2-RC, RD-RC, Xr1-RD, and Xr1-Xr2 is determined as the right-eye remaining region 1402a.

This result is notified to the image control unit 1804.

Next, image processing performed on images displayed in the left-eye display region 601b and the right-eye display region 602b shall be described with reference to FIGS. 35 to 42.

Step 1008a Image Processing

In this step, the control units 105 and 111 transform the left-eye image 601 and the right-eye image 602, respectively, such that pixels are displayed only within the range of the rectangular regions 1401a and 1501a and the remaining regions 1402a and 1502a determined in Steps 1004a to 1006a, and controls laser emission based on the result.

Figure 35:
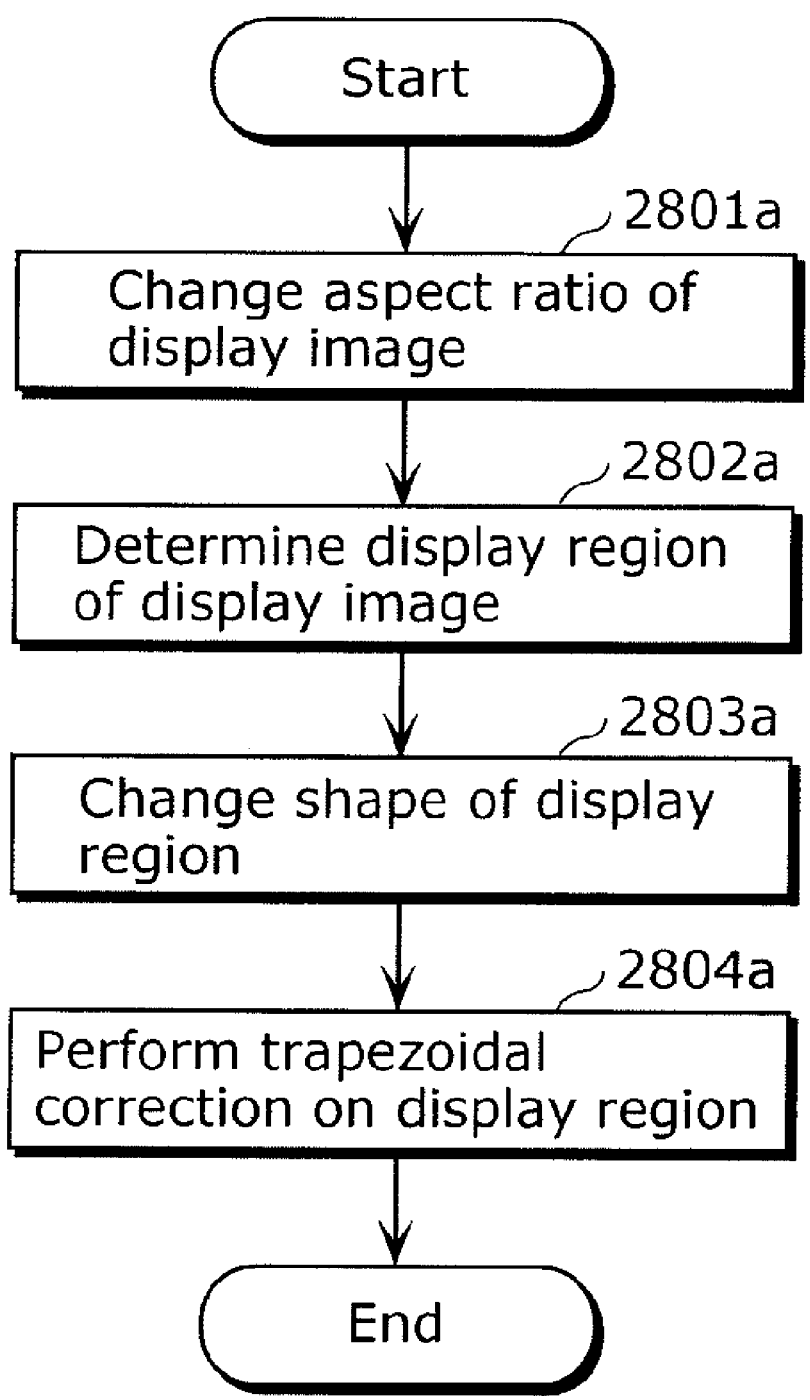
FIG. 35 is a flowchart showing a procedure for transforming an image to be displayed onto both eyes in a third embodiment of the present invention.
Figure 36A:
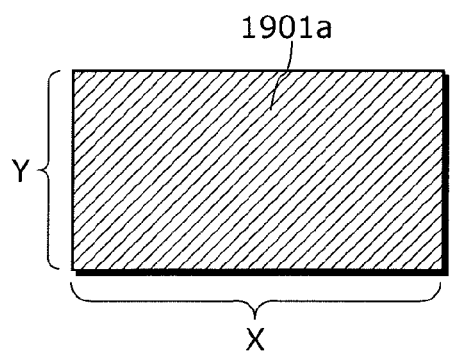
FIG. 36A is a diagram showing a horizontal dimension and a vertical dimension of an original image.
Figure 36B:
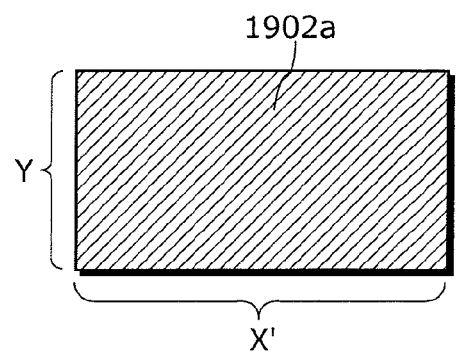
FIG. 36B is a diagram showing a correction image generated adjusting the aspect ratio of the original image in FIG. 36A.
Figure 37:
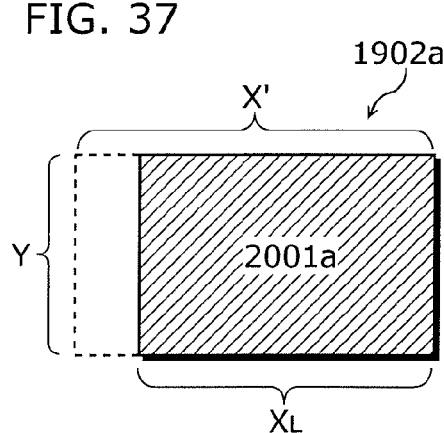
FIG. 37 is a diagram showing an image region in the correction image, which is displayed on the left eye.
Figure 38:
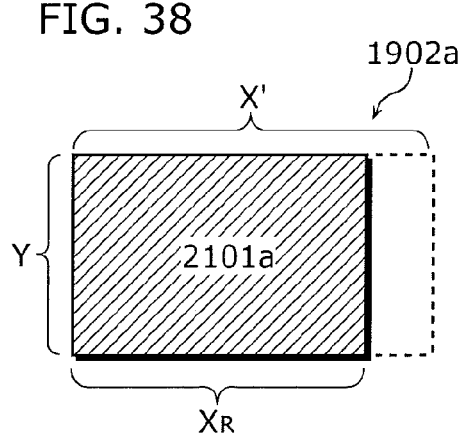
FIG. 38 is a diagram showing an image region in the correction image, which is displayed on the right eye.

The control units 105 and 111 transform the display images following the Steps 2801a to 2804a shown in FIG. 35. Hereinafter, an example of transforming images is shown with reference to FIGS. 36A to 42.

Step 2801a Changing an Aspect Ratio of the Display Image

In the present Step 2801a, the aspect ratio adjustment unit 1805 changes an aspect ratio, that is, a horizontal-to-vertical ratio of the image to be displayed to the user. This example is described with reference to FIGS. 36A and 36B, and Expression (16). The original image 1901a is stored in a storage unit (such as memory) in the image control unit 1804. The HMD in FIG. 1 displays this entire image to the user.

In the present Step 2801a, the aspect ratio adjustment unit 1805 performs image transformation such that the aspect ratio of the original image 1901a is equal to an aspect ratio (H:W1+W2) that is obtained when the left-eye display region 601b and the right-eye display region 602b are superposed. In the present embodiment, a crosswise dimension is reduced or expanded from X to X', to generate a correction image 1902a. Here, X' is calculated in accordance with Expression (16).

[Expression 16]

$$X' = Y \times (W_L 1 + W_R 1)/H \qquad (16)$$

Step 2802a Determining the Display Region for the Display Image

In the present step 2802a, of the correction image 1902a transformed in the previous step 2801a, a region to be displayed on the deflection unit 104 and 107 is determined. This example is described with reference to FIGS. 37 and 38, and Expressions (17) and (18). The aspect ratio adjustment unit 1805 determines a width $X_L$ of a region, which is a portion of the correction image 1902a and is to be displayed on the left-eye deflection unit 104. Here, $X_L$ is calculated in accordance with Expression (17). The image control unit 1804 generates a left-eye partial image 2001a by cutting, out of the correction image 1902a, the portion having the width $X_L$ from the right endpoint.

[Expression 17]

$$X_L = X' \times (W_L 1 + W_L 2)/(W_L 1 + W_R 1) \qquad (17)$$

Likewise, the aspect ratio adjustment unit 1805 determines a width $X_R$ of a region, which is a portion of the correction image 1902a and is to be displayed on the right-eye deflection unit 107. Here, $X_R$ is calculated in accordance with Expression (18). The image control unit 1804 generates a right-eye partial image 2101a by cutting, out of the correction image 1902a, a portion having the width $X_R$ from the left endpoint.

[Expression 18]

$$X_R = X' \times (W_R 1 + W_R 2)/(W_L 1 + W_R 1) \qquad (18)$$

Step 2803a Transforming the Display Image

In the present Step 2803a, a distortion correcting unit 1806 performs trapezoidal correction (reverse correction), in which the left-eye partial image 2001a is distorted in an opposite direction to the left-eye distorted image 601a such that the left-eye partial image 2001a becomes congruent with the left-eye image 601 on the left-eye deflection unit 104. Likewise, the distortion correcting unit 1806 performs trapezoidal correction (reverse correction) in which the right-eye partial image 2101a is distorted in an opposite direction to the right-eye distorted image 602a such that the right-eye partial image 2101a becomes congruent with the right-eye image 602 on the left-eye deflection unit 107. This example is shown using FIGS. 39 and 40, and Expressions (19) to (22).

Figure 39:
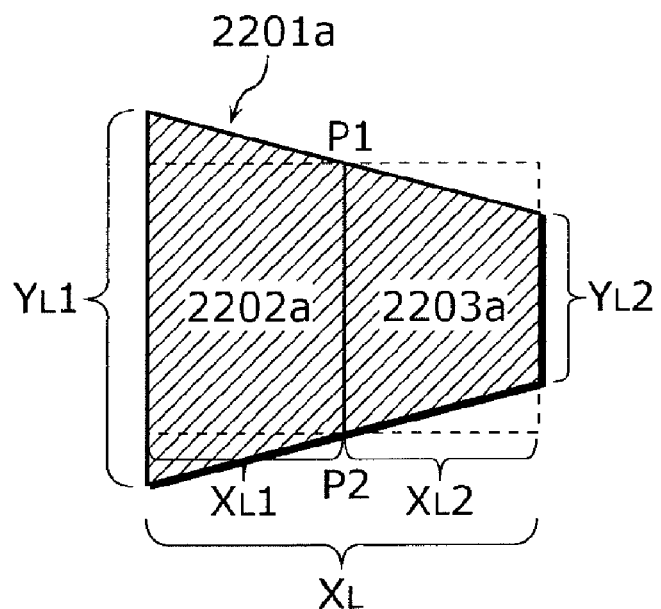
FIG. 39 is a diagram showing a state after correcting the distortion of the image in FIG. 37.

The distortion correcting unit 1806, as shown in FIG. 39, performs scaling so that the left-eye partial image 2001a becomes congruent with the left-eye trapezoidal image 2201a. Here, a lower base $Y_L 1$ and an upper base $Y_L 2$ of the left-eye trapezoidal image 2201a are calculated in accordance with Expressions (19) and (20). In the processing of the present Step 2803a, an image portion on the left side (a region to the left of a line segment P1-P2) of the left-eye partial image 2001a is enlarged lengthwise, an image portion on the right side (a region to the right of the line segment P1-P2) is reduced, so that the left-eye trapezoidal image 2201a is generated. Here, the line segment P1-P2 is set to the position at which the ratio between $X_L 1$ and $X_L 2$ shown in FIG. 39 is $W_L 2:W_L 1$.

[Expression 19]

$$Y_L 1 = Y \times H/H_L 1 \qquad (19)$$

[Expression 20]

$$Y_L 2 = Y \times H/H_L 2 \qquad (20)$$

Figure 40:
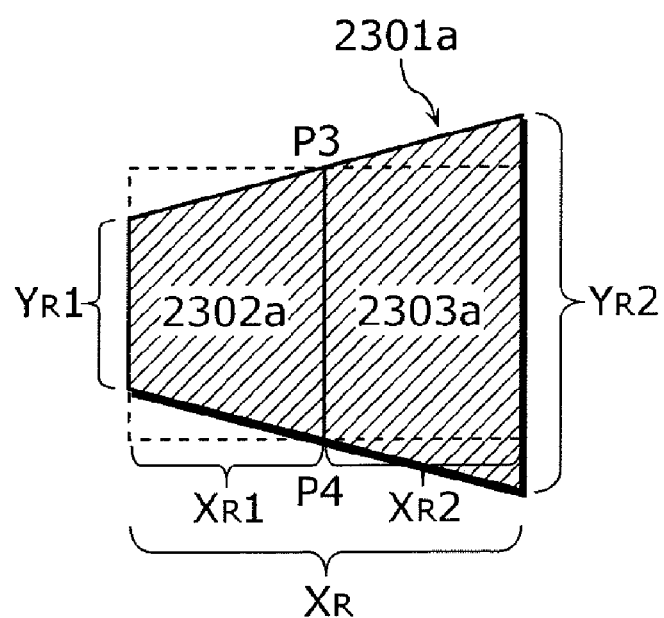
FIG. 40 is a diagram showing a state after correcting the distortion of the image in FIG. 38.
Figure 41:
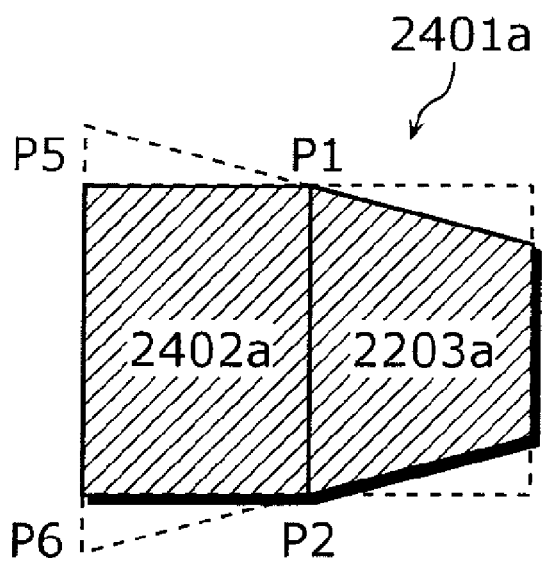
FIG. 41 is a diagram showing a state in which a portion to be outputted is extracted from the image in FIG. 39.
Figure 42:
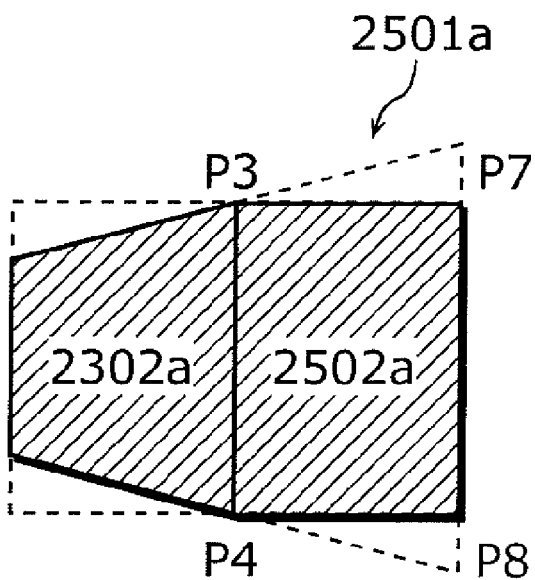
FIG. 42 is a diagram showing a state in which a portion to be outputted is extracted from the image in FIG. 40.

Likewise, as shown in FIG. 40, the distortion correcting unit 1806 performs scaling so that the right-eye partial image 2101a becomes congruent with the right-eye trapezoidal image 2301a. Here, the lower base $Y_R 1$ and the upper base $Y_R 2$ of the right-eye trapezoidal image 2301a are calculated in accordance with Expressions (21) and (22). In the processing of the present Step 2803a, an image portion 2101a on the right side (a region to the right of a line segment P3-P4) of the right-eye partial image 2101a is enlarged lengthwise and an image portion on the left side (a region to the left of the line segment P3-P4) is reduced, so that the right-eye trapezoidal image 2301a is generated. Here, the line segment P3-P4 is set to the position at which the ratio between $X_R 1$ and $X_R 2$ shown in FIG. 40 is $W_R 1:W_R 2$.

[Expression 21]

$$Y_R 1 = Y \times H/H_R 1 \qquad (21)$$

[Expression 22]

$$Y_R 2 = Y \times H/H_R 2 \qquad (22)$$

Step 2804a Reverse Trapezoidal Correction

In the present Step 2804a, an output image control unit 1807 performs correction so that the left-eye trapezoidal image 2201a transformed in the previous step 2803a is projected onto the left-eye display region 601b on the left-eye deflection unit 104. Likewise, the correction is performed so that the right-eye trapezoidal image 2301a is projected onto the right-eye display region 602b on the right-eye deflection unit 107. This example is shown using FIGS. 41 and 42.

Here, in the left-eye trapezoidal image 2201a, it is assumed that a point at which a perpendicular dropped from a point P1 to the left side of the left-eye trapezoidal image 2201a intersects the left side of the left-eye trapezoidal image 2201a is P5, and a point at which a perpendicular dropped from a point P2 to the left side of the left-eye trapezoidal image 2201a intersects the left side of the left-eye trapezoidal image 2201a is P6. At this time, the output image control unit 1807 generates a left-eye projection image 2401*a* by cutting, out of a trapezoidal region 2202*a*, a region above the line segment P1-P5 and a region below the line segment P2-P6.

The left-eye projection image 2401*a* is made up of: a rectangular region 2402*a* which is to be the left-eye remaining region 1402*a* on the left-eye deflection unit 104, and a trapezoidal region 2203*a* which is to be the left-eye rectangular region 1401*a* on the left-eye deflection unit 104. Then, when the left-eye projection image 2401*a* is projected onto the deflection unit 104 by controlling the laser emission from the left-eye light source 101, an image without distortion is displayed in the left-eye display region 601*b* shown in FIG. 32.

Likewise, in the right-eye trapezoidal image 2301*a*, it is assumed that a point at which a perpendicular dropped from a point P3 to the right side of the right-eye trapezoidal image 2301*a* intersects the right side of the right-eye trapezoidal image 2301*a* is P7, and a point at which a perpendicular dropped from a point P4 to the right side of the right-eye trapezoidal image 2301*a* intersects the right side of the right-eye trapezoidal image 2301*a* is P8. At this time, the output image control unit 1807 generates a right-eye projection image 2501*a* by cutting a region above the line segment P3-P7 and a region below the line segment P4-P8 out of a trapezoidal region 2303*a*.

The right-eye projection image 2501*a* is made up of: a rectangular region 2502*a* which is to be the right-eye remaining region 1502*a* on the right-eye deflection unit 107, and a trapezoidal region 2302*a* which is to be the right-eye rectangular region 1501*a* on the right-eye deflection unit 107. Then, when the right-eye projection image 2501*a* is projected onto the deflection unit 107 by controlling the laser emission from the right-eye light source 110, an image without distortion is displayed in the right-eye display region 602*b* shown in FIG. 33.

Figure 32:
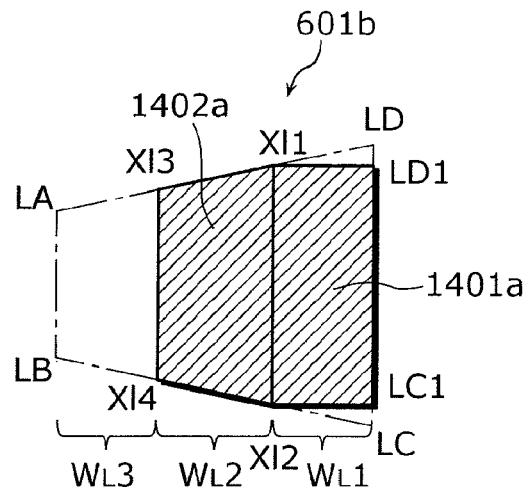
FIG. 32 is a diagram showing a state in which a rectangular region and a remaining region are extracted from the projected image on the left-eye deflection unit.
Figure 33:
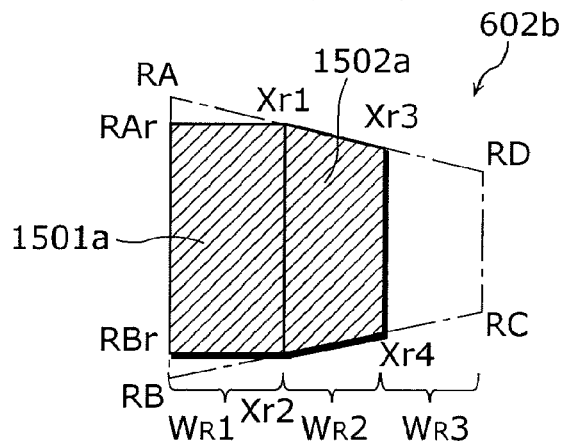
FIG. 33 is a diagram showing a state in which a rectangular region and a remaining region are extracted from the projected image on the right-eye deflection unit.

By performing these Steps 2801*a* to 2804*a*, the generated left-eye projection image 2401*a* and right-eye projection image 2501*a* are influenced by the trapezoidal distortion on the deflection units 104 and 107, to be shaped as shown with diagonal lines in FIGS. 32 and 33.

Figure 34:
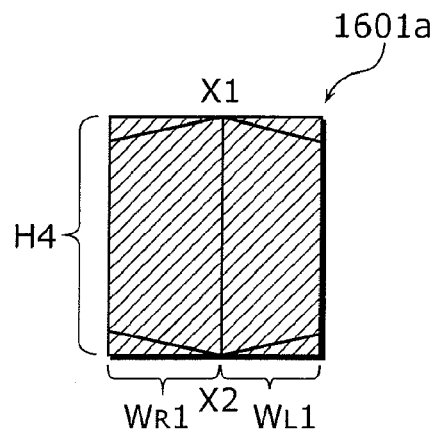
FIG. 34 is a diagram showing a shape of a display image after the trapezoidal distortion is corrected.

Then, when seeing the image displayed on the deflection units 104 and 107, the user recognizes, with the image fusion effect, a fused graphic 1601*a* as shown in FIG. 34. Although the pixels in the upper-left corner and lower-left corner of the fused graphic 1601*a* shown in FIG. 34 are seen with only the right eye, and the pixels in the upper-right corner and the lower-right corner are seen with only the left eye, the entire figure is recognized as a rectangular having no trapezoidal distortion. At this time, the displayed image is congruent with the correction image 1902*a* shown in FIG. 36B.

In addition, since the height H of the fused graphic 1601*a* satisfies the relationship of $H_L1 \leq H$ and $H_R2 \leq H$, this produces an effect of increasing the height of the image of which the trapezoidal distortion has been corrected.

Note that the execution of Steps 1004*a* and 1005*a* may also be in reverse order or may also be simultaneous. Likewise, the execution of Steps 1006*a* and 1007*a* may also be in reverse order or may also be simultaneous.

Note that the output image control unit 1807 may reduce laser emission to a portion in which images on the right and left eyes overlap each other in FIG. 34, by controlling the light sources 101 and 110. Reversely, the output image control unit 1807 may also increase laser emission so as to increase the brightness of pixels seen with only one eye in FIG. 34, by controlling the light sources 101 and 110. By performing one of the above processes, it is possible to avoid unevenness of brightness in the display region.

In addition, the image control unit 1804 repeats processing after Step 1004*a* by changing the value of height H so that the ratio between the value of height H and the sum of widths $W_L1$ and $W_R1$ is equivalent to a specific ratio (for example, 16:9 or 4:3). In this case, it is possible to display to the user, without discomfort, a video picture such as a television program broadcasted at an aspect ratio of 4:3 or 16:9. In addition, the output image control unit 1807 may also be caused not to display, of the projection images 2401*a* and 2501*a*, arbitrary pixels of the rectangular regions 2402*a* and 2502*a* which are to be the remaining regions 1402*a* and 1502*a* on the deflection units 104 and 107. The pixels in the rectangular regions 2402*a* and 2502*a* overlap the pixels of the trapezoidal regions 2203*a* and 2303*a* on the other eye; therefore, even when the display pixels are reduced, the user is unlikely to notice the reduction.

Step 1009*a* Left-Eye Rectangular Region

In the present step, the rectangular region determining unit 1802 determines a rectangular region from a larger one of the left-eye distorted image 601*a* and the right-eye distorted image 602*a*, based on the result of the comparison in Step 1002*a*.

Hereinafter, an embodiment in the case where the left-eye distorted image 601*a* is larger ($H_R1 < H_L1$) is described; however, in the case of $H_L2 < H_R2$, the processing for the right and left is merely switched without making substantial difference.

Figure 43:
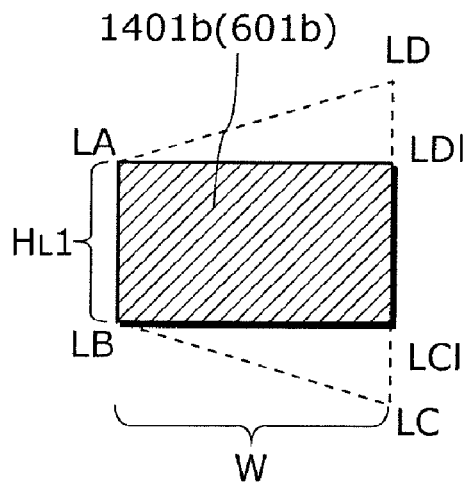
FIG. 43 is a diagram showing a state in which a rectangular region is extracted from the projected image on the left-eye deflection unit.

The processing of the present step shall be described using FIG. 43.

The rectangular region determining unit 1802 determines a point at which a perpendicular dropped from a point LA of the left-eye distorted image 601*a* to the side LD-LC intersects the side LD-LC as a point LDI, and a point at which a perpendicular dropped from a point LB to the side LD-LC intersects the side LD-LC as LCI. At this time, the left-eye rectangular region 1401*b* is determined as LA-LB-LCI-LDI. In addition, the area of the right-eye rectangular region is set to 0. This result is notified to the image control unit 1804.

Step 1010*a* Right-Eye Trapezoidal Region

In the present step, the remaining region determining unit 1803 determines a rectangular region from a smaller one of the left-eye distorted image 601*a* and the right-eye distorted image 602*a*, based on the result of the comparison in the Step 1002*a*. This method shall be described using FIG. 44. In the present step, different processing is performed depending on the values of $W_L$ and $W_R$.

(Where $W_R < W_L$)

The remaining region determining unit 1803 sets the entire region for the right-eye distorted image 602*a* as the right-eye remaining region 1502*b*.

(Where $W_R \geq W_L$)

The remaining region determining unit 1803 sets, as the right-eye remaining region 1052*b*, a region RA-RB-Xr4-Xr3 having a side RA-RB (long side) of the right-eye distorted image 602*a* as a left side and having a width W. In addition, the area of the left-eye remaining region is set to 0. This result is notified to the image control unit 1804.

Step 1011*a*

In the present step, the image control unit 1804 transforms the left-eye image 601 and the right-eye image 602 so that the pixels are displayed only within the range of the left-eye rectangular region 1401b and the right-eye remaining region 1502b determined in Steps 1009a and 1010a, and controls the laser emission from the light sources 101 and 110.

At this time, as in the step 1008a, the control unit 105 performs Steps 2801a to 2804a shown in FIG. 35 on the left and right images. However, on the smaller one of the left-eye distorted image 601a and the right-eye distorted image 602a, the following Step 2805a is performed instead of Step 2802a.

Step 2805a

Figure 46:
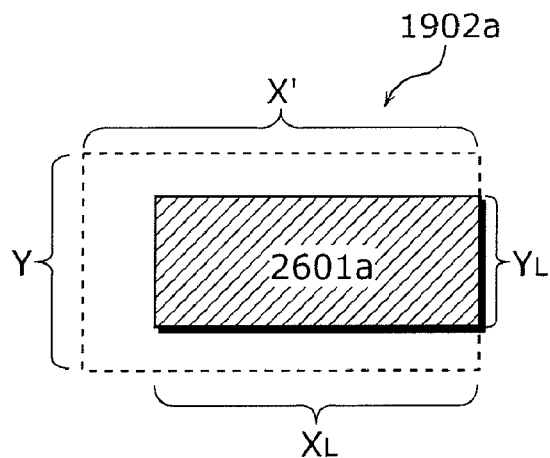
FIG. 46 is a diagram showing an image region in the correction image, which is displayed on the left eye.
Figure 47:
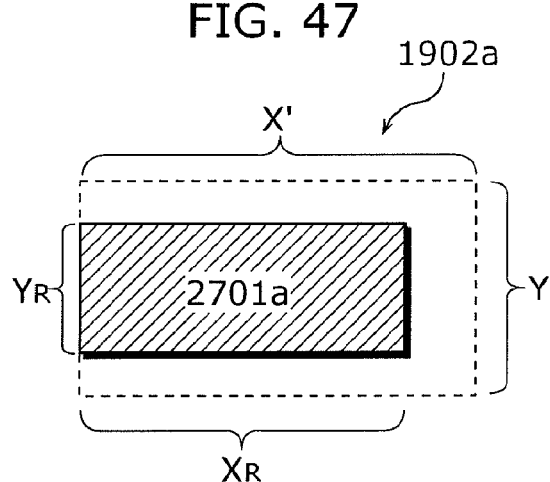
FIG. 47 is a diagram showing an image region in the correction image, which is displayed on the right eye.

In the present Step 2805a, a display region is determined from the correction image 1902a. This example shall be shown using FIGS. 46 and 47 and Expressions (23) and (24).

When the height of the left-eye distorted image 601a on the left-eye deflection unit 104 is low, the image control unit 1804 determines a width $X_L$ of the region to be displayed, from the correction image 1902a, onto the left-eye deflection unit 104. Here, $X_L$ is calculated in accordance with Expression (17). In addition, the height $Y_L$ of the region to be displayed on the left-eye deflection unit 104 is determined. Here, $Y_L$ is determined in accordance with Expression (23). The image control unit 1804 generates a left-eye partial image 2601a by cutting, out of the correction image 1902a, a portion having the width $X_L$ from the right endpoint and having the height $Y_L$ in the center of the image. In addition, the entire region of the correction image 1902a is set as a right-eye partial image 2701a.

[Expression 23]

$$Y_L = Y \times H_L 2/H \qquad (23)$$

On the other hand, when the height of the right-eye distorted image 602a on the right-eye deflection unit 107 is low, the image control unit 1804 determines, from the correction image 1902a, a width $X_R$ of the region to be displayed on the right-eye deflection unit 107. Here, $X_R$ is calculated in accordance with Expression (18). In addition, the height $Y_R$ of the region to be displayed on the right-eye deflection unit 107 is determined. Here, $Y_R$ is determined in accordance with Expression (24). The image control unit 1804 generates the right-eye partial image 2701a by cutting, from the correction image 1902a, a portion having the width $X_R$ from the left endpoint and having the height $Y_R$ in the center of the image. In addition, the entire region of the correction image 1902a is set as the right-eye partial image 2601a.

[Expression 24]

$$Y_R = Y \times H_R 1/H \qquad (24)$$

With the processing described above, the image control unit 1804 transforms the left-eye image and the right-eye image, and controls the light sources 101 and 110 so that beams corresponding to the respective transformed images are projected onto the deflection units 104 and 107.

Figure 44:
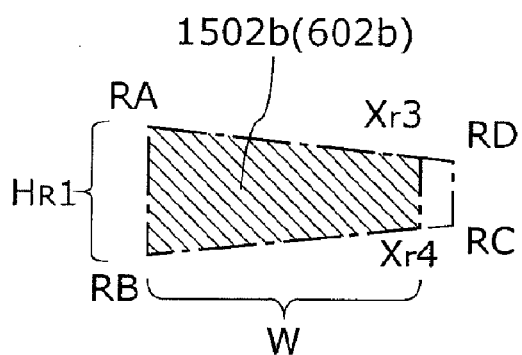
FIG. 44 is a diagram showing a state in which a remaining region is extracted from the projected image on the right-eye deflection unit.

As a result, the image displayed on the left-eye deflection unit 104 has a shape marked with diagonal lines in FIG. 43, and the image displayed on the right-eye deflection unit 107 has a shape marked with diagonal lines in FIG. 44.

Figure 45:
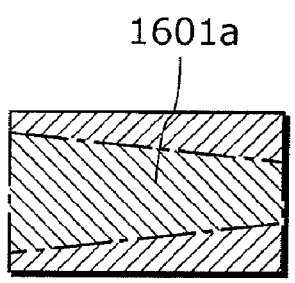
FIG. 45 is a diagram showing a shape of the display image after the trapezoidal distortion is corrected.

FIG. 45 shows the shape of an image to be recognized by the user at this time as a result of the above-described image fusion effect of both eyes. A wide-field trapezoidal distortion is corrected by changing the display pixels according to the projected image having a greater height.

Note that the execution of Steps 1009a and 1010a may also be in reverse order or may also be simultaneous.

Note that the output image control unit 1807 may perform control by reducing laser emission to a portion in which images on the right and left eyes overlap each other in FIG. 45, so as to prevent generation of brightness difference from pixels seen only with one eye. Reversely, the output image control unit 1807 may perform control to prevent generation of unevenness of brightness by increasing the laser emission so as to increase the brightness of the pixels seen with only one eye in FIG. 45. In this case, it is possible to display to the user, a sufficient image which has no unevenness of brightness.

Note that in the present embodiment the distorted images 601a and 602a on the left and right deflection units 104 and 107 need not necessarily be a perfect trapezoid, and the method of the present invention can also be applied to the case where the images have distortions in four sides. In this case, also in the case where the deflection unit is not a plane but has irregularities, it is also possible to increase the view angle by utilizing the image fusion effect of both eyes.

Note that the process in Step 1002a is branched by comparing the heights of the distorted images 601a and 602a, but when there is a certain level of difference in the user's vision, it is also applicable to branch the process to Step 1009a and treat one of the projected images that is to be projected onto the eye having clearer vision as the projected image having a greater height. At this time, it is possible to prevent influences of the eye having less clear vision by performing control such that the sizes of both the rectangular region and the remaining region of the projected image to be projected onto the eye having less clear vision are 0. Note that as a method for determining acuity of vision, the acuity of vision may also be inputted by the user from an external interface, or may also be estimated from the wavefront curvature and the spot size of the laser beam on the retina.

Note that the vision of the user may also be previously inputted through the user interface, or may also be tested by displaying Landolt ring to the user. The estimation of vision may also be performed by detecting the spot size on the retina from the reflected light of the beam projected onto the eye. In this case, it is possible to display a satisfactory image to a user who does not exactly know his or her acuity of vision.

Note that, although in the present embodiment the deflection units 104 and 107 are treated as a plane vertical to the user's line of sight, the deflection units 104 and 107 may also be tilted with respect to the user's line of sight or need not necessarily have a planer shape. In this case, the processing according to the present invention assumes not the images on the deflection units 104 and 107 but the planes vertical to the user's line of sight, and the shape of the projected images on the assumed planes are controlled.

Figure 48:
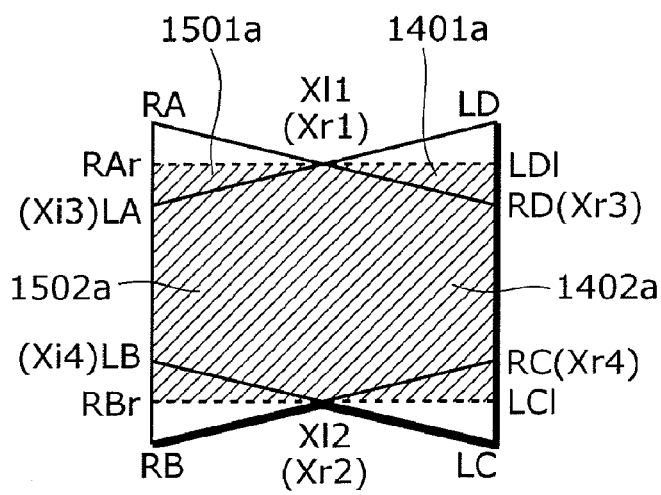
FIG. 48 is a diagram for describing a classic example in the third embodiment of the present invention.

Next, a typical example of the third embodiment shall be described with reference to FIG. 48. Note that FIG. 48 shows a diagram (portion marked with solid lines) created by superposing the left-eye distorted image 601a shown in FIG. 29 and the right-eye distorted image 602a shown in FIG. 30, and a portion in which an image is actually displayed is shown with diagonal lines.

First, the left-eye distorted image 601a shown in FIG. 29 and the right-eye distorted image 602a shown in FIG. 30 are typically congruent. That is, $H_L 1 = H_R 2$, $H_L 2 = H_R 1$, and $W_L = W_R$ are established. In other words, in Step 1002a, since $H_L 2 = H_R 2$ and $H_R 1 \geqq H_L 1$ are both satisfied, Steps 1003a to 1008a are executed.

Next, in Step 1003a, it is assumed that the height in the position at which $W_L 1 = W_L 2 = W_L/2$ in the left-eye distorted image 601a is H. Likewise, it is assumed that the height in the position at which $W_R1=W_R2=W_R/2$ in the right-eye distorted image 602a is H.

Next, in Steps 1004a to 1007a, the left-eye rectangular region 1401a, the right-eye rectangular region 1501a, the left-eye remaining region 1402a, and the right-eye remaining region 1502a are determined. At this time, the left-eye display region 601b and the right-eye display region 602b are congruent, and the height H is set to the position at which $W_L1=W_L2=W_R1=W_R2=W_L/2=W_R/2$; thus, the image shown in FIG. 48 is obtained when both regions are superposed.

In other words, the second side (Xl1-LDl, Xl2-LCl) of the left-eye rectangular region 1401a and the fourth side (Xr1-RAr, Xr2-RBr) of the right-eye rectangular region 1501a are straight lines passing through the intersections of the oblique lines of the left-eye image 601b and the right-eye image 602b, respectively. At this time, the image recognized by the user (RAr-LDI-LDI-RBr) is the largest.

Next, the image processing of Steps 2801a to 2804a is executed. At this time, since $X_L=X_R=X'$ in Step 2802a, the entire correction image 1902a is to be displayed on the right and left.

In addition, in the present embodiment, the left-eye control unit 105 determines the display method, but the display method may also be determined by the right-eye control unit 111, or the processing may also be shared by the two control units 105 and 111.

Fourth Embodiment

In the present embodiment, a method for improving the frame rate of the display image by changing the number of pixels to be displayed on the right and left eyes shall be shown.

A goggle-type beam scan display apparatus (head-mounted display: HMD) according to a fourth embodiment of the present invention shall be described with reference to FIGS. 1A, 1B, 2, and 49. Note that the structures shown in FIGS. 1A, 1B, and 2 are common to those in the first embodiment, and the description thereof shall therefore be omitted.

The control units 105 and 111 include an integrated circuit which controls each unit of the HMD. The control units 105 and 111 control: laser emission from the light sources 101 and 110, and operations of the wavefront shape changing units 102 and 109, and of the scan units 103 and 108.

Figure 49:
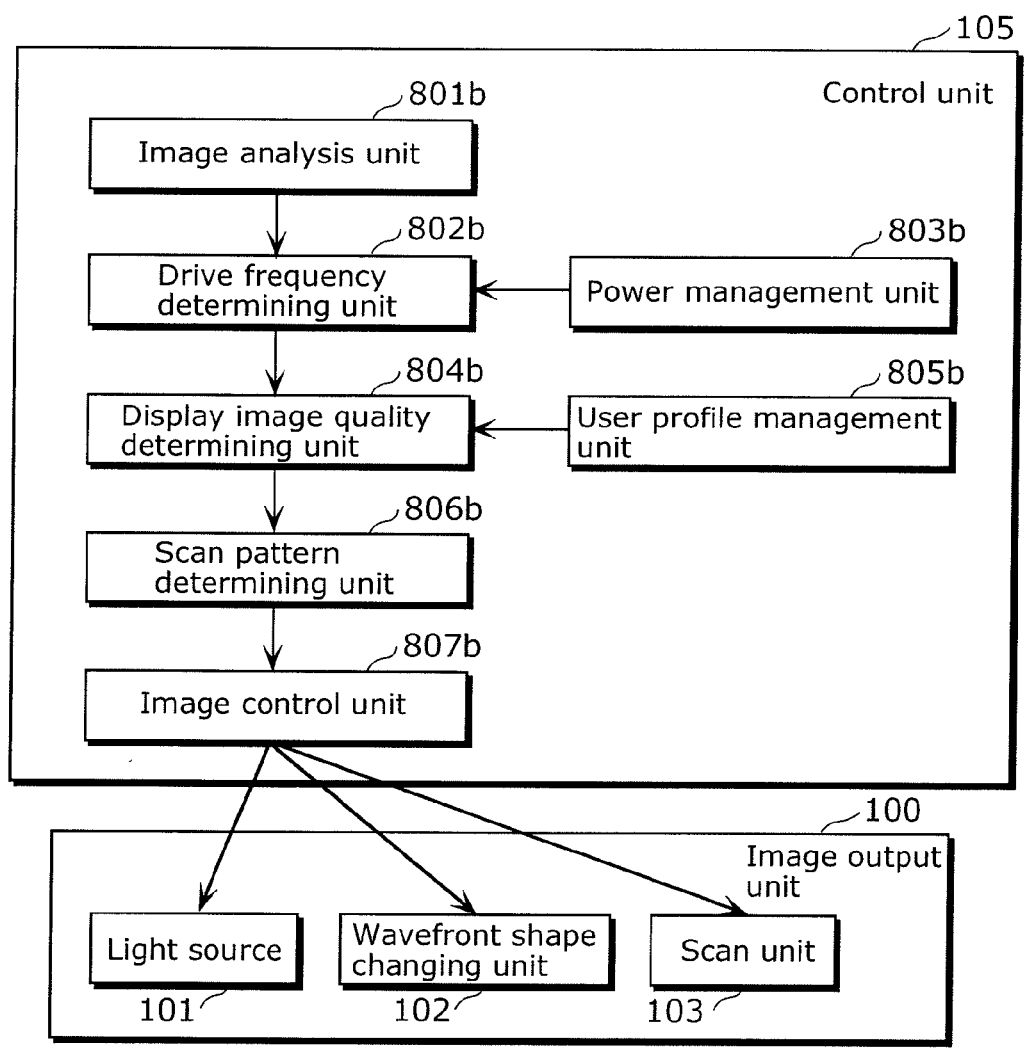
FIG. 49 is a functional block diagram of a beam scan display apparatus in a fourth embodiment of the present invention.

FIG. 49 shows a functional block diagram of the left-eye control unit 105 in the present embodiment. The left-eye control unit 105 includes: an image analysis unit 801b, a drive frequency determining unit 802b, a power management unit 803b, a display image quality determining unit 804b, a user profile management unit 805b, a scan pattern determining unit 806b, and an image control unit 807b.

The image analysis unit 801b analyzes an original image. Specifically, the image analysis unit 801b obtains the resolution and the frame rate of the original image as well as content information indicating the content of the original image.

The drive frequency determining unit 802b changes the maximum value of the drive frequencies for both the left-eye scan unit 103 and right-eye scan unit 108 according to the result of the detection performed by the power management unit 803b.

The power management unit 803b detects the remaining charge of a battery loaded on the beam scan display apparatus.

The display image quality determining unit 804b corrects at least one of the frame rate and the number of display pixels of the original image, based on the maximum drive frequencies of the left-eye scan unit 103 and the right-eye scan unit 108.

The user profile management unit 805b holds an image quality correction value which is set by the user per content information, information regarding the user's vision, and so on.

The scan pattern determining unit 806b causes the left-eye scan unit 103 and the right-eye scan unit 108, respectively, to scan a beam in a predetermined pattern. Specifically, the scan pattern determining unit 806b divides the display image into scan fields, and causes the left-eye scan unit 103 and the right-eye scan unit 108 to scan the beam, respectively, such that different scan fields are scanned by the left-eye scan unit 103 and the right-eye scan unit 108 in each frame, and such that scan fields other than the different scan fields having been scanned are scanned by the left-eye scan unit 103 and the right-eye scan unit 108 in an adjoining frame.

The image control unit 807b controls the emission from the light sources 101 and 110 in order to achieve a scan pattern determined by the scan pattern determining unit 806b.

Note that the control units 105 and 111 may also include a communication unit, which is connected wirelessly to a peripheral device such as a cellular phone to receive a video and audio signal. An image control unit included in each of the control units 105 and 110 may also have memory in which an image to be presented to the user is stored, or may also obtain, wirelessly, the image to be presented to the user from an external device.

Note that only one of the control units 105 and 111 may be provided, with the one of the control units 105 and 111 controlling the operations of: the light sources 101 and 110 corresponding to the right and left eyes, the wavefront shape changing units 102 and 109, the scan units 103 and 108, and the headphone units 106 and 112. In this case, it is possible to reduce the size of the beam scan display apparatus.

The headphones 106 and 112 each include a speaker so as to output sound. Note that the headphones 106 and 112 may also include a battery which supplies power to each of the units in the HMD.

Note that each unit and function in FIG. 1 may be or may not be embedded in a single HMD. For example, all the units in FIG. 1 may be included in the single HMD, or the headphones 106 and 112 need not be provided. In addition, the respective units may be dispersedly provided. For example, the control units 105 and 111 may be partially included in the scan units 103 and 108 or in the wavefront shape changing units 102 and 109. Each unit in FIG. 1 may also be shared by plural devices. For example, the light sources 101 and 110 may be shared by two HMDs.

Shown below is an example of how to suppress, while improving the frame rate, the degradation of the virtual image quality of the display image in the beam scan display apparatus shown in FIG. 1, by utilizing the above-mentioned image fusion effect.

Note that in the present embodiment the scan units 103 and 108 are mirror devices having an identical structure. In addition, as shown in FIG. 74, these mirror devices are a device that performs two-dimensional scanning by using a single-plate mirror driven by a drive element.

The scan units 103 and 108 in the present embodiment are designed to be capable of scanning an incident laser beam at a horizontal scan angle of α4 degrees and a vertical scan angle of β4 degrees, so as to display an image with horizontal resolution Nx4 and vertical resolution Ny4. In addition, it is assumed that the maximum horizontal drive frequency is Hx4 and the maximum vertical drive frequency is Hy4 for the scan units 103 and 108. In addition, the scan units 103 and 108 repeat, more than one time, an operation of scanning pixels horizontally (in a first direction) by sequentially shifting the position vertically (in a second direction orthogonal to the first direction), to thereby draw a frame of image. In addition, in the present embodiment, an overscan rate for the scan units 103 and 108 scanning the display image is assumed as A.

Figure 50:
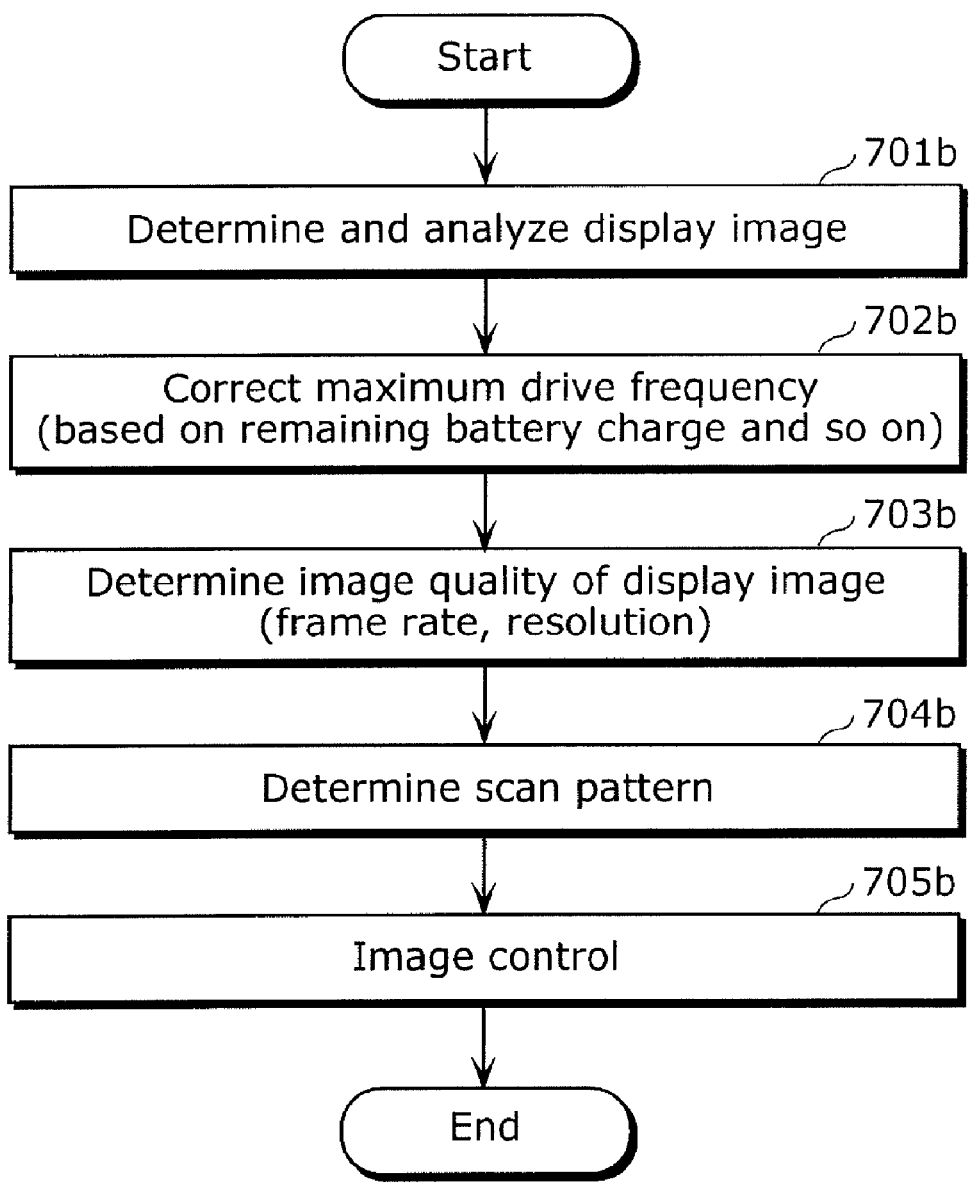
FIG. 50 is a flowchart of a process for changing a frame rate and resolution of a display image.

Shown below is a specific example of processing for determining the frame rate and the resolution in the present embodiment. This processing is performed by executing Steps 701b to 705b shown in FIG. 50.

Step 701b

Figures 51, 52:
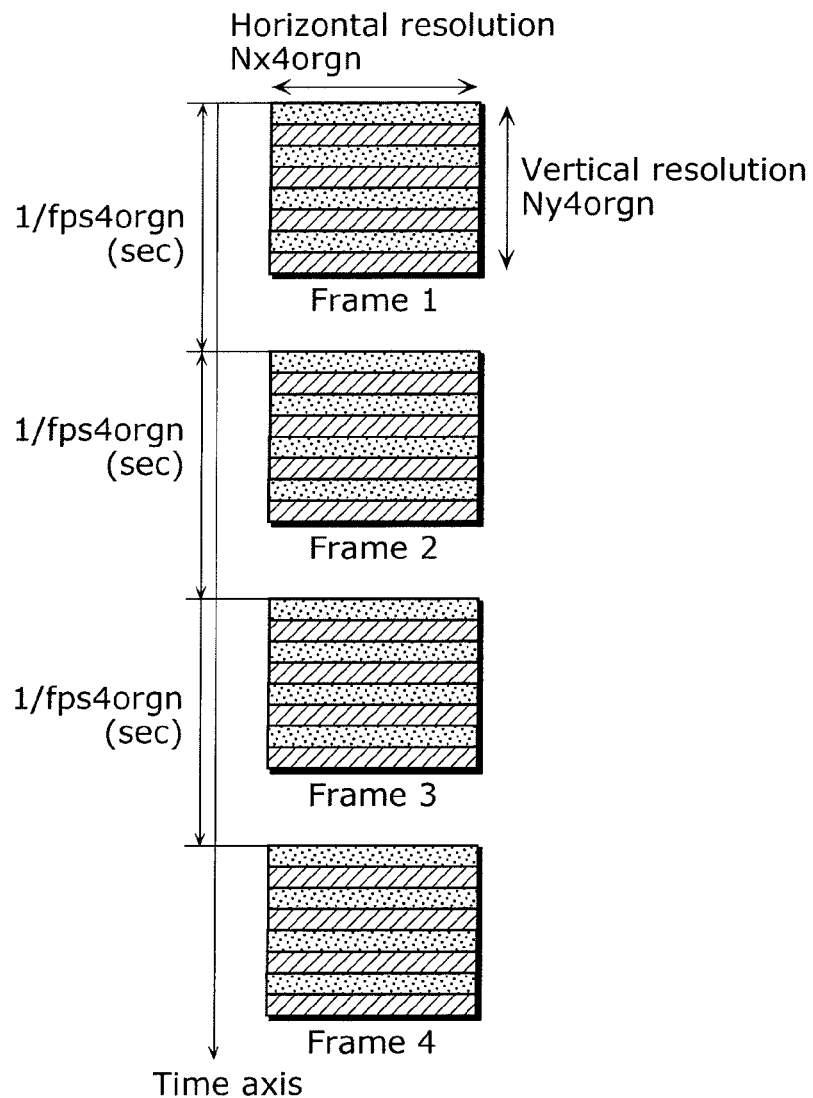
FIG. 51 is a diagram showing dimensions of an original image used for display.
FIG. 52 is a diagram showing an example of metadata appended to the original image.

In this step, the image analysis unit 801b analyzes the content of the image to be presented to the user. FIG. 51 illustrates an original image that is the original data of the image to be displayed to the user by the HMD shown in FIG. 1. In the fourth embodiment, as the original image, an image is prepared which has horizontal resolution $Nx4_{orgn}$ (hereinafter, the parameter of the original image is shown as "orgn (original)"), vertical resolution $Ny4_{orgn}$, and a frame rate $fps4_{orgn}$. This original image may be stored in a storage unit in the control unit 105 or may also be obtained from an external device via communication.

The image analysis unit 801b obtains values of the resolution $Nx4_{orgn}$ and $Ny4_{orgn}$ and the frame rate $fps4_{orgn}$ by analyzing the image data of the original image.

In addition, the image analysis unit 801b determines the content (genre) of the original image such as sports and movies, from the metadata appended to the original image. FIG. 52 illustrates the metadata appended to the original image in the present embodiment. When the metadata in FIG. 52 is assigned, the image analysis unit 801b determines the genre of the original image as "music".

Note that the image analysis unit 801b may obtain the values of the resolution $Nx4_{orgn}$ and $Ny4_{orgn}$ and the frame rate $fps4_{orgn}$ from the metadata appended to the original image. In addition, the format of the image to be handled by the HMD in FIG. 1 may be previously set, and then the values of the resolution $NX4_{orgn}$ and $Ny4_{orgn}$ and the frame rate $fps4_{orga}$ may be determined from the set values. In this case, it is possible to reduce processing costs for analyzing the image.

In addition, the format of the metadata may be a unique MXL format (Extensible Markup Language) or may be something standardized according to the XML format such as MPEG7 (Moving Picture Experts Group 7).

In addition, the metadata may be binary data embedded in a specific field of the image data. In this case, management of images is facilitated because there is no need to handle the metadata separately.

Step 702b

In this step, the drive frequency determining unit 802b corrects the maximum drive frequencies Hx4 and Hy4 of the scan units 103 and 108.

The drive frequency determining unit 802b generates a horizontal maximum allowable drive frequency $Hx4_{max}$ and a vertical maximum allowable drive frequency $Hy4_{max}$ by determining a horizontal frequency correction value Xa and a vertical frequency correction value Ya and then multiplying the values by Hx4 and Hy4, respectively.

In the present embodiment, the drive frequency determining unit 802b obtains, from the power management unit 803b, a current remaining battery charge for the HMD in FIG. 1, and determines, as an example of the image correction value, the values of the horizontal frequency correction value Xa and the vertical frequency correction value Ya according to the value of the remaining battery charge. FIG. 53 shows a calculation table which is used by the drive frequency determining unit 802b for calculating the values of Xa and Ya from the remaining battery charge. In this example, the values in the calculation table in FIG. 53 are determined such that, when the remaining battery charge falls below 60%, the maximum drive frequencies for the scan units 103 and 108 are reduced so as to reduce power consumption.

Note that the drive frequency correction values Xa and Ya may also be determined according to a value other than the remaining battery charge. For example, the scan units 103 and 108 may be caused to perform at lower frequency when they are used longer, by keeping record of how many years they have been used. In this case, it is possible to perform processing that takes durability of the beam scan display apparatus into consideration.

In addition, a sensor may be attached to the scan units 103 and 108, to thereby detect a difference between the maximum drive frequency as suggested by the specifications and the actual maximum drive frequency, and the values of drive frequency correction values Xa and Ya may be determined such that the values approach the actual maximum drive frequency. In this case, it is possible to perform processing properly even when the actual operation of the scan units 103 and 108 are different from the designed values.

Step 703b

In this step, the display image quality determining unit 804b determines horizontal resolution $Nx4_{disp}$ (hereinafter, the parameter of the display image is shown as "disp (display)"), vertical resolution $NY4_{disp}$, and a frame rate $fps4_{disp}$ of each of the display images on the right and left, which are to be displayed to the user in the HMD in FIG. 1.

As described earlier, the relationship as represented by Expression (4) is established between the horizontal drive frequency Hx of the scan units 103 and 108, and the vertical resolution Ny and the frame rate fps of the display image. Accordingly, assuming that the horizontal drive frequency for displaying the display image having vertical resolution $Ny4_{orgn}$ at the frame rate $fps\,4_{orgn}$ is $Hx4_{orgn}$, $Hx4_{orgn}$ is represented by Expression (25).

[Expression 25]

$$Hx4_{orgn} = Ny4_{orgn} \times fps4_{orgn}/(2 \times A) \qquad (25)$$

Here, when the value of the horizontal maximum allowable drive frequency $Hx4_{max}$ of the scan units 103 and 108 is higher than the horizontal drive frequency $Hx4_{orgn}$ required for displaying the original image, the display image quality determining unit 804b sets the resolution $Nx4_{disp}$ and $Ny4_{disp}$ of the display image to $Nx4_{orgn}$ and $Ny4_{orgn}$ of the original image, and sets the frame rate $fps4_{disp}$ of the display image to the value of the frame rate $fps4_{orgn}$ of the original image, so as to perform the processing in Step 704b.

On the other hand, when the value of $Hx4_{max}$ is below $Hx4_{orgn}$, the scan units 103 and 108 cannot display an image having the vertical resolution $Ny4_{orgn}$ and the frame rate $fps4_{orgn}$. In this case, the display image quality determining unit 804b needs to perform either or both of the processes for: setting the value of the vertical resolution $Ny4_{disp}$ of the display image to be displayed onto both eyes below the vertical resolution $Ny4_{orgn}$ of the original image, and setting the frame rate $fps4_{disp}$ below $fps4_{org}$.

According to the relationship represented by Expression (4), the horizontal drive frequency $Hx4_{disp}$ required for displaying an image having the vertical resolution $Ny4_{disp}$ and the frame rate $fps4_{disp}$ is given by Expression (26).

[Expression 26]

$$Hx4disp = Ny4disp \times fps4disp/(2 \times A) \qquad (26)$$

The display image quality determining unit 804b determines the resolution $Ny4_{disp}$ and the frame rate $fps4_{disp}$ to have a value of $Hx4_{disp}$ equal to or lower than $Hx4_{max}$.

Note that in the present embodiment the display image quality determining unit 804b determines the resolution of the display image, assuming the image fusion effect of both eyes as mentioned earlier. When the image to be displayed onto both eyes has the vertical resolution $Ny4_{disp}$, the relationship as represented by Expression (27) is established between the vertical resolution $Ny4_{fusn}$ of a fused image visually recognized by the user with the image fusion effect of both eyes (hereinafter, the parameter of the fusion image is shown as "fusn (fusion)"), $Ny4_{disp}$, and the vertical resolution $Ny4_{orgn}$ of the original image.

[Expression 27]

$$Ny4disp \leq Ny4fusn \leq 2 \times Ny4disp \leq Ny4orgn \qquad (27)$$

Expression (27) shows that the value of $Ny4_{fusn}$ is double the value of $Ny4_{disp}$ when vertical display lines are prevented from overlapping each other on both eyes. This corresponds to cases including a case where an upper half of the original image is displayed on the right eye and a lower half of the original image is displayed on the left eye. With this image fusion effect being utilized, it is possible to prevent degradation of the virtual resolution of the display image visually recognized by the user by appropriately selecting the position of the displays on the right and left even when the vertical resolution $Ny4_{disp}$ of the display image is decreased to half the vertical resolution $Ny4_{orgn}$ of the original image in order to increase the frame rate $fps4_{disp}$ of the display image.

In the present embodiment, the display image quality determining unit 804b determines a frame rate coefficient F for determining the value of the frame rate $fps4_{disp}$, based on the information regarding the original image, which is obtained by the image analysis unit 801b. FIG. 54 shows a calculation table of the frame rate coefficient F held by the display image quality determining unit 804b.

Here, the frame rate coefficient F is a coefficient indicating a degree to which the frame rate of the display images on both eyes is reduced with respect to the frame rate $fps4_{orgn}$ of the original image, and the display image quality determining unit 804b determines the frame rate $fps4_{disp}$ of the display image by multiplying F by $fps4_{orgn}$ after the frame rate coefficient F is determined. When the value of the frame rate coefficient F is 1, the frame rate of the display image is not reduced, and the frame rate $fps4_{orgn}$ of the original image is set as the frame rate $fps4_{disp}$ of the display image. In addition, the closer the value of the frame rate coefficient F is to 0, the more the frame rate of the display image is reduced. Note that when the value of the $fps4_{disp}$ is below 1, the display image quality determining unit 804b sets the value of $fps4_{disp}$ to 1. In the case of using the table in FIG. 54, the display image quality determining unit 804b determines the value of the frame rate coefficient F such that the degree of reduction in the frame rate is smaller for a video picture having larger motion such as sports, and such that preference is given to the resolution for information such as news in which text information is frequently used.

Note that when the display image quality determining unit 804b calculates the frame rate coefficient F, it is possible to reflect information on the user's preference for one of the frame rate and the resolution. FIG. 55 shows an example of a frame rate coefficient correction value Fa as an example of the image quality correction value. FIG. 55 is a table showing the relationship between the information on the user's preference and the frame rate correction value Fa, which is held by the user profile management unit 805b.

By using this table, it is possible to set a kind of information with which the user is to give priority to the frame rate. That is, the value of the frame rate coefficient correction value Fa is set higher for information with which the user gives priority to the frame rate. The display image quality determining unit 804b receives the frame rate coefficient correction value Fa from the user profile management unit 805b, and determines a correction frame rate $fps4_{disp}$ by adding the frame rate coefficient correction value Fa to the frame rate coefficient F and then multiplying the added value by the frame rate $fps4_{orgn}$ of the original image.

Note that when the sum of the frame rate coefficient correction value Fa and the frame rate coefficient F is larger than 1, the value of $fps4_{disp}$ is set to $fps4_{orgn}$. In addition, when the sum of the frame rate coefficient correction value Fa and the frame rate coefficient F is below 0, the value of $fps4_{disp}$ is set to 1. In addition, the value of the frame rate coefficient correction value Fa may be directly inputted via the user interface or may be automatically generated by the user profile management unit 805b. In this case, it is possible for the user to set accordingly the frame rate suited for personal preferences.

In addition, as mentioned earlier, the relationship represented by Expression (1) is established between the vertical drive frequency Hy of the scan units 103 and 108 and the frame rate fps of the display image. Accordingly, when the frame rate of the display image to be displayed to the user is set to $fps4_{disp}$, the vertical drive frequency $Hy4_{disp}$ required of the scan units 103 and 108 is given by Expression (28). Here, when the value of $Hy4_{disp}$ is higher than the vertical maximum allowable drive frequency $Hy4_{max}$ of the scan units 103 and 108, the display image quality determining unit 804b corrects the value of $fps4_{disp}$ to double the value of $Hy4_{max}$.

[Expression 28]

$$Hy4disp = fps4disp/2 \qquad (28)$$

After the frame rate $fps4_{disp}$ of the display image is determined, the display image quality determining unit 804b determines, per one frame, the vertical resolution $Ny4_{disp}$ of each of the display images to be displayed onto a corresponding one of the right and left eyes. In the present embodiment, the value of $Ny4_{disp}$ is calculated in accordance with Expression (29).

[Expression 29]

$$Ny4disp = (2 \times A \times Hx4\max)/fps4disp \qquad (29)$$

However, when the value of $Ny4_{disp}$ is equal to or lower than a minimum resolution Ymin set by the display image quality determining unit 804b as a result of the calculation according to Expression (29), the value of $fps4_{disp}$ is corrected using a calculation formula as shown by Expression (30) such that $Ny4_{disp} \geq Ymin$. Note that the value of Ymin is set such that $fps_{disp} \geq 1$.

[Expression 30]

$$fps4disp = (2 \times A \times Hx4\max)/Ymin \qquad (30)$$

In addition, when the value of $Ny4_{disp}$ is higher than $NY4_{orgn}$ as a result of the calculation according to Expression (29), the value of $NY4_{disp}$ is set to $Ny4_{orgn}$, and the value of $fps4_{disp}$ is set to the value calculated by a calculation formula shown by Expression (31).

[Expression 31]

$$fps4disp=(2 \times A \times Hx4\max)/Ny4orgn \quad (31)$$

Lastly, the display image quality determining unit 804b determines the horizontal resolution $Nx4_{disp}$ of the display image. Here, when the horizontal resolution $Nx4_{orgn}$ of the original image is higher than the vertical resolution $Nx4$ that is displayable for the scan units 103 and 108, the value of $Nx4$ is set as the value of $Nx4_{disp}$. In other cases, the value of $Nx4_{orgn}$ is set as the value of $Nx4_{disp}$.

Note that the display image quality determining unit 804b may previously determine the vertical resolution of the display image and then reduce the value of the frame rate to achieve the predetermined value. In this case, it is possible to display the image with which priority is given to the resolution.

Note that the vertical resolution and the frame rate of the display image may be directly inputted by the user via the user interface. Based on the input value inputted by the user, the user profile management unit 805b may automatically generate a table shown in FIG. 55.

Note that, although in the present embodiment, the frame rate $fps4_{orgn}$ of the original image is treated as an upper limit of the frame rate $fps4_{disp}$ of the display image, a frame rate value higher than the primary frame rate $fps4_{orgn}$ of the original image may also be set as $fps4_{disp}$ as in the case of double-speed drive display. In this case, the value of the frame rate $fps4_{disp}$ of the display image is also set so as to satisfy such limitations as represented by Expressions (3) and (4). In this case, it is possible to perform video display having less blur.

Step 704b

In this step, the scan pattern determining unit 806b determines a method by which the scan units 103 and 108 scan the laser beam.

The scan pattern determining unit 806b extracts $fps4_{disp}/fps4_{orgn}$ frames from the original image in accordance with the frame rate $fps4_{disp}$ determined in the previous step 703b, and performs, on each of the extracted frames, the following processing for determining a vertical scan field and determining display pixels.

Determining the Vertical Scan Field

First, the scan pattern determining unit 806b determines the vertical scan field in which the scan units 103 and 108 vertically scan the laser beam while drawing one frame. FIGS. 56A to 56C show examples of the vertical scan field. In a scan pattern 1401 as shown in FIG. 56A, a field equivalent to the height of the display image is vertically scanned while drawing one frame. In a scan pattern 1402 as shown in FIG. 56B, a field equivalent to half the height of the display image is vertically scanned while drawing one frame. In a scan pattern 1403 as shown in FIG. 56C, a field equivalent to a fourth of the height of the display image is vertically scanned while drawing one frame.

Note that the scan pattern determining unit 806b may also determine the vertical scan field separately for the scan units 103 and 108 for the left and the right eyes. Particularly, when the vertical scan field does not correspond to the height of the display image, it is possible to improve the virtual resolution by using the image fusion effect of both eyes, by avoiding overlap of the vertical scan fields for the scan units 103 and 108 on the left and right.

Determining Display Pixels

Next, the scan pattern determining unit 806b determines which pixels to be drawn by the scan units 103 and 108 within the vertical scan field mentioned above, in accordance with the vertical resolution $Ny4_{disp}$ and the horizontal resolution $Nx4_{disp}$ determined in the previous step.

In the present embodiment, assuming that the quotient obtained by dividing the vertical resolution $Nx4_{orgn}$ of the original image by the vertical resolution $Nx4_{disp}$ of the display image is the number of frames Nf, the scan pattern determining unit 806b selects pixels for drawing one frame such that each of the scan units 103 and 108 on the left and right draws all the pixels in at least Nf frames.

For example, when the value of the number of frames Nf is 2, the scan pattern determining unit 806b determines the scan pattern in which an upper half of the image is drawn in a first frame, and a lower half of the image is drawn in the next frame such that all the pixels are displayed in the two frames.

In addition, the value of the number of frames Nf is equal to or larger than 2, the scan pattern determining unit 806b determines the scan pattern such that the pixels to be displayed on the right and left do not overlap each other in one frame. For example, when pixels in the upper half of a certain frame of the original image are displayed on the right eye, the scan pattern determining unit 806b determines the scan pattern such that pixels in the lower half are displayed on the left eye. In addition, likewise, the scan pattern is determined such that even lines are displayed on the left eye when odd lines are displayed on the right eye.

Thus, by determining the scan pattern such that display pixels on the right and left eyes do not overlap each other in one frame, it is possible to increase the vertical resolution $Ny4_{fusn}$ of the image visually recognized by the user to double $Ny4_{disp}$, and thereby to improve the virtual resolution of the image displayed to the user even when the resolution of the display image is reduced to maintain the frame rate of the display image.

Shown below are examples of scan patterns onto the right and left eyes and display images visually recognized by the user with the image fusion effect of both eyes.

Figure 57:
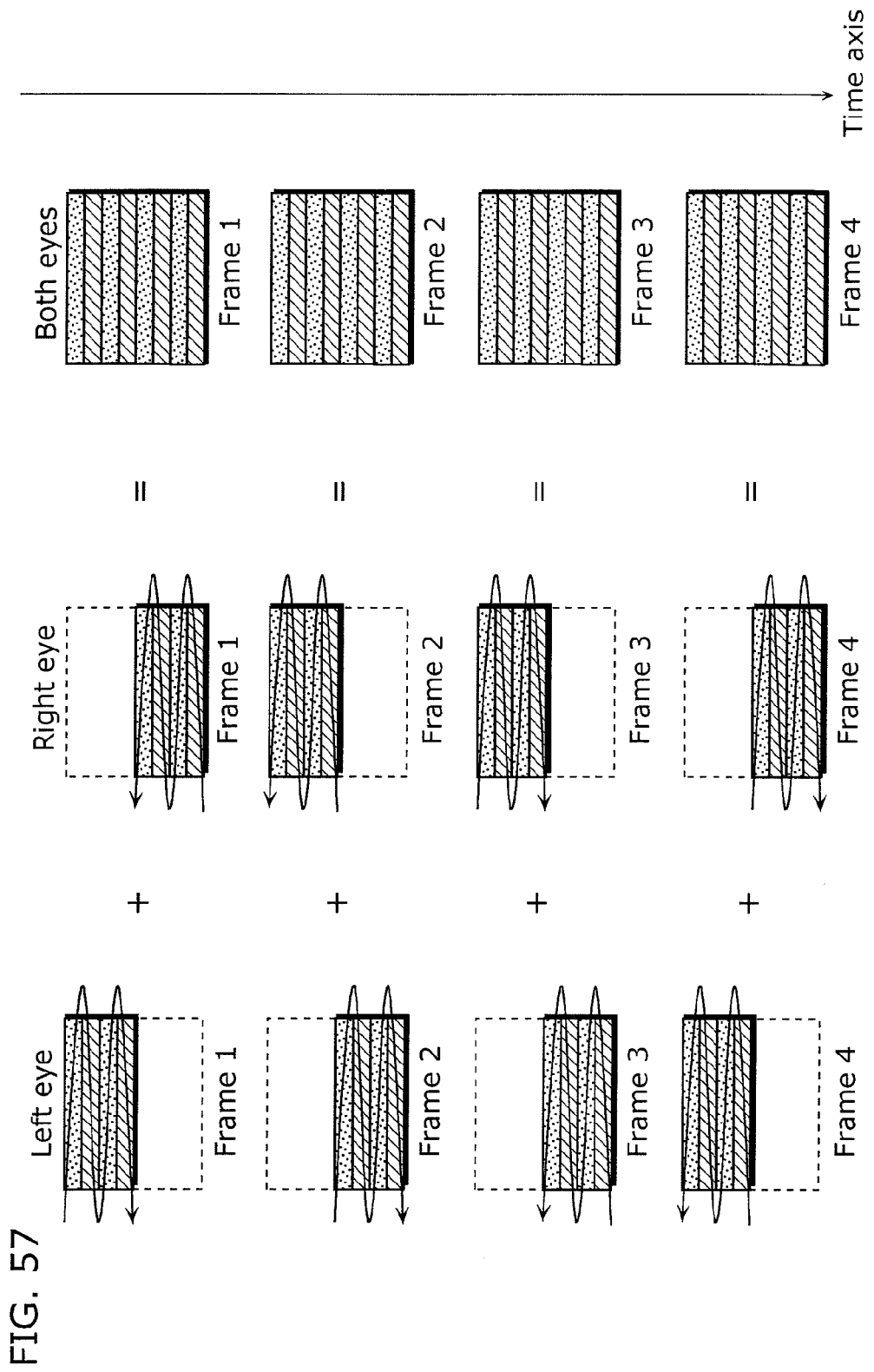
FIG. 57 is a diagram showing an example of scan patterns in the right and left scan units.

FIG. 57 shows an example of scan patterns for the right and left eyes when the vertical resolution $Ny4_{disp}$ of each of the display images on the right and left is half the resolution $Ny4_{orgn}$ of the original image (Nf=2), that is, when the display image is vertically divided into two scan fields, and a display image recognized with the image fusion effect of both eyes. In this example, when the upper half of the display image is displayed on the left eye, the lower half of the display image is displayed on the right eye. In addition, the upper half and the lower half of the display image are switched on a per-frame basis. Note that the scan field for the scan units 103 and 108 in this example is half the height of the display image.

That is, each of the left-eye scan unit 103 and the right-eye scan unit 108 scans a different scan field in an adjoining frame. In addition, the left-eye scan unit 103 and the right-eye scan unit 108 scan different scan fields in each frame. Note that the scan fields scanned by the scan units 103 and 108 in a third frame are the same as the scan field in the first frame.

Figure 58:
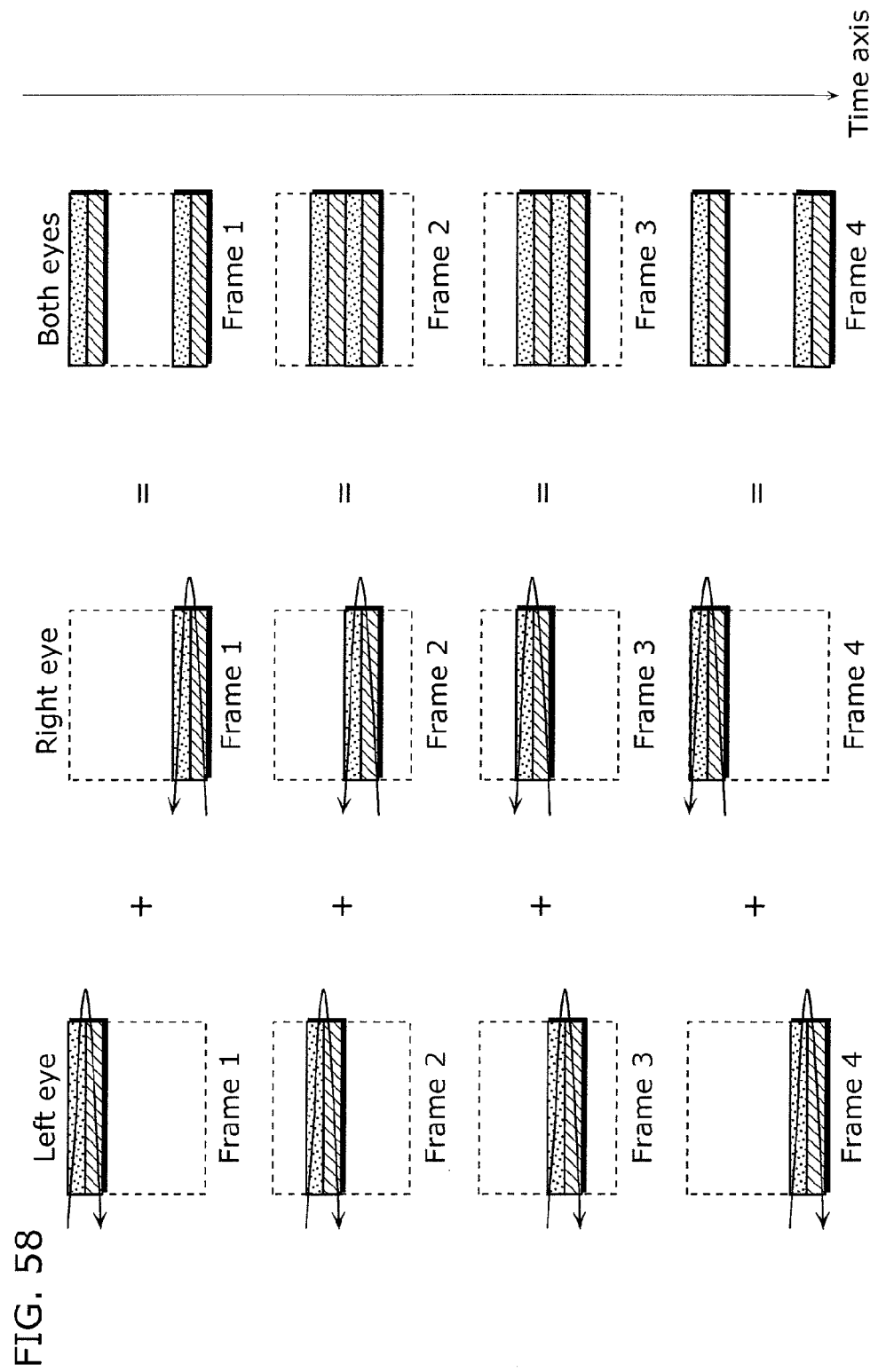
FIG. 58 is a diagram showing another example of scan patterns in the right and left scan units.

FIG. 58 shows an example of scan patterns for the right and left eyes when the vertical resolution $Ny4_{disp}$ of each of the display images on the right and left is a fourth of the resolution $Ny4_{orgn}$ of the original image (Nf=4), that is, when the display image is vertically divided into four scan fields, and a display image recognized with the image fusion effect of both eyes.

In this example, the display image is vertically divided into four scan fields. Then, the left-eye scan unit 103 scans: a top scan field in a first frame; a second scan field from the top in a second frame; a third scan field from the top in a third frame; and a bottom scan field in a fourth frame. On the other hand, the right-eye scan unit 108 scans: a bottom scan field in the first frame; a second scan field from the bottom in the second frame; a third scan field from the bottom in the third frame; and a top scan field in the fourth frame. Note that the scan field for the scan units 103 and 108 in this example is a fourth of the height of the display image.

That is, each of the left-eye scan unit 103 and the right-eye scan unit 108 scans a different scan field in an adjoining frame. In addition, the left-eye scan unit 103 and the right-eye scan unit 108 scan different scan fields in each frame. Note that the scan fields scanned by the scan units 103 and 108 in a fifth frame are the same as the scan field in the first frame.

Figure 59:
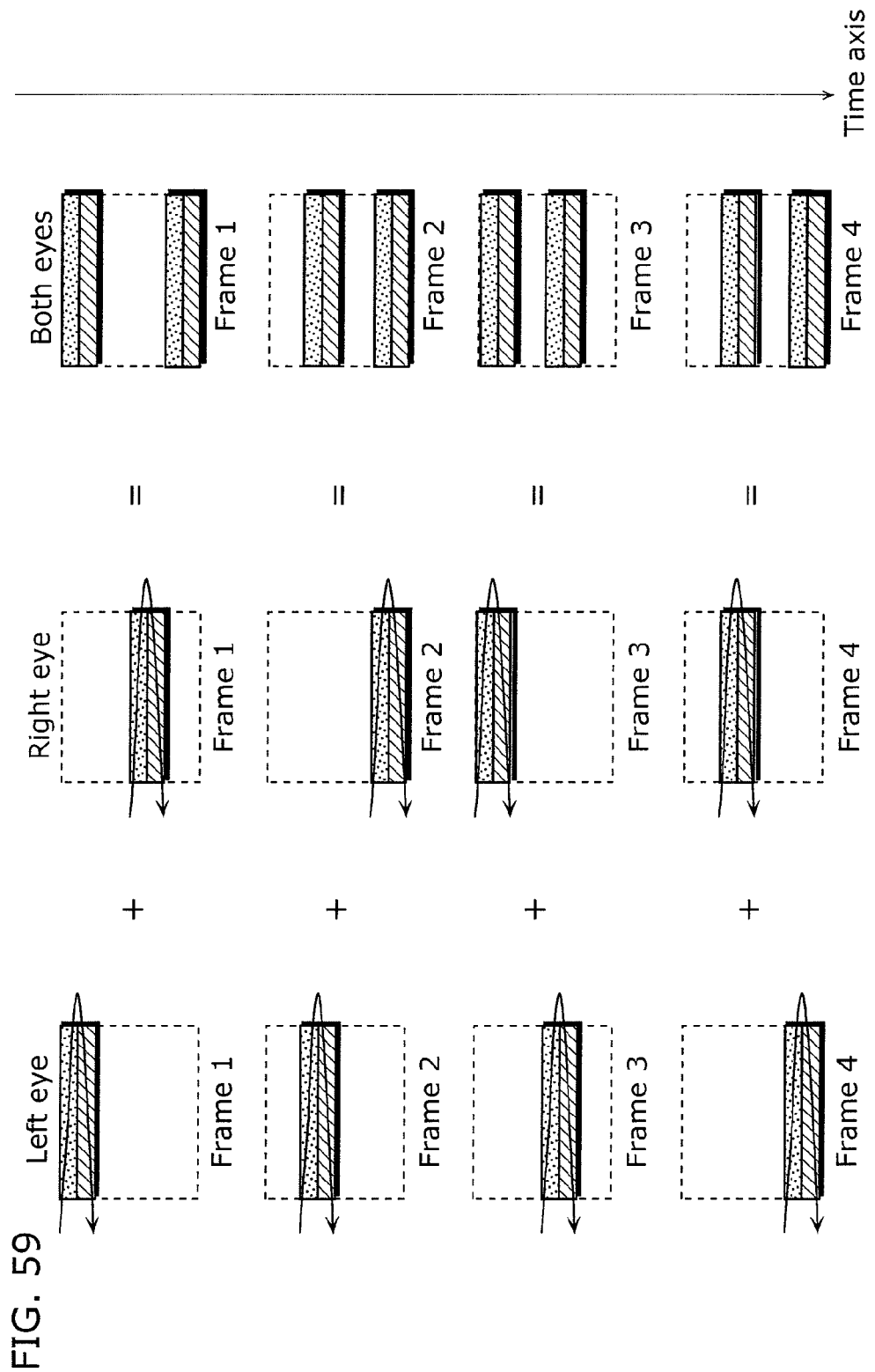
FIG. 59 is a diagram showing another example of scan patterns in the right and left scan units.

FIG. 59 shows an example of a variation of FIG. 58. The difference from FIG. 58 is that the right-eye scan unit 108 scans the four scan fields in order of: a third scan field from the top, a bottom scan field, a top scan field, and a second scan field from the top.

Also in this example, each of the left-eye scan unit 103 and the right-eye scan unit 108 scans a different scan field in an adjoining frame. In addition, the left-eye scan unit 103 and the right-eye scan unit 108 scan different scan fields in each frame. Note that the scan fields scanned by the scan units 103 and 108 in a fifth frame are the same as the scan field in the first frame.

As shown in FIGS. 57 to 59, it is possible to reduce the scan angle of the left-eye scan unit 103 and the right-eye scan unit 108 by dividing the display image such that the respective scan fields constitute a continuous region which continues in a vertical scan direction.

Figure 60:
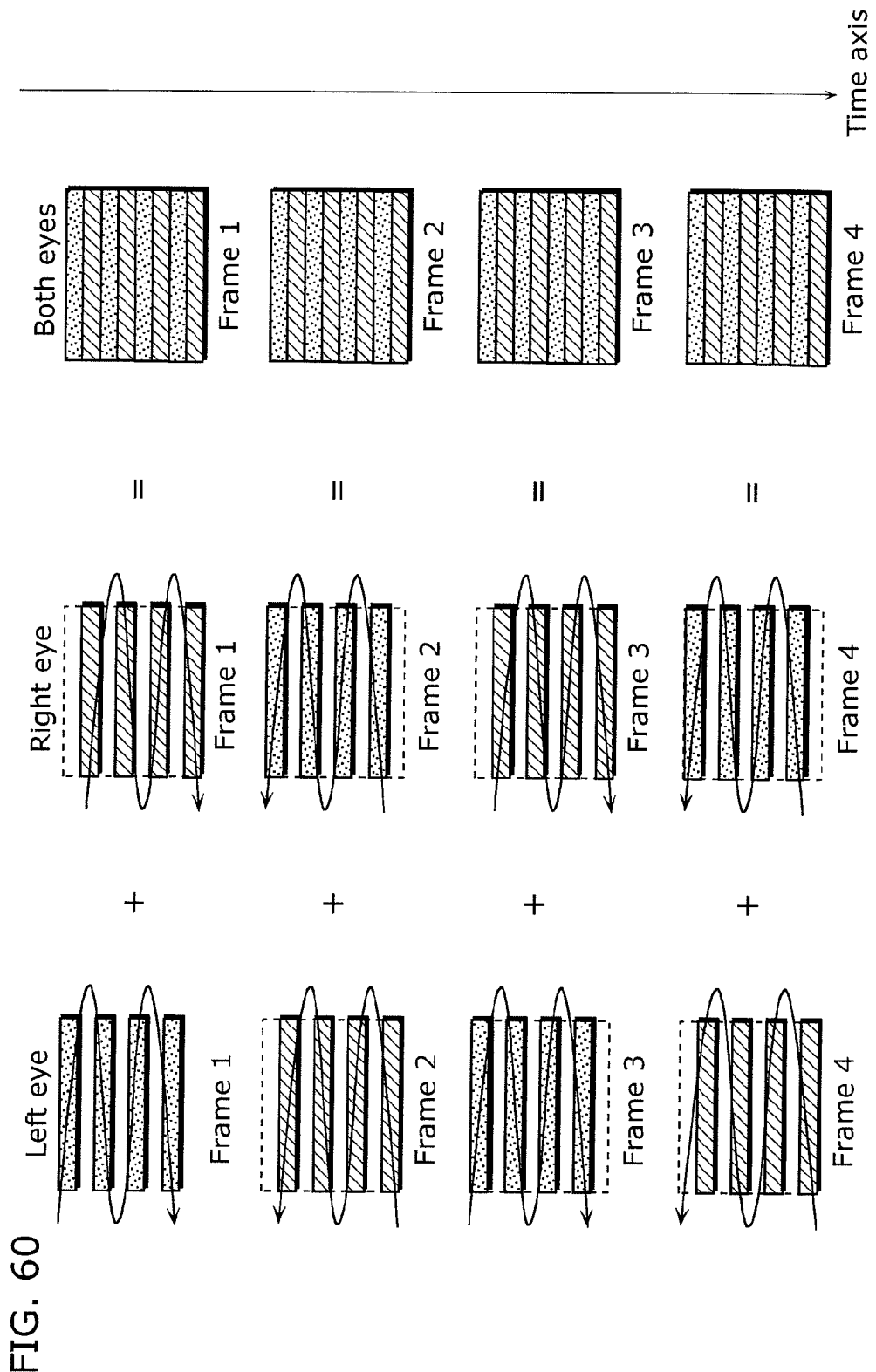
FIG. 60 is a diagram showing another example of scan patterns in the right and left scan units.

FIG. 60 shows an example of scan patterns for the right and left eyes when the vertical resolution $Ny4_{disp}$ of each of the display images on the right and left is half the resolution $Ny4_{orgn}$ of the original image (Nf=2), that is, when the display image is vertically divided into two scan fields, and a display image recognized with the image fusion effect of both eyes.

In this example, when odd lines of the display image are displayed on the left eye, even lines of the display image are displayed on the right eye. In addition, the display is switched between odd lines and even lines per each frame. Note that the scan field for the scan units 103 and 108 in this example is equivalent to the height of the display image.

Figure 61:
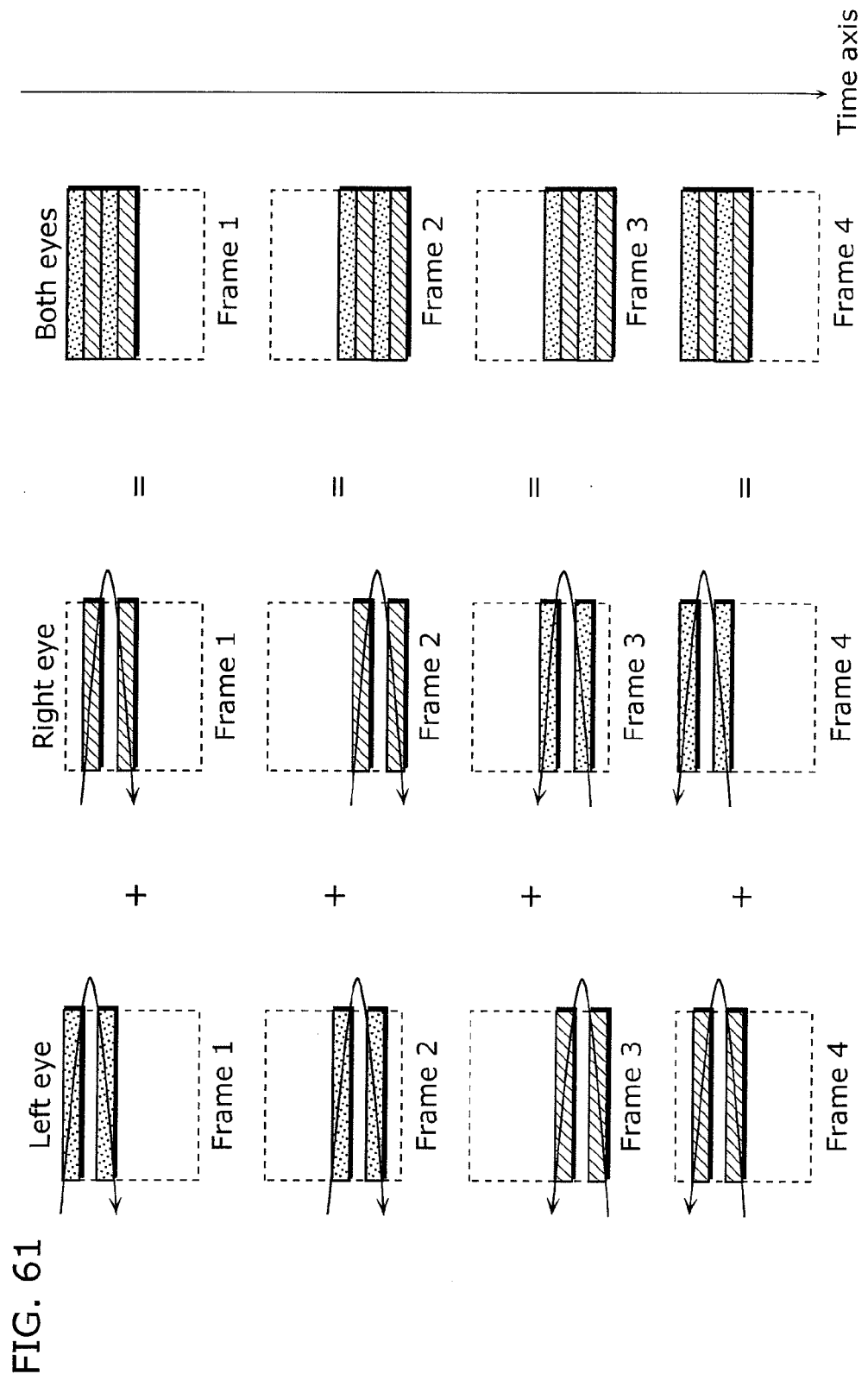
FIG. 61 is a diagram showing another example of scan patterns in the right and left scan units.

FIG. 61 is an example of scan patterns for the right and left eyes when $Ny4_{disp}$ is a fourth of $Ny4_{orgn}$ (Nf=4), that is, when the display image is vertically divided into four scan fields, and a display image recognized with the image fusion effect of both eyes.

In this example, the left-eye scan unit 103 scans, respectively: upper-half odd lines of the display image in a first frame, lower-half odd lines in a second frame; lower-half even lines in a third frame; and upper-half even lines in a fourth frame. At this time, the right-eye scan unit 108 displays lines adjoining the display lines on the left eye. Note that the scan fields scanned by the scan units 103 and 108 in a fifth frame are the same as the scan field in the first frame. In addition, the scan field for the scan units 103 and 108 in this example is three-eighths of the height of the display image.

Figure 62:
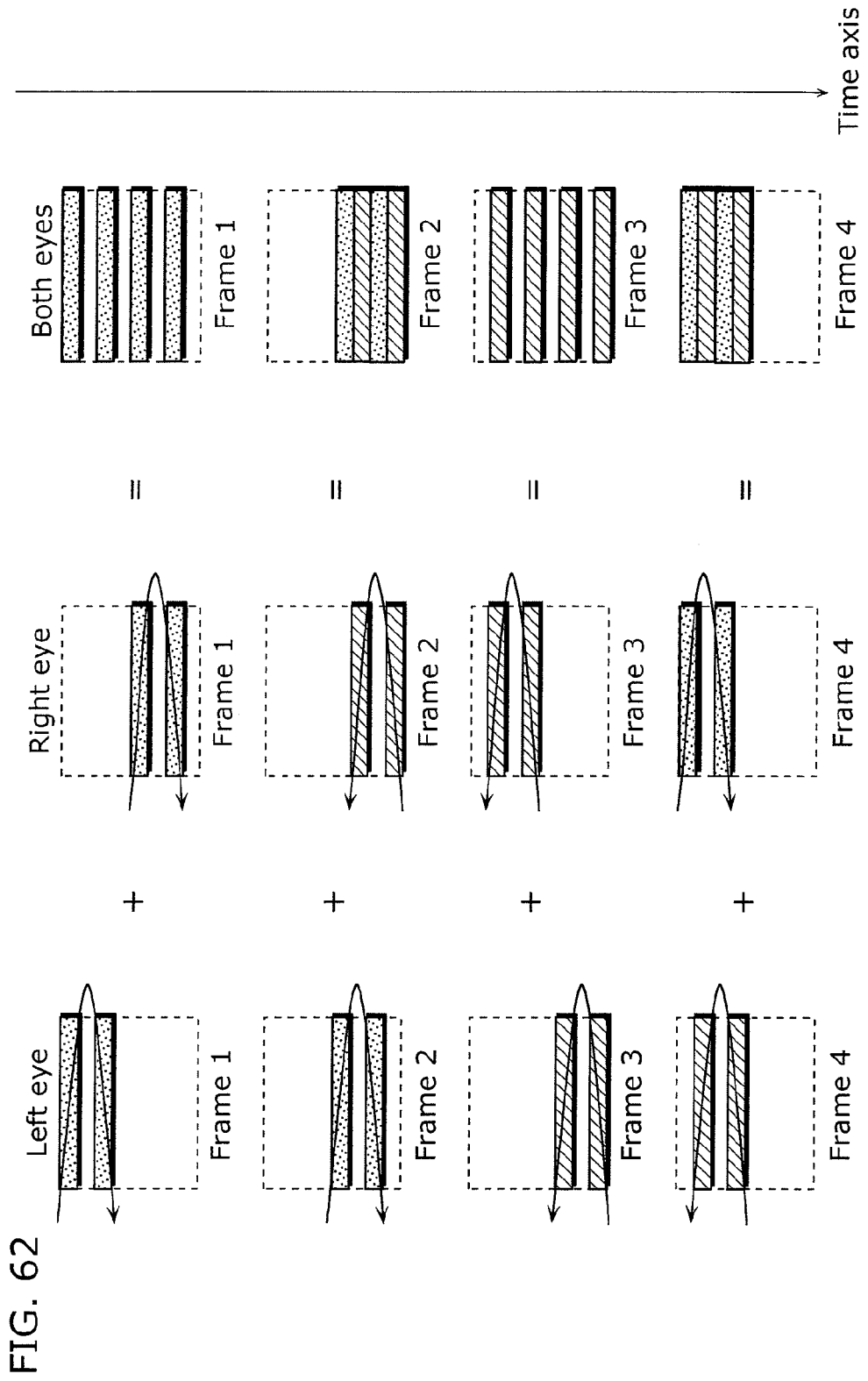
FIG. 62 is a diagram showing another example of scan patterns in the right and left scan units.

FIG. 62 is an example of a variation of FIG. 61. The difference from FIG. 62 is that the right-eye scan unit 108 scans, respectively: lower-half odd lines of the display image in the first frame; lower-half even lines in the second frame; upper-half even lines in the third frame; and upper-half odd lines in the fourth frame. Note that the scan fields scanned by the scan units 103 and 108 in a fifth frame are the same as the scan field in the first frame. In addition, the scan field for the scan units 103 and 108 in this example is three-eighths of the height of the display image.

Figure 63:
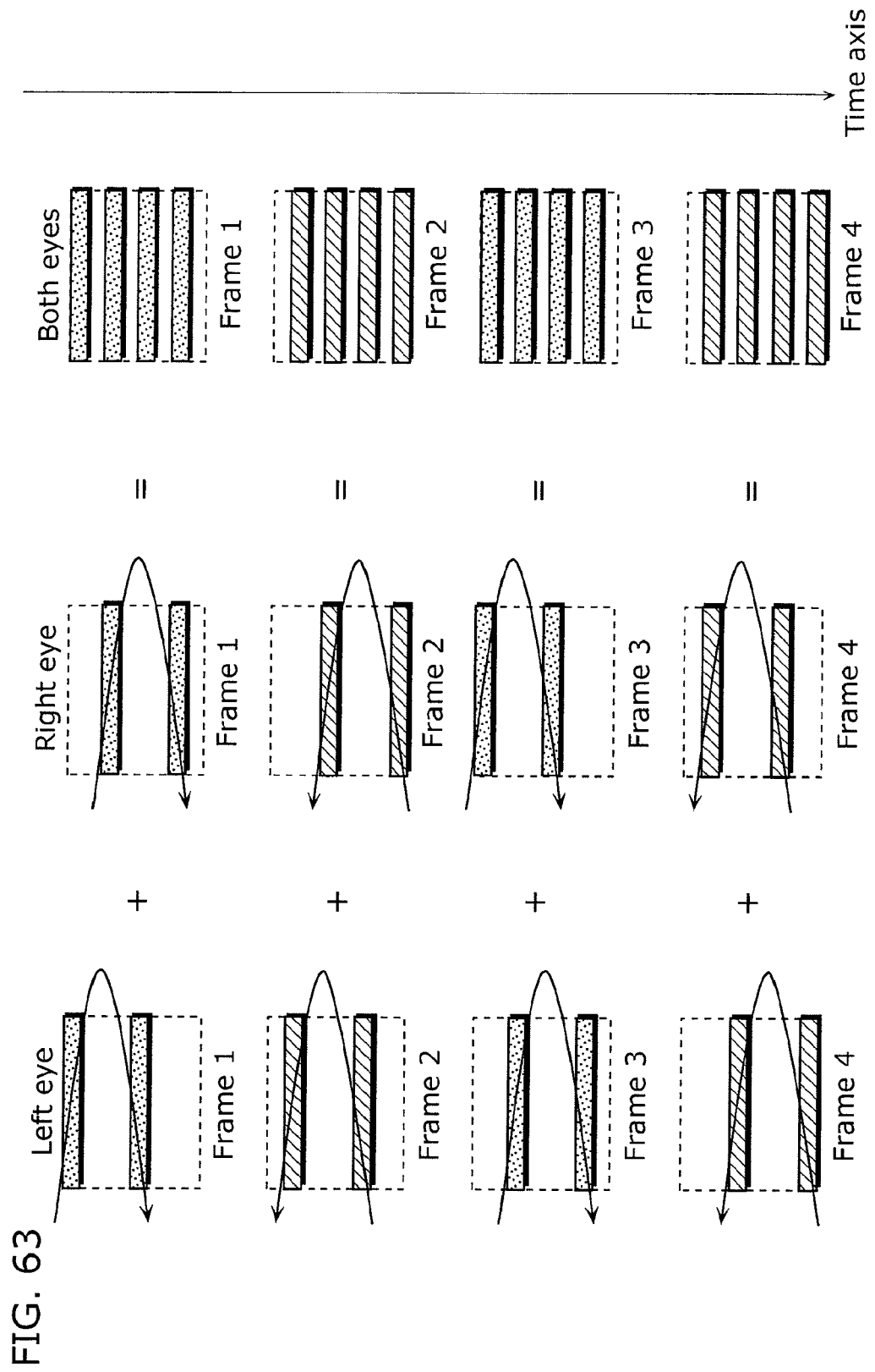
FIG. 63 is a diagram showing another example of scan patterns in the right and left scan units.

FIG. 63 is an example of scan patterns for the right and left eyes when $Ny4_{disp}$ is a fourth of $Ny4_{orgn}$ (Nf=4), that is, when the display image is vertically divided into four scan fields, and a display image recognized with the image fusion effect of both eyes.

In this example, the left-eye scan unit 103 scans, respectively: 4N-3th lines (first and fifth lines) of the display image in a first frame, 4N-2th lines (second and sixth lines) in a second frame; 4N-1th lines (third and seventh lines) in a third frame; and 4Nth lines (fourth and eighth lines) in a fourth frame. On the other hand, the right-eye scan unit 108 scans, respectively: 4N-1th lines (third and seventh lines) of the display image in a first frame, 4Nth lines (fourth and eighth lines) in a second frame; 4N-3th lines (first and fifth lines) in a third frame; and 4N-2th lines (second and sixth lines) in a fourth frame. Note that the scan fields scanned by the scan units 103 and 108 in a fifth frame are the same as the scan field in the first frame. In addition, the scan field for the scan units 103 and 108 in this example is five-eighths of the height of the display image.

As shown in FIGS. 61 to 63, it is possible to obtain a significant image fusion effect because the left-eye scan unit 103 and the right-eye scan unit 108 are intended to scan the pixels adjoining each other by dividing the display image into an offset region in which scan fields are offset-distanced from each other in a vertical direction. However, compared to the examples shown in FIGS. 57 to 59, the scan units 103 and 108 cover a wider scan field in each frame.

Note that FIGS. 57 to 63 merely show examples, and the scan pattern determining unit 806b may also use another scan pattern. In addition, although the above example shows the case where the value of Nf is at most 4, it is possible to determine similar scan patterns such that the display pixels on the right and left do not overlap each other even when the value of Nf is equal to or higher than 4. In this case, pixels are displayed in one frame, but it is possible to increase the density thereof.

Where the vertical scan field is a Nth (N is a natural number) of the height of the original image, and where the value of Nf is a Nth of $Ny4_{orgn}$, the original image which is divided crosswise into N pieces may be displayed on a per-frame basis, onto the left eye from the top and onto the right eye from the bottom. In this case, it is possible to disperse the position of pixels to be displayed on the right and left eyes.

In addition, where the vertical scan field is a Nth (N is a natural number) of the height of the original image, and where the value of Nf is a Nth of $Ny4_{orgn}$, it is also applicable to display the original image that is vertically divided into the N pieces, onto the left eye from the top, and display, onto the right eye, pixels in a field adjoining the field displayed on the left eye.

In addition, when the vertical scan field has the same height as the original image, and when the value of Nf is a Nth of $Ny4_{disp}$ (N is a natural number), another applicable method is to display pixels of a (NM−N+L)th line in an Lth frame on the left eye (M is a natural number), and display, onto the right eye, pixels of lines adjoining the pixels displayed on the left eye. Note that at this time, in displaying frames after N+1, the display from the first frame to the Nth frame is repeated.

Note that the scan pattern determining unit 806b may also select display pixels such that the pixels on the right and left partially overlap each other, instead of scanning completely different pixels on the right and left. At this time, although the value of vertical resolution $Ny4_{fusn}$ of the display image obtained by the image fusion effect on the right and left decreases, displaying the same pixels onto the right and left produces an effect of facilitating the image fusion with both eyes.

In addition, the smaller the vertical scan range is, the smaller are the vertical drive frequency for the scan units 103 and 108; thus, the scan pattern determining unit 806b may use a method of determining the vertical scan field in accordance with the value of the vertical maximum allowable drive frequency $Ny4_{max}$.

Note that when the value of $fps4_{disp}$ is higher than the frame rate $fps4_{orgn}$ of the original image as in the case of double-speed driving, the value of $fps4_{disp}/fpS4_{orgn}$ is higher than 1. At the time, an image to be presented to the user is generated by displaying preceding and succeeding frames without extra processing, or by generating a difference frame from the preceding and succeeding frames.

Step 705 Image Control

In this step, the image control unit 807b controls, on a per-frame basis, the light sources 101 and 110 and the scan units 103 and 108 according to the result of the previous step 704b, so as to realize a designated scan pattern.

Note that Steps 704b and 703b may be reversely performed. In this case, the resolution $Nx4_{disp}$ and $Ny4_{disp}$ of the display image and the frame rate $fps4_{disp}$ are determined to fit the scan pattern.

In addition, in the present embodiment, an example of processing is given in which low speed is assigned to vertical scan, but the processing speed may also be switched between horizontal and vertical scans.

Note that the control processing in each embodiment described above may be realized with a dedicated H/W (such as an electronic circuit) or may also be realized by causing a CPU to interpret and execute predetermined program data, which is stored in a storage apparatus (such as a ROM, a RAM, and a hard disk) and can execute the above-described processing procedures. In this case, the program data may be introduced into a storage apparatus through a recoding medium, or may be directly executed from a recoding medium. Note that the recoding medium includes: a ROM, a RAM, and semiconductor memory such as flash memory, magnetic disk memory such as a flexible disk or a hard disk, an optical disk such as a CD-ROM, a DVD, and a BD, and a memory card such as an SD card. In addition, the recording medium is a concept including a communication medium such as a phone line and a carrier route.

In addition, it is possible to modify the embodiments of the present invention where appropriate within a range not departing from the scope of the present invention. It is naturally possible to use the embodiments of the present invention in combination.

Next, representative uses of the beam scan display apparatus according to each of the above described embodiments shall be described with reference to FIGS. 64 to 73. Described below is each of the representative uses to which the beam scan display apparatus according to the first embodiment is applied. However, the second to the fourth embodiments are also applicable in the same manner, or an arbitrary combination of embodiments from among the first to the fourth embodiments is also applicable. In addition, it goes without saying that the use of the beam scan display apparatus is not limited to the uses described below.

In addition, in the present embodiment, the left-eye control unit 105 determines the display method, but the display method may also be determined by the right-eye control unit 111, or the processing may also be shared by the two control units 105 and 111.

Fifth Embodiment

Figure 64:
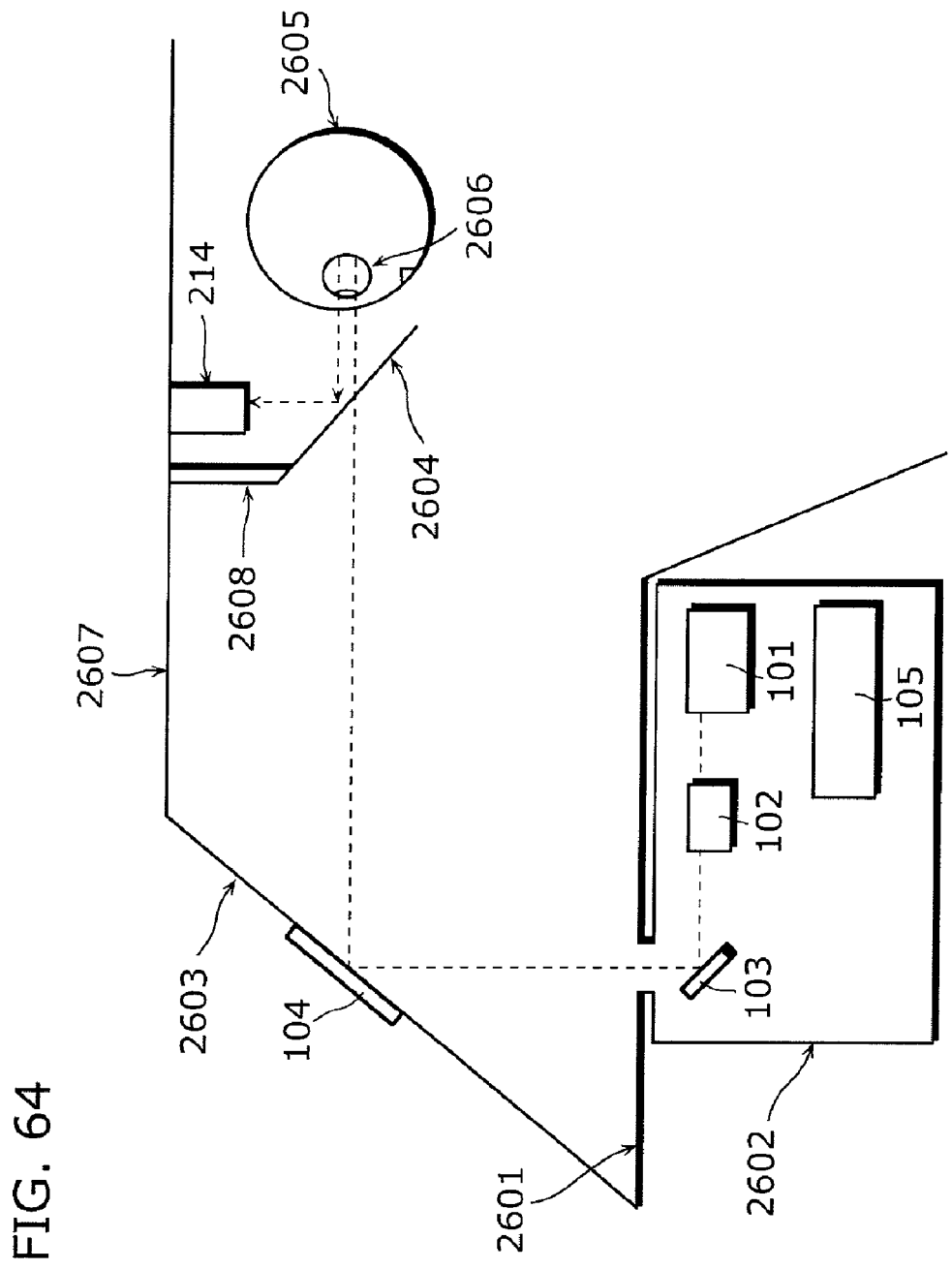
FIG. 64 is a side view of a HUD in a fifth embodiment.
Figure 65:
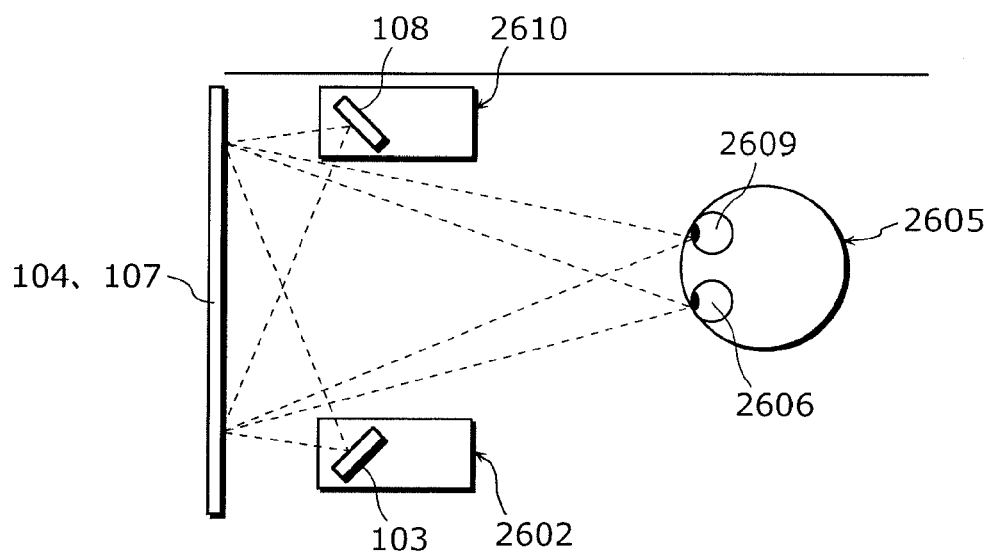
FIG. 65 is an example of a bird's eye view of the HUD shown in FIG. 64.
Figure 66:
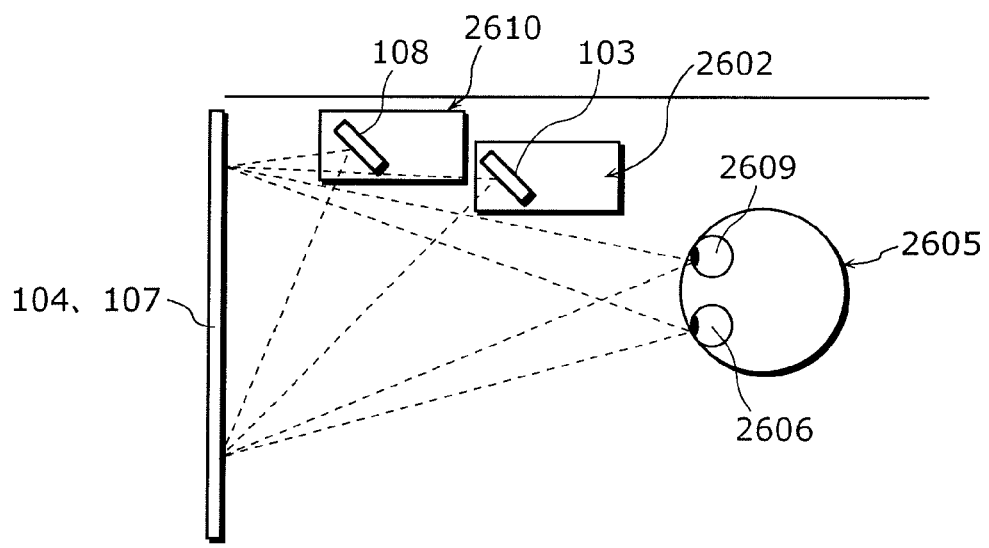
FIG. 66 is a diagram showing another example of a bird's eye view of the HUD shown in FIG. 64.
Figure 67:
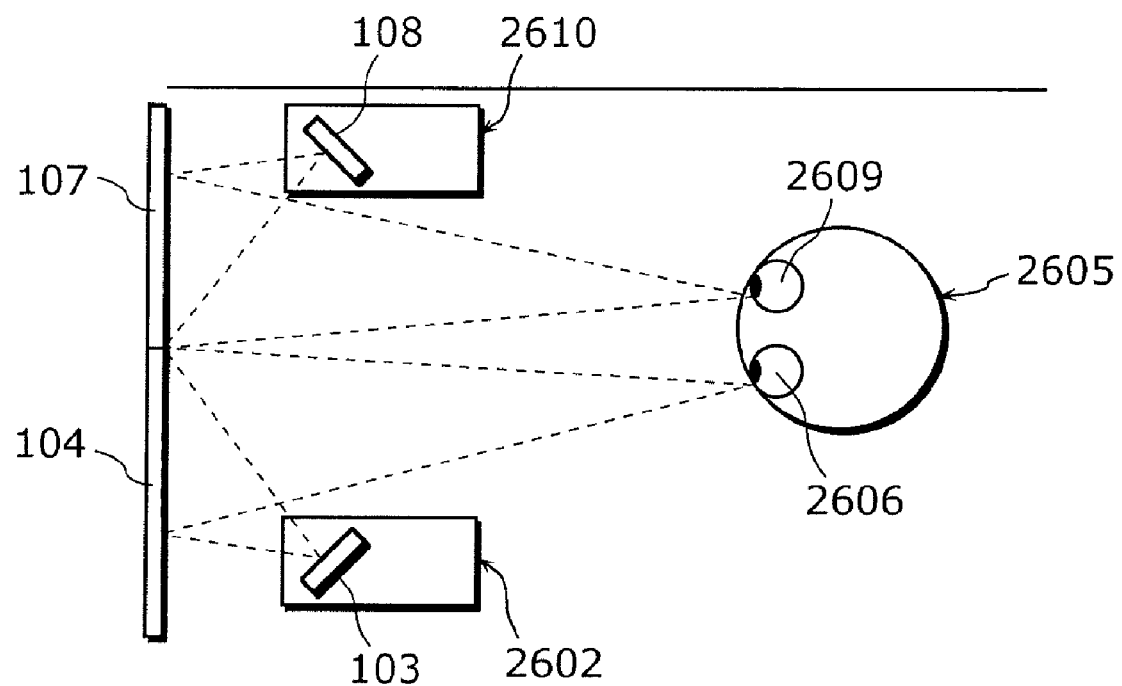
FIG. 67 is a diagram showing another example of a bird's eye view of the HUD shown in FIG. 64.
Figure 68:
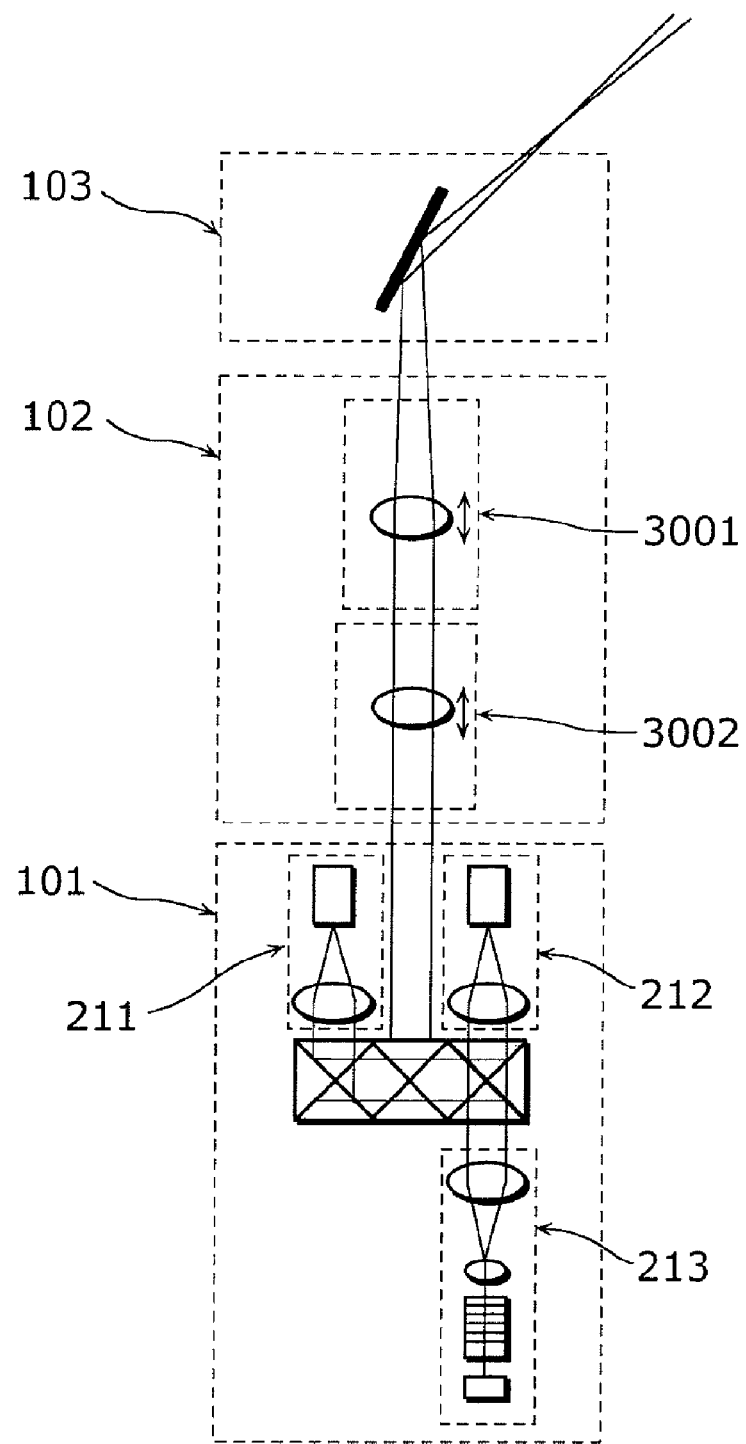
FIG. 68 is a detailed configuration diagram of the HUD shown in FIG. 64.

A laser scan Head-Up Display (HUD) according to a fifth embodiment of the present invention shall be described with reference to FIGS. 64 to 68. Note that FIG. 64 is a side view of the HUD, FIG. 65 is a bird's eye view of the HUD, FIGS. 66 and 67 are variations of FIG. 66, and FIG. 68 is a detailed view of a left-eye laser scan unit 2602 of FIG. 64.

In a vehicle 2601, the left-eye laser scan unit 2602 and a right-eye laser scan unit 2610 are embedded. The laser scan units 2602 and 2610 are attached to a lower side of a windshield 2603 of the vehicle 2601 (in the present embodiment, inside the instrumental panel), so that the size of the display apparatus is reduced.

Note that the laser scan unit 2602 and 2610 may be provided not inside but outside the instrument panel. In this case, it is easy to replace or change the positions of the laser scan units 2602 and 2610.

Note that the laser scan units 2602 and 2610 may be provided not on the instrument panel but on a ceiling 2607. In this case, it is possible to reduce the volume required for an instrument panel portion, thereby making it possible to increase the space within the vehicle.

Note that both the laser scan units 2602 and 2610 may be provided to the right of the user as shown in FIG. 66, other than being provided sandwiching the user in between as shown in FIG. 66. In this case, since the left-eye laser scan unit 2602 need not be provided in the vehicle center, it is possible to increase the space in the vehicle center and improve design versatility (in FIG. 65, the left-eye laser scan unit 2602 is provided in between with a front passenger seat).

The beams scanned by the laser scan units 2602 and 2610 are reflected by the deflection units 104 and 107 attached to the windshield 2603, and pass through a half mirror 2604 to reach eyeballs 2606 and 2609 of a driver 2605, so that an image is visually recognized. With such a HUD as this, it is possible to see map information and warning information displayed by the laser scan units 2602 and 2610 while concurrently recognizing the external view through the windshield 2603, thus allowing improved safety and convenience for the driver 2605. Note that the reflected light of the laser beams projected onto the user's retina is reflected by the half mirror 2604 provided in front of the user's eyes, and is then detected by the light detection unit 214.

Note that the deflection units 104 and 107 may also be realized as a single hologram mirror by using multiple exposure onto a hologram as shown in FIGS. 65 and 66, other than providing the deflection units 104 and 107 separately on the windshield 2603 as shown in FIG. 67. In this case, it is possible to increase the sizes of the left-eye deflection unit 104 and the right-eye deflection unit 107, respectively, thus allowing display of a wider-field image to the user.

In addition, the half mirror 2604 may be provided in pairs for the right and left eyes, or a half mirror which is horizontally long may also be used.

The left-eye laser scan unit 2602 includes: a light source 101, a wavefront shape changing unit 102, a scan unit 103, and a control unit 105. In addition, the right-eye laser scan unit 2610 includes: a light source 110, a wavefront shape changing unit 109, a scan unit 108, and a control unit 111. FIG. 68 shows an example of the structures of the light source 101, the wavefront shape changing units 102, and the deflection unit 104 in the laser scan unit 2602 for the left eye in the present embodiment.

As in FIG. 2 of the first embodiment, the light source 101 in FIG. 68 includes: a red laser source 211, a blue laser source 212, and a green laser source 213. Note that in the present embodiment, the light detection unit 214 is not included in the light source 101 but is provided on the ceiling 2607 in the vehicle 2601 as shown in FIG. 64. With this configuration, it is possible to decrease the distance between the user's retina and the light detection unit 214, thus facilitating detection of the spot size on the retina.

The wavefront shape changing unit 102 in FIG. 68 includes a focal length horizontal component changing unit 3001 and a focal length vertical component changing unit 3002 which are arranged in series in an optical path. With this, it is possible to change, independently, horizontal and vertical curvatures of the beam. The focal length horizontal component changing unit 3001 and the focal length vertical component changing unit 3002 in the present embodiment can change horizontal and vertical curvatures by varying the position of the cylindrical lens.

Note that, as with the focal length horizontal component changing unit 201 and the focal length vertical component changing unit 202 shown in FIG. 2, the focal length horizontal component changing unit 3001 and the focal length vertical component changing unit 3002 may change the wavefront shape by combining the cylindrical lens and a mirror and varying the position of the mirror. In this case, even for displaying an image having high resolution or a moving picture having a high frame rate, it is possible to appropriately change the wavefront shape by oscillating the mirror at high speed.

Note that the description of the right-eye laser scan unit 2610 is omitted for a reason of having the same structure as the left-eye laser scan unit 2602.

In addition, the deflection units 104 and 107 in the present embodiment are realized as a transmissive hologram. In the present embodiment, the deflection units 104 and 107 are manufactured to diffract and collect beams from the scan units 103 and 108 into the pupils of the user's eyes, for example, by forming a photopolymer layer on the inner surface of the windshield 2603 (inside the vehicle) and then forming a Lippmann volume hologram on the photopolymer layer. On the photopolymer layer, three holograms which reflect beams from the respective light sources of red, green, and blue may be multiply-formed, or a trilayer hologram corresponding to the beams of the respective colors may also be laminated. In addition, it is possible to realize a transmissive display by manufacturing the display such that only rays of light having light-source wavelengths are diffracted using the wavelength selectivity of the hologram, and rays of light having wavelengths other than the light-source wavelengths and accounting for a major part of the light from an external word are not diffracted.

Note that the deflection units 104 and 107 may also have freedom in attachment and detachment to and from the windshield 2603. In this case, when display is not necessary, detaching the deflection units 104 and 107 keeps the transparency of the windshield 2603, thus allowing improved safety of the driver 2605.

In the present embodiment of the present invention, with the half mirror 2604 provided before the user's eyes, the light reflected from the surface of the user's retina is reflected by the light detection unit 214. The half mirror 2604 is attached to the ceiling 2607 of the vehicle 2601 with a support bar 2608. This configuration allows detection of the spot size on the user's retina without requiring the user to wear an apparatus on the head. Note that the half mirror 2604 and the light detection unit 214 may be provided not on the ceiling 2607 in the vehicle 2601 but on eyeglasses or a cap of the driver 2605. In this case, even when the head of the driver 2605 moves back and forth, there is less possibility of the head touching the half mirror 2604, thus allowing improved safety of the driver 2605. Note that, for the light detection unit 214, only one light detection unit 214 which detects the light reflected from one of the eyes may be provided, instead of providing two light detection units for the right and left eyes. In this case, since it is possible to detect the direction of the user's line of sight without increasing the number of the light detection units 214, it is possible to reduce costs for the beam scan display apparatus.

The control units 105 and 111 include an integrated circuit which controls each unit of the HUD. The control unit 105 controls laser emission from the light sources 101 and 110 and operations of: the wavefront shape changing units 102 and 109, the scan units 103 and 108, and the light detection unit 214.

In the present embodiment, the light detection unit 214 is provided on the ceiling 2607, and the control units 105 and 111 are provided inside the instrument panel; however, the communication between the light detection unit 214 and the control units 105 and 111 may be wired by running cables inside the vehicle 2601, and may also be wireless.

Note that only one of the control units 105 and 111 may be provided to control both the left-eye laser scan unit 2602 and the right-eye laser scan unit 2610. In this case, it is possible to reduce the size of the beam scan display apparatus.

The beam scan display apparatus according to the present embodiment executes Steps 801 to 805 shown in FIG. 6, in which processing is performed for improving, by utilizing the image fusion effect of both eyes, the virtual frame rate of the image visually recognized by the user. Note that the content of the processing in Steps 801 to 805 is the same as in the first embodiment.

Sixth Embodiment

Figure 69:
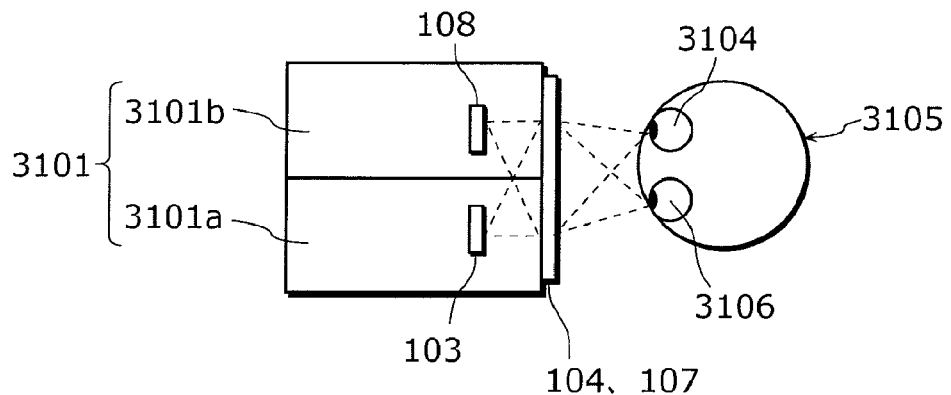
FIG. 69 is a diagram showing an example of a bird's eye view of binoculars in a sixth embodiment.
Figure 70:
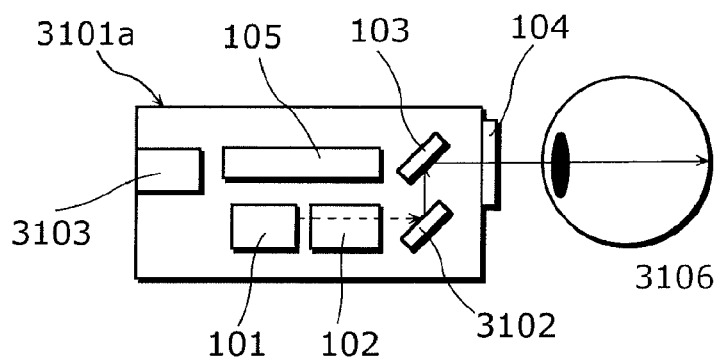
FIG. 70 is a diagram showing a left-eye side display unit of the binoculars shown in FIG. 69.
Figure 71:
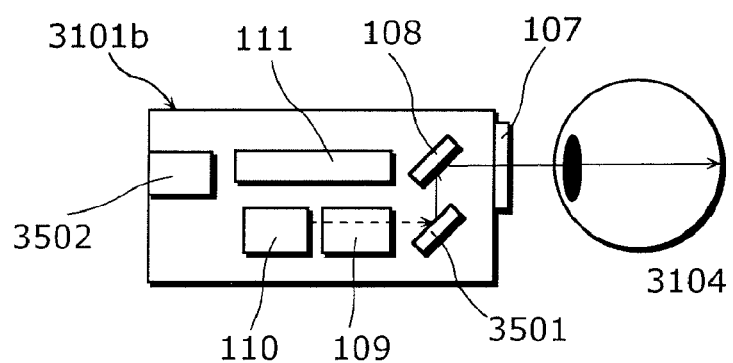
FIG. 71 is a diagram showing a right-eye side display unit of the binoculars shown in FIG. 69.
Figure 72:
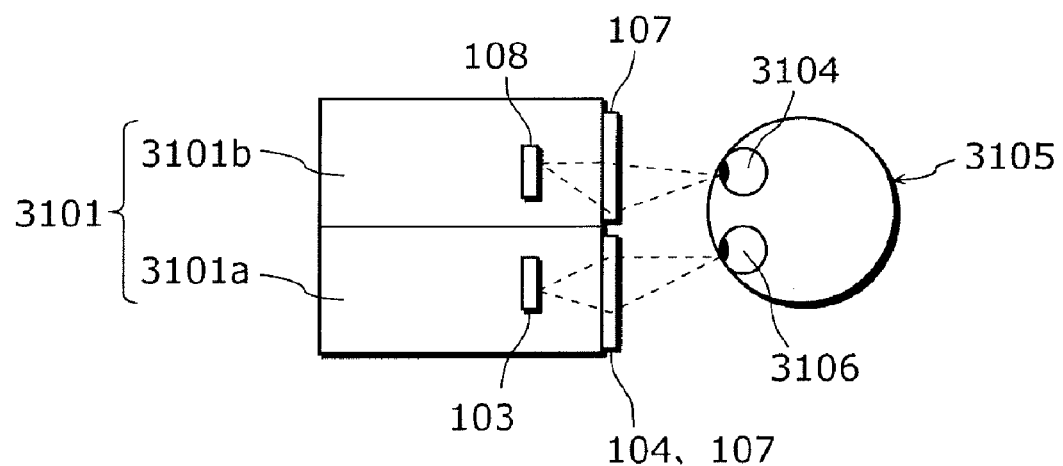
FIG. 72 is a diagram showing another example of a bird's eye view of the binoculars in the sixth embodiment.

Next, binoculars 3101 according to a sixth embodiment shall be described with reference to FIGS. 69 to 72. Note that: FIG. 69 is a bird's eye view of the binoculars 3101; FIG. 70 is a side view of a left-eye side display unit 3101a of the binoculars 3101; FIG. 71 is a side view of a right-eye side display unit 3101b; and FIG. 72 is a diagram showing a variation of FIG. 69.

First, as shown in FIG. 69, the binoculars 3101 include: the left-eye side display unit 3101a which displays an image onto the left eye of the user, and the right-eye side display unit 3101b which displays an image onto the right eye. Next, as shown in FIGS. 70 and 71, the left-eye side display unit 3101a and the right-eye side display unit 3101b include cameras 3103 and 3502, respectively. Then, a user 3105 can visually recognize, by looking into the binoculars 3101, an image captured by the cameras 3103 and 3052, or an image from an external video apparatus connected to an external input terminal of the binoculars 3101. With this configuration, the user 3105 need not wear an apparatus on the head as in the case of the HMD, thus allowing easy use of the beam scan display apparatus outdoors.

As FIG. 70 shows, the left-eye side display unit 3101a, which includes the light source 101, the wavefront shape changing unit 102, the scan unit 103, the deflection unit 104, the control unit 105, the camera 3103, and the reflection mirror 3102, displays an image onto a left eye 3106. On the other hand, as shown in FIG. 71, the right-eye side display unit 3101b, which includes the light source 110, the wavefront shape changing unit 109, the scan unit 108, the deflection unit 107, the control unit 111, the camera 3502, and the reflection mirror 3501, displays an image onto a right eye 3104.

In the above embodiment, an example has been shown in which the left-eye side display unit 3101a and the right-eye side display unit 3101b have the cameras 3013 and 3502, respectively; however, not limited to this, the left-eye side display unit 3101a and the right-eye side display unit 3101b may use the same camera in common. However, as shown in FIGS. 70 and 71, images for the right eye and the left eye may be separately captured with the two cameras 3101 and 3502 so as to be displayed. With this, it is possible to display images having parallax differences onto both eyes of the user, thus allowing display of a stereoscopic image.

The light sources 101 and 109 in FIGS. 70 and 71, as in FIG. 2 of the first embodiment, includes: a red laser source 211, a blue laser source 212, a green laser source 213, and a light detection unit 214.

The wavefront shape changing units 102 and 109 in FIGS. 70 and 71 each have the focal length horizontal component changing unit 201 and the focal length vertical component changing unit 202 arranged in series in an optical path. With this, it is possible to change, independently, horizontal and vertical curvatures of the beam. In the present embodiment, the wavefront shapes are changed vertically and horizontally by, as FIG. 2 shows, combining the cylindrical lens and a mirror and then varying the position of the mirror.

The beams from the wavefront shape changing units 102 and 109 are scanned by the scan units 103 and 108 via the reflection mirrors 3102 and 3501, respectively, and then fall on the deflection units 104 and 107, respectively.

The deflection units 104 and 107 are eyepiece lenses provided in an eyepiece portion of the binoculars 3101 and focus the beams from the scan units 103 and 108 on the user's pupils. Note that the deflection units 104 and 107 may also be a transmissive hologram instead of the convex lens. In this case, the eyepiece-lens portion can be thinner, thus allowing reduction in size of the binoculars 3101.

In addition, in the case of realizing the deflection units 104 and 107 by using the hologram, a multiply-exposed sheet of hologram may be used as the deflection units 104 and 107 as shown in FIG. 69, instead of separately providing the deflection units 104 and 107 as shown in FIG. 72. In this case, it is possible to display a wide-field image to the user.

The light reflected from the surface of the user's retina is detected by the light detection unit 214 after traveling reversely the same path as the incident light.

The control units 105 and 111 each include an integrated circuit which controls each unit of the binoculars 3101. The control units 105 and 111 control laser emission from the light sources 101 and 110 and the operations of: the wavefront shape changing units 102 and 109, the scan units 103 and 108, the light detection unit 214, and the cameras 3103 and 3502.

The beam scan display apparatus according to the present embodiment performs Steps 801 to 805 shown in FIG. 6, in which processing for improving the virtual frame rate of the image to be visually recognized by the user is performed, utilizing the image fusion effect of both eyes. Note that the content of the processing in Steps 801 to 805 is the same as that in the first embodiment.

Note that for the light sources 101 and 110, a beam from the light source 101 may be separated using a prism so that the separated beams enter, respectively, the wavefront shape changing units 102 and 109 used for the display onto the right and left eyes. In this case, it is possible to reduce the number of required light sources and thereby reduce the size of the binoculars 3101 as well as suppressing the power consumption.

Seventh Embodiment

Figure 73:
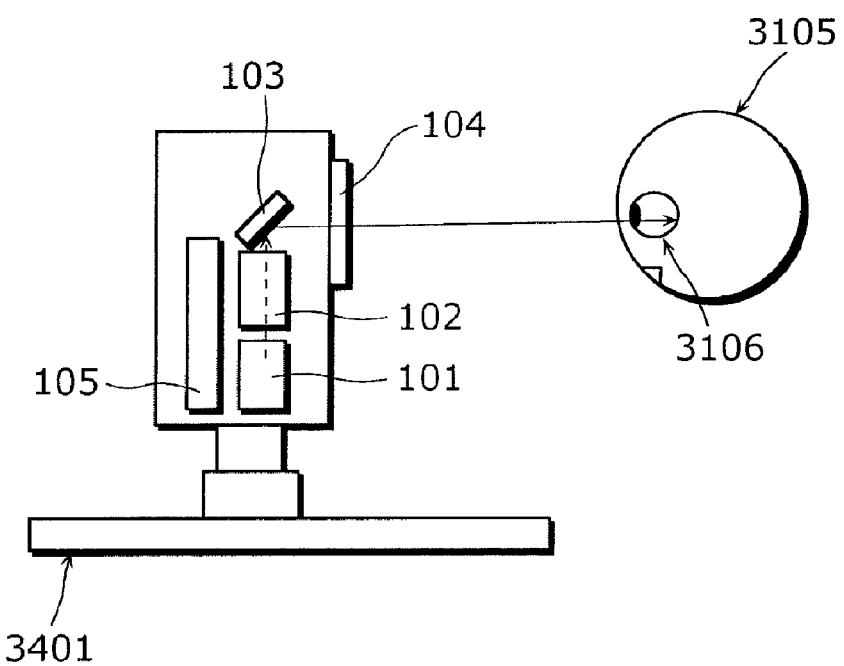
FIG. 73 is a diagram showing a desktop display in a seventh embodiment.

FIG. 73 shows a configuration diagram (side view) of a desktop laser-scan display 3401 in a seventh embodiment of the present invention.

The desktop laser-scan display 3401 includes: the light source 101, the wavefront shape changing unit 102, the scan unit 103, the deflection unit 104, and the control unit 105. Specifically, the desktop laser-scan display 3401 has a package which includes, inside, the light source 101, the wavefront shape changing unit 102, the scan unit 103, and the control unit 105, and has a display surface structured with a deflection unit 104 on the package surface. In addition, as in the case of the binoculars 3101, the desktop laser-scan display 3401 includes a left-side display unit and a right-side display unit.

Then, the user installs this desktop laser-scan display 3401 on the desk for use. With the configuration shown in FIG. 73, the user need not wear an apparatus on the head as in the case of the HMD. In addition, it is no longer necessary to support the apparatus by hand as in the case of the binoculars 3101, thus allowing the user to use the desktop laser-scan display 3401 for a long time without strain.

INDUSTRIAL APPLICABILITY

A beam scan display apparatus according to the present invention has a right-eye scan unit, a left-eye scan unit, and so on and can be applied to such uses as a display apparatus, a display system, a display method, a display program, and so on.

The invention claimed is:

1. An image display apparatus which displays an image onto a retina of a user, said image display apparatus comprising: a left-eye image output unit configured to output a left-eye image constituting an original image in whole or in part; a left-eye deflection unit configured to deflect, toward a left eye of the user, the left-eye image outputted by said left-eye image output unit; a right-eye image output unit configured to output a right-eye image constituting the original image in whole or in part; a right-eye deflection unit configured to deflect, toward a right eye of the user, the right-eye image outputted by said right-eye image output unit; and a control unit configured to control said left-eye image output unit and said right-eye image output unit such that the left-eye image and the right-eye image are outputted, the left-eye image and right-eye image being different from each other in at least one of pixel position, image shape, image size, image resolution, and display frame rate so that the user can recognize the original image from the left-eye image and the right-eye image by an image fusion effect, wherein said left-eye image output unit includes: a left-eye light source which emits a beam for drawing each of pixels constituting the left-eye image; and a left-eye scan unit configured to scan said left-eye deflection unit using the beam emitted from said left-eye light source, and said right-eye image output unit includes: a right-eye light source which emits a beam for drawing each of pixels constituting the right-eye image; and a right-eye scan unit configured to scan said right-eye deflection unit using the beam emitted from said right-eye light source and wherein said control unit includes: a scan field setting unit configured to cause one of said left-eye scan unit and said right-eye scan unit to scan the beam at a first scan angle for scanning only part of the original image, and to cause the other to scan the beam at a second scan angle larger than the first scan angle and equal to or below a scan angle for scanning the original image in whole; and an image quality setting unit configured to control said left-eye image output unit and said right-eye image output unit so as to cause said left-eye image output unit and said right-eye image output unit to output the left-eye image and the right-eye image different from each other in image quality, respectively, according to the first and the second scan angles set by said scan field setting unit.

2. The image display apparatus according to claim 1, wherein said image quality setting unit includes a frame rate setting unit configured to cause one of said left-eye image output unit and said right-eye image output unit to output an image having a first frame rate, and to cause the other to output an image having a second frame rate smaller than the first frame rate, the one of said left-eye image output unit and said right-eye image output unit corresponding to a side for which the first scan angle is set, and the other corresponding to a side for which the second scan angle is set.

3. The image display apparatus according to claim 1, wherein said image quality setting unit includes a resolution setting unit configured to cause one of said left-eye image output unit and said right-eye image output unit to output an image having a first resolution, and to cause the other to output an image having a second resolution lower than the first resolution, the one of said left-eye image output unit and said right-eye image output unit corresponding to a side for which the first scan angle is set, and the other corresponding to a side for which the second scan angle is set.

4. The image display apparatus according to claim 1, wherein said left-eye scan unit and said right-eye scan unit are different in size, and said scan field setting unit is configured to cause a larger one of said left-eye scan unit and said right-eye scan unit to scan the beam at the first scan angle, and to cause a smaller one to scan the beam at the second scan angle.

5. The image display apparatus according to claim 1, further comprising a line-of-sight detection unit configured to detect the user's line of sight, wherein said scan field setting unit is configured to cause one of said left-eye scan unit and said right-eye scan unit to scan a field including an end of the user's line of sight, based on a result of the detection performed by said line-of-sight detection unit, the one of said left-eye scan unit and said right-eye scan unit corresponding to a side for which the first scan angle is set.

6. The image display apparatus according to claim 1, wherein said scan field setting unit is configured to cause one of said left-eye scan unit and said right-eye scan unit to scan the beam at the first scan angle, and to cause the other to scan the beam at the second scan angle, the one of said left-eye scan unit and said right-eye scan unit corresponding to a dominant eye of the user.

7. The image display apparatus according to claim 1, wherein said scan field setting unit is configured to cause one of said left-eye scan unit and said right-eye scan unit to scan the beam at the first scan angle, and to cause the other to scan the beam at the second scan angle, the one of said left-eye scan unit and said right-eye scan unit corresponding to one of the user's eyes which has clearer vision.

8. The image display apparatus according to claim 1, wherein said control unit includes a scan pattern determining unit configured to divide the original image into plural scan fields, and to cause each of said left-eye scan unit and said right-eye scan unit to scan the beam over a different scan field in each frame, and also to scan the beam, in an adjoining frame, over a scan field other than the different scan field.

9. The image display apparatus according to claim 8, wherein said left-eye scan unit and said right-eye scan unit are configured to scan the image by drawing pixels in a first direction and then repeating the drawing more than one time by concurrently shifting a scan position into a second direction perpendicular to the first direction, and said scan pattern determining unit is configured to divide the original image into the plural scan fields such that, in each frame, said left-eye scan unit and said right-eye scan unit perform scanning to draw pixels adjoining each other in the second direction.

10. The image display apparatus according to claim 8, wherein said left-eye scan unit and said right-eye scan unit are configured to scan the image by drawing pixels in a first direction and then repeating the drawing more than one time by concurrently shifting a scan position into a second direction perpendicular to the first direction, and said scan pattern determining unit is configured to divide the original image into the plural scan fields such that each of said left-eye scan unit and said right-eye scan unit scans a series of scan fields in the second direction in each frame.

11. The image display apparatus according to claim 8, wherein said left-eye scan unit and said right-eye scan unit are configured to scan the image by drawing pixels in a first direction and then repeating the drawing more than one time by concurrently shifting a scan position into a second direction perpendicular to the first direction, and said scan pattern determining unit is configured to cause each of said left-eye scan unit and said right-eye scan unit to scan the beam such that said left-eye scan unit and said right-eye scan unit perform scanning in directions opposite to each other when performing the scanning in the second direction.

12. The image display apparatus according to claim 8, wherein said control unit includes a display image quality determining unit configured to generate a correction image, of which at least one of the frame rate and the number of display pixels of the original image is corrected based on a maximum drive frequency of said left-eye scan unit and said right-eye scan unit, and said scan pattern determining unit is configured to divide, into the plural scan fields, the correction image generated by said display image quality determining unit, and then cause each of said left-eye scan unit and said right-eye scan unit to scan the beam.

13. The image display apparatus according to claim 12, wherein said left-eye scan unit and said right-eye scan unit are configured to scan the image by drawing pixels in a first direction and then repeating the drawing more than one time by concurrently shifting a scan position into a second direction perpendicular to the first direction, and said display image quality determining unit is configured to correct the frame rate of the original image by doubling a smaller one of a drive frequency of said left-eye scan unit and said right-eye scan unit for scanning in the second direction and the maximum drive frequency of said left-eye scan unit and said right-eye scan unit for scanning in the second direction, the drive frequency being required for displaying the original image.

14. The image display apparatus according to claim 13, wherein said display image quality determining unit is configured to re-correct the corrected frame rate such that the number of display pixels in the second direction is equal to or larger than a predetermined value at which the frame rate of the original image is equal to or higher than 1, and is also equal to or below the number of display pixels in the second direction of the original image, the number of display pixels in the second direction being calculated from the corrected frame rate and the drive frequency of said left-eye scan unit and said right-eye scan unit for scanning in the first direction.

15. The image display apparatus according to claim 12, wherein said scan pattern determining unit is configured to divide the original image into scan fields, the number of which is equivalent to a quotient obtained by dividing a total number of pixels of one of the left-eye image and the right-eye image by the number of display pixels of each of frames corrected by said display image quality determining unit.

16. The image display apparatus according to claim 12, wherein said display image quality determining unit is further configured to correct at least one of the frame rate and the number of display pixels of the original image, based on content information indicating contents of the original image.

17. The image display apparatus according to claim 16, wherein said control unit further includes a user profile management unit configured to hold an image quality correction value that is set by the user per content information, and said display image quality determining unit is configured to correct at least one of the frame rate and the number of pixels of the original image, based on the image correction value corresponding to the content information of the original image.

18. The image display apparatus according to claim 17, wherein said user profile management unit is further configured to hold information regarding vision of the user, and said display image quality determining unit is configured to correct at least one of the frame rate and the number of pixels of the original image, based on the information regarding the vision of the user, which is held by said user profile management unit.

19. The image display apparatus according to claim 8, further comprising:

a battery for driving said image display apparatus;

a power management unit configured to detect a remaining charge of the battery; and a drive frequency determining unit configured to change, according to a result of the detection performed by said power management unit, a maximum value of a drive frequency for both of said left-eye scan unit and said right-eye scan unit.

20. The image display apparatus according to claim 1, wherein, in the case where the left-eye image becomes a left-eye distorted image which is distorted in a trapezoidal shape on said left-eye deflection unit when the beam scanned by said left-eye scan unit is obliquely incident on said left-eye deflection unit, and where the right-eye image becomes a right-eye distorted image which is distorted in a trapezoidal shape on said right-eye deflection unit when the beam scanned by said right-eye scan unit is obliquely incident on said right-eye deflection unit, said control unit includes: a rectangular region determining unit configured to determine a left-eye rectangular region in a rectangle shape, which has, as a first side, a portion of a long side of the left-eye distorted image and, as a second side, a line segment orthogonal to the first side and connecting an endpoint of the first side and an oblique side of the left-eye distorted image, and to determine a right-eye rectangular region in a rectangle shape, which has, as a third side having a same length as the first side, a portion of a long side of the right-eye image and, as a fourth side, a line segment orthogonal to the third side and connecting an endpoint of the third side and an oblique side of the right-eye distorted image; an aspect ratio adjusting unit configured to adjust at least one of a height and a width of the original image so as to obtain a correction image having the first side as a height and having a sum of the second and the fourth sides as a width; a distortion correcting unit configured to generate a left-eye correction image by distorting the correction image in an opposite direction to the left-eye distorted image such that the left-eye image is displayed onto said left-eye deflection unit, and to generate a right-eye correction image by distorting the correction image in an opposite direction to the right-eye distorted image such that the right-eye image is displayed onto said right-eye deflection unit; and an output image control unit configured to cause said left-eye image output unit to output an image portion corresponding to the left-eye rectangular region of the left-eye correction image, and to cause said right-eye image output unit to output an image portion corresponding to the right-eye rectangular region of the right-eye correction image.

21. The image display apparatus according to claim 20, wherein said rectangular region determining unit is configured to determine the left-eye rectangular region and the right-eye rectangular region such that, when superposing the left-eye image and the right-eye distorted image in such a manner that a short side of the left-eye distorted image is included in a long side of the right-eye image and that a short side of the right-eye image is included in a long side of the left-eye distorted image, each of the second and the fourth sides becomes a straight line passing through an intersection of oblique sides of the left-eye distorted image and the right-eye distorted image.

22. The image display apparatus according to claim 20, wherein said control unit includes a remaining region determining unit configured to determine a left-eye remaining region in a trapezoidal shape, which has an opposite side of the first side as a long side and a portion of an oblique side of the left-eye distorted image as an oblique side and has a height smaller than the fourth side, and to determine a right-eye remaining region in a trapezoidal shape, which has a portion of an oblique side of the right-eye distorted image as an oblique side and has a height smaller than the second side, said output image control unit is further configured to cause said left-eye image output unit to output an image portion included in the left-eye correction image and corresponding to the left-eye remaining region, and to cause said right-eye image output unit to output an image portion included in the right-eye correction image and corresponding to the right-eye remaining region.

23. The image display apparatus according to claim 22, wherein said output image control unit is configured to decrease brightness of at least one of the left-eye remaining region and a region which is included in the right-eye rectangular region and overlaps with the left-eye remaining region, and to decrease brightness of at least one of the right-eye remaining region and a region which is included in the left-eye rectangular region and overlaps with the right-eye remaining region.

24. The image display apparatus according to claim 22, wherein said output image control unit is configured to increase brightness of a region which is included in the right-eye rectangular region and does not overlap with the left-eye remaining region, and to increase brightness of a region which is included in the left-eye rectangular region and does not overlap with the right-eye remaining region.

25. The image display apparatus according to claim 20, wherein said rectangular region determining unit is configured to determine a shape of the left-eye rectangular region and a shape of the right-eye rectangular region such that a ratio between the width and the height of the correction image is 16:9 or 4:3.

26. The image display apparatus according to claim 20, wherein, when difference in vision between both eyes of the user is equal to or larger than a given value, said rectangular region determining unit is configured to determine a shape of the left-eye rectangular region and a shape of the right-eye rectangular region such that one of the left-eye and the right-eye rectangular regions corresponding to an eye having clearer vision is maximum in size, and the other corresponding to an eye having less clear vision is 0 in size, and said remaining region determining unit is configured to determine a shape of the left-eye remaining region and a shape of the right-eye remaining region such that one of the left-eye and right-eye remaining regions corresponding to an eye having clearer vision is 0 in size, and the other corresponding to an eye having less clear vision is maximum in size.

27. An image display method, comprising: outputting a left-eye image constituting an original image in whole or in part; deflecting, toward a left eye of a user, the left-eye image outputted in said outputting a left-eye image; outputting a right-eye image constituting the original image in whole or in part; deflecting, toward a right eye of the user, the right-eye image outputted in said outputting a right-eye image; and controlling the left-eye image output unit and the right-eye image output unit such that the left-eye image and the right-eye image are outputted, the left-eye image and the right-eye image being different from each other in at least one of pixel position, image shape, image size, image resolution, and display frame rate so that the user can recognize the original image from the left-eye image and the right-eye image by an image fusion effect and wherein said left-eye image output unit includes: a left-eye light source which emits a beam for drawing each of pixels constituting the left-eye image; and a left-eye scan unit configured to scan said left-eye deflection unit using the beam emitted from said left-eye light source, and said right-eye image output unit includes: a right-eye light source which emits a beam for drawing each of pixels constituting the right-eye image; and a right-eye scan unit configured to scan said right-eye deflection unit using the beam emitted from said right-eye light source, and wherein said control unit includes: a scan field setting unit configured to cause one of said left-eye scan unit and said right-eye scan unit to scan the beam at a first scan angle for scanning only part of the original image, and to cause the other to scan the beam at a second scan angle larger than the first scan angle and equal to or below a scan angle for scanning the original image in whole; and an image quality setting unit configured to control said left-eye image output unit and said right-eye image output unit so as to cause said left-eye image output unit and said right-eye image output unit to output the left-eye image and the right-eye image different from each other in image quality, respectively, according to the first and the second scan angles set by said scan field setting unit.

28. A computer program, stored in a non-transitory computer-readable media, causing a computer to execute: outputting a left-eye image constituting an original image in whole or in part; deflecting, toward a left eye of the user, the left-eye image outputted in the outputting a left-eye image; outputting a right-eye image constituting the original image in whole or in part; deflecting, toward a right eye of the user, the right-eye image outputted in the outputting a right-eye image; and controlling the left-eye image output unit and the right-eye image output unit such that the left-eye image and the right-eye image are outputted, the left-eye image and the right-eye image being different from each other in at least one of pixel position, image shape, image size, image resolution, and display frame rate so that the user can recognize the original image from the left-eye image and the right-eye image by an image fusion effect, and wherein said left-eye image output unit includes: a left-eye light source which emits a beam for drawing each of pixels constituting the left-eye image; and a left-eye scan unit configured to scan said left-eye deflection unit using the beam emitted from said left-eye light source, and said right-eye image output unit includes: a right-eye light source which emits a beam for drawing each of pixels constituting the right-eye image; and a right-eye scan unit configured to scan said right-eye deflection unit using the beam emitted from said right-eye light source, and wherein said control unit includes: a scan field setting unit configured to cause one of said left-eye scan unit and said right-eye scan unit to scan the beam at a first scan angle for scanning only part of the original image, and to cause the other to scan the beam at a second scan angle larger than the first scan angle and equal to or below a scan angle for scanning the original image in whole; and an image quality setting unit configured to control said left-eye image output unit and said right-eye image output unit so as to cause said left-eye image output unit and said right-eye image output unit to output the left-eye image and the right-eye image different from each other in image quality, respectively, according to the first and the second scan angles set by said scan field setting unit.

29. An integrated circuit, comprising: a left-eye image output unit configured to output a left-eye image constituting an original image in whole or in part; a left-eye deflection unit configured to deflect, toward a left eye of a user, the left-eye image outputted by said left-eye image output unit; a right-eye image output unit configured to output a right-eye image constituting the original image in whole or in part; a right-eye deflection unit configured to deflect, toward a right eye of the user, the right-eye image outputted by said right-eye image output unit; and a control unit configured to control said left-eye image output unit and said right-eye image output unit such that the left-eye image and the right-eye image are outputted, the left-eye image and the right-eye image being different from each other in at least one of pixel position, image shape, image size, image resolution, and display frame rate so that the user can recognize the original image from the left-eye image and the right-eye image by an image fusion effect, and wherein said left-eye image output unit includes: a left-eye light source which emits a beam for drawing each of pixels constituting the left-eye image; and a left-eye scan unit configured to scan said left-eye deflection unit using the beam emitted from said left-eye light source, and said right-eye image output unit includes: a right-eye light source which emits a beam for drawing each of pixels constituting the right-eye image; and a right-eye scan unit configured to scan said right-eye deflection unit using the beam emitted from said right-eye light source, and wherein said control unit includes: a scan field setting unit configured to cause one of said left-eye scan unit and said right-eye scan unit to scan the beam at a first scan angle for scanning only part of the original image, and to cause the other to scan the beam at a second scan angle larger than the first scan angle and equal to or below a scan angle for scanning the original image in whole; and an image quality setting unit configured to control said left-eye image output unit and said right-eye image output unit so as to cause said left-eye image output unit and said right-eye image output unit to output the left-eye image and the right-eye image different from each other in image quality, respectively, according to the first and the second scan angles set by said scan field setting unit.

30. A goggle-type head-mounted display, comprising:
the image display apparatus according to claim 1;
a left-eye lens, which is provided in front of a left eye of a user and has said left-eye deflection unit at a position opposite to the left eye of the user;
a right-eye lens, which is provided in front of a right eye of the user and has said right-eye deflection unit at a position opposite to the right eye of the user;
a left-side temple, which has one end connected to said left-eye lens and the other end fixed to a left side of the user's head; and
a right-side temple, which has one end connected to said right-eye lens and the other end fixed to a right side of the user's head.

31. A vehicle, comprising:
the image display apparatus according to claim 1; and
a windshield having said left-eye deflection unit and said right-eye deflection unit.

32. A pair of binoculars, comprising:
the image display apparatus according to claim 1;
a left-eye eyepiece lens having said left-eye deflection unit; and
a right-eye eyepiece lens having said right-eye deflection unit.

33. A desk-top display, comprising:
the image display apparatus according to claim 1;
a case for housing said image display apparatus; and
a display screen provided on a surface of said case and configured with said left-eye deflection unit and said right-eye deflection unit.

* * * * *